(12) United States Patent
Kramer

(10) Patent No.: US 10,881,249 B2
(45) Date of Patent: Jan. 5, 2021

(54) FOODWARE SYSTEM HAVING VISUAL-STIMULATING, SENSING, HEATING, AND WIRELESS-COMMUNICATION COMPONENTS

(71) Applicant: James F. Kramer, Foster City, CA (US)

(72) Inventor: James F. Kramer, Foster City, CA (US)

( * ) Notice: Subject to any disclaimer, the term of this patent is extended or adjusted under 35 U.S.C. 154(b) by 0 days.

(21) Appl. No.: 16/144,938

(22) Filed: Sep. 27, 2018

(65) Prior Publication Data
US 2019/0029472 A1    Jan. 31, 2019

Related U.S. Application Data

(63) Continuation of application No. 15/672,114, filed on Aug. 8, 2017, now Pat. No. 10,085,598, which is a
(Continued)

(51) Int. Cl.
*A47G 19/02*    (2006.01)
*A47J 43/28*    (2006.01)
(Continued)

(52) U.S. Cl.
CPC ............ *A47J 43/28* (2013.01); *A47G 19/025* (2013.01); *A47G 19/2227* (2013.01); *A47G 21/00* (2013.01); *A47G 21/023* (2013.01); *A47G 21/04* (2013.01); *A47G 23/0306* (2013.01); *A47G 23/0309* (2013.01); *G01G 19/4146* (2013.01);
(Continued)

(58) Field of Classification Search
CPC .. A47G 19/025; A47G 19/027; A47G 19/127; A47G 19/2227; A47G 2019/2238; A47G 21/007; A47G 2021/008
See application file for complete search history.

(56) References Cited

U.S. PATENT DOCUMENTS 2,046,125 A * 6/1936 Lacy ................... A47J 36/2461
219/436
2,114,460 A   4/1938 Ziegler
(Continued)

FOREIGN PATENT DOCUMENTS

CN    2066269 U    11/1990
CN    2193094 Y    2/1994
(Continued)

OTHER PUBLICATIONS

LiveWire Enterprises, Product Name: "LiveWire," information from website: www.livewireent.com/galleryparties.shtml, unknown initial posting date.
(Continued)

*Primary Examiner* — Ismael Negron

(57) ABSTRACT

An active foodware system includes a mechanical structure supporting a food surface recessed in relation to an area surrounding the food surface; a heating component for heating food received by the food surface; a sensing component for maintaining the heating component at a desired temperature; a wireless communication component; and a visual stimulating component responsive to data from the sensing component or the wireless communication component.

24 Claims, 49 Drawing Sheets

Related U.S. Application Data continuation of application No. 14/217,449, filed on Mar. 17, 2014, now Pat. No. 9,737,173, which is a continuation of application No. 11/577,718, filed as application No. PCT/IB2005/053460 on Oct. 22, 2005, now Pat. No. 8,672,504, which is a continuation-in-part of application No. 10/904,103, filed on Oct. 22, 2004, now Pat. No. 7,163,311.

(51) Int. Cl.

| | | |
|---|---|---|
| A47G 19/22 | (2006.01) | |
| A47G 21/00 | (2006.01) | |
| A47G 23/03 | (2006.01) | |
| G01G 19/414 | (2006.01) | |
| G01G 21/22 | (2006.01) | |
| G06F 3/041 | (2006.01) | |
| A47G 21/02 | (2006.01) | |
| A47G 21/04 | (2006.01) | |
| G09B 19/00 | (2006.01) | |
| H04Q 9/00 | (2006.01) | |

(52) U.S. Cl.
CPC ............. *G01G 21/22* (2013.01); *G06F 3/041* (2013.01); *G09B 19/00* (2013.01); *G09B 19/0092* (2013.01); *H04Q 9/00* (2013.01); *A47G 2019/225* (2013.01); *A47G 2019/2238* (2013.01); *A47G 2019/2244* (2013.01); *H04Q 2209/40* (2013.01); *H04Q 2209/84* (2013.01)

(56) References Cited

U.S. PATENT DOCUMENTS

| | | | |
|---|---|---|---|
| 2,224,319 A | | 12/1940 | Schroyer |
| 2,658,297 A | | 11/1953 | Woolsey |
| 2,663,866 A | | 12/1953 | Simpson |
| 3,205,755 A | | 9/1965 | Sklar |
| 3,370,163 A | | 2/1968 | Dudley |
| 3,510,643 A | | 5/1970 | File |
| 3,705,982 A | | 12/1972 | Smolinski |
| 3,839,793 A | | 10/1974 | Crapio |
| 3,878,386 A | | 4/1975 | Douglas |
| 3,931,494 A | * | 1/1976 | Fisher ............... A47J 36/2461 219/441 |
| 4,034,213 A | | 7/1977 | Norris |
| 4,095,090 A | * | 6/1978 | Pianezza ............ A47G 19/2288 219/435 |
| 4,207,673 A | | 6/1980 | DiGirolamo et al. |
| 4,344,113 A | | 8/1982 | Ditto et al. |
| 4,390,928 A | | 6/1983 | Runge |
| 4,803,604 A | | 2/1989 | Nichols et al. |
| 4,914,819 A | | 4/1990 | Ash |
| 4,922,355 A | | 5/1990 | Dietz et al. |
| 4,992,704 A | | 2/1991 | Stinson |
| 5,023,761 A | | 6/1991 | de Lange |
| 5,047,267 A | | 9/1991 | Pantaleo et al. |
| 5,075,970 A | | 12/1991 | Albert |
| 5,119,279 A | | 6/1992 | Makowsky |
| 5,189,793 A | | 3/1993 | Ratzon et al. |
| 5,269,717 A | | 12/1993 | Tardif |
| 5,299,356 A | | 4/1994 | Maxwell |
| 5,339,548 A | | 8/1994 | Russell |
| 5,355,289 A | | 10/1994 | Krenn |
| 5,421,089 A | | 6/1995 | Dubus et al. |
| 5,430,628 A | | 7/1995 | Saunders |
| 5,485,355 A | | 1/1996 | Voskoboinik et al. |
| 5,508,494 A | * | 4/1996 | Sarris ............... A47J 31/005 219/385 |
| 5,553,735 A | | 9/1996 | Kimura |
| 5,575,553 A | | 11/1996 | Tipton |
| 5,575,563 A | | 11/1996 | Chiu et al. |
| 5,678,925 A | | 10/1997 | Garmaise et al. |
| 5,785,407 A | | 7/1998 | Ratcliffe et al. |
| 5,966,814 A | | 10/1999 | Lin |
| 5,969,606 A | | 10/1999 | Reber et al. |
| 5,983,783 A | | 11/1999 | Archard et al. |
| 6,084,526 A | | 7/2000 | Blotky et al. |
| 6,104,292 A | * | 8/2000 | Rombom ............... A61J 9/00 340/573.1 |
| 6,129,292 A | | 10/2000 | Leung et al. |
| 6,140,932 A | * | 10/2000 | Frank ................. A47G 19/2227 206/217 |
| 6,144,016 A | * | 11/2000 | Garvin ................. A45C 11/20 206/550 |
| 6,152,575 A | | 11/2000 | Montanino |
| 6,163,248 A | | 12/2000 | Paek et al. |
| 6,166,496 A | | 12/2000 | Lys et al. |
| 6,213,616 B1 | | 4/2001 | Chien |
| 6,254,247 B1 | | 7/2001 | Carson |
| 6,335,691 B1 | | 1/2002 | Bird |
| 6,412,398 B1 | | 7/2002 | Norcross et al. |
| 6,419,384 B1 | | 7/2002 | Lewis et al. |
| 6,443,589 B1 | | 9/2002 | Lee |
| 6,464,222 B1 | | 10/2002 | Parker |
| 6,511,196 B1 | | 1/2003 | Hoy |
| 6,591,524 B1 | | 7/2003 | Lewis et al. |
| 6,674,052 B1 | * | 1/2004 | Luo ...................... A47J 41/0077 219/432 |
| 6,675,483 B2 | | 1/2004 | Bond et al. |
| 6,793,362 B2 | | 9/2004 | Tai |
| 6,864,462 B2 | * | 3/2005 | Sanoner ............ A47G 19/2227 219/387 |
| 6,865,815 B1 | | 3/2005 | Dunn et al. |
| 7,022,946 B2 | * | 4/2006 | Sanoner ............ A47G 19/2227 219/387 |
| 7,409,765 B2 | | 8/2008 | So |
| 2002/0079317 A1 | | 6/2002 | Scott |
| 2002/0097195 A1 | | 7/2002 | Frank |
| 2002/0124017 A1 | | 9/2002 | Mault |
| 2003/0041106 A1 | | 2/2003 | Tuli |
| 2003/0122730 A1 | | 7/2003 | Frank et al. |
| 2003/0210141 A1 | * | 11/2003 | Iacovino ............ B65D 81/3879 340/539.1 |
| 2004/0032730 A1 | | 2/2004 | Ciarrocchi, Jr. |
| 2004/0118618 A1 | | 6/2004 | Davidson |
| 2004/0177434 A1 | | 9/2004 | Sputh |
| 2005/0121431 A1 | * | 6/2005 | Yuen .................. A47G 19/2288 219/387 |
| 2006/0191919 A1 | * | 8/2006 | Cheu ................... A47G 19/12 219/730 |
| 2007/0028453 A1 | | 2/2007 | Crow |

FOREIGN PATENT DOCUMENTS

| | | |
|---|---|---|
| CN | 2159160 Y | 3/1994 |
| CN | 2386735 Y | 7/2000 |
| CN | 2495211 Y | 6/2002 |
| JP | H06-237849 A | 8/1994 |
| JP | H07-020933 U | 4/1995 |
| JP | H08-112182 A | 5/1996 |
| JP | H09-056563 A | 3/1997 |
| JP | 2001-190386 A | 7/2001 |
| JP | 2003-255877 A | 9/2003 |
| JP | 2004-041613 A | 2/2004 |
| JP | 2004-105231 A | 4/2004 |
| KR | 20020064809 A | 8/2002 |
| KR | P2002-0084015 | 11/2002 |

OTHER PUBLICATIONS

Matthew Crowley, "Inventions: Glitter Gulp," Las Vegas Review Journal, Feb. 10, 2003, website: www.reviewjournal.com/lvrj_home/2003/Feb-10-Mon-2003/business/20583098.html.

ebigchina.com, Product Name: "Flash Ice Glass," information from website: www.ebigchina.com/ebcps/4/pd/811728.html?mode=?popup, unknown initial posting date.

coolstuffcheap.com, Product Name: "Lighted Barware," information from website: www.coolstuffcheap.com/lightware.html, unknown initial posting date.

(56) References Cited

OTHER PUBLICATIONS shop.com, Product Name: "Fiber Optic Stemmed Glass," information from website: www.shop.com/op/aprod~fiber+optic+stemmed+glass-s66761, unknown initial posting date.
reluct.com, Category: "EL Wire Light Objects," information from website: www.reluct.com/home/2004_07_25_archive.html, unknown initial posting date.
Connie Cheng and Leonardo Bonanni, Counter Intelligence—MIT Media Lab, "Intelligent Spoon," website: www.media.mit.edu/ci/projects/intelligentspoon.html, unknown initial posting date.

* cited by examiner

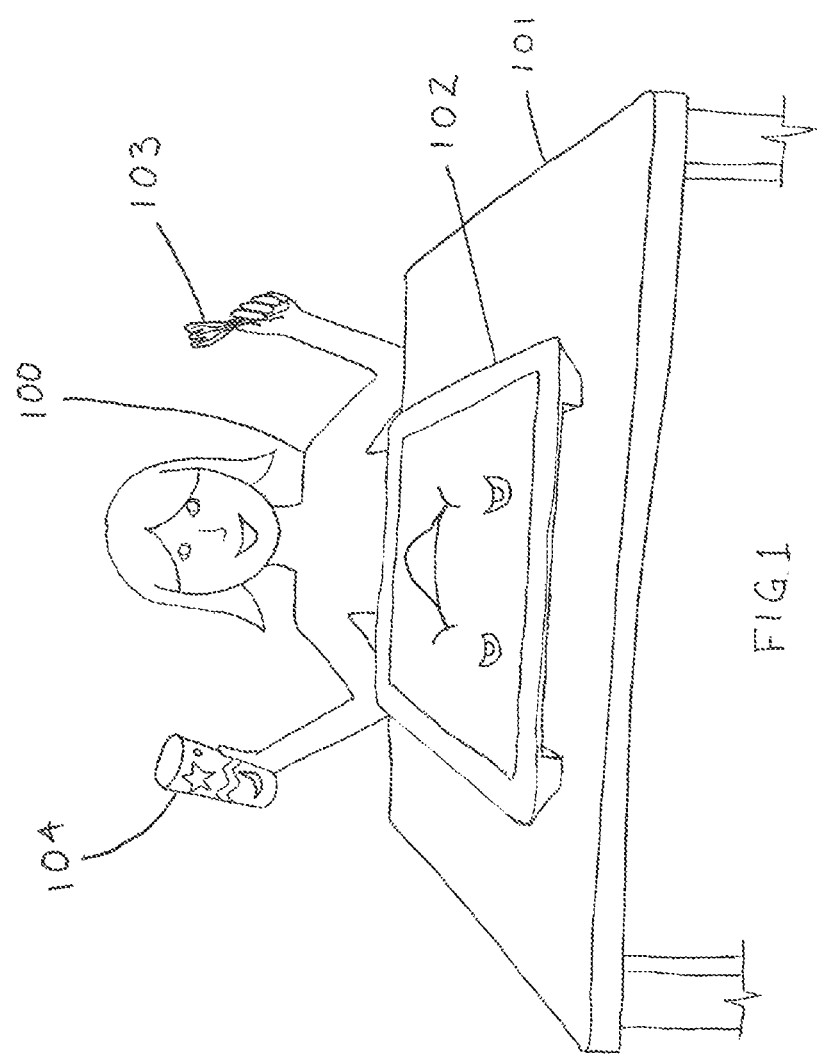

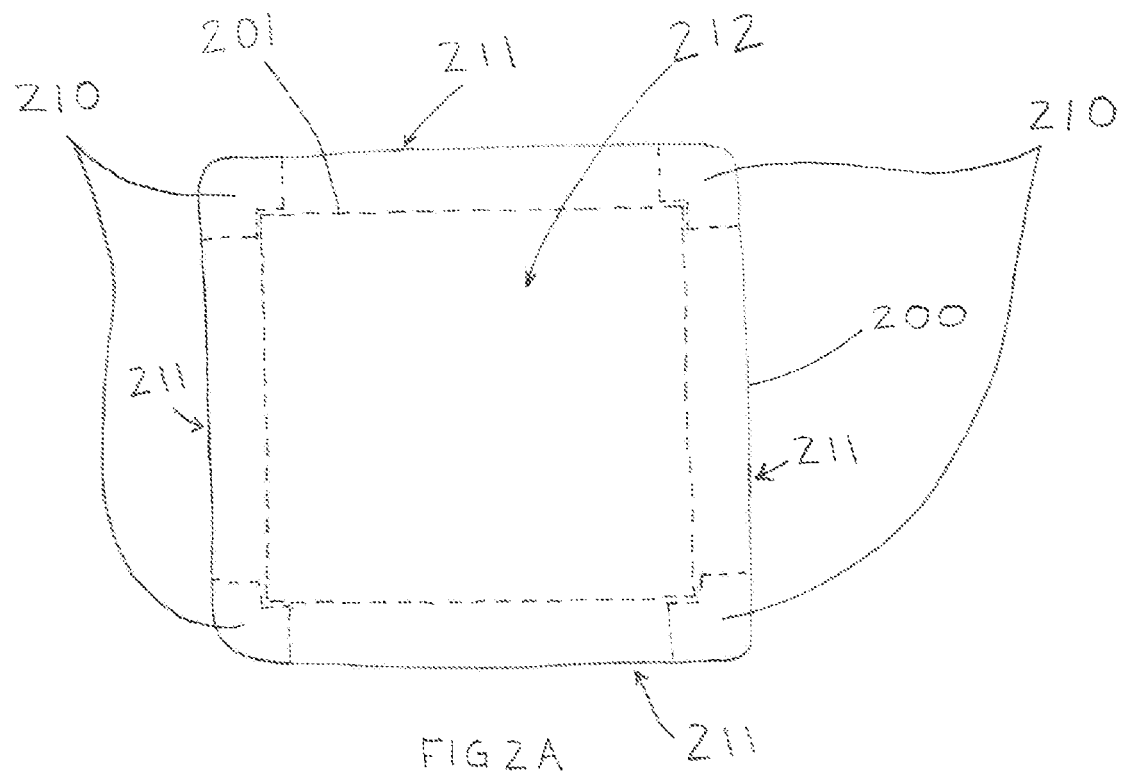
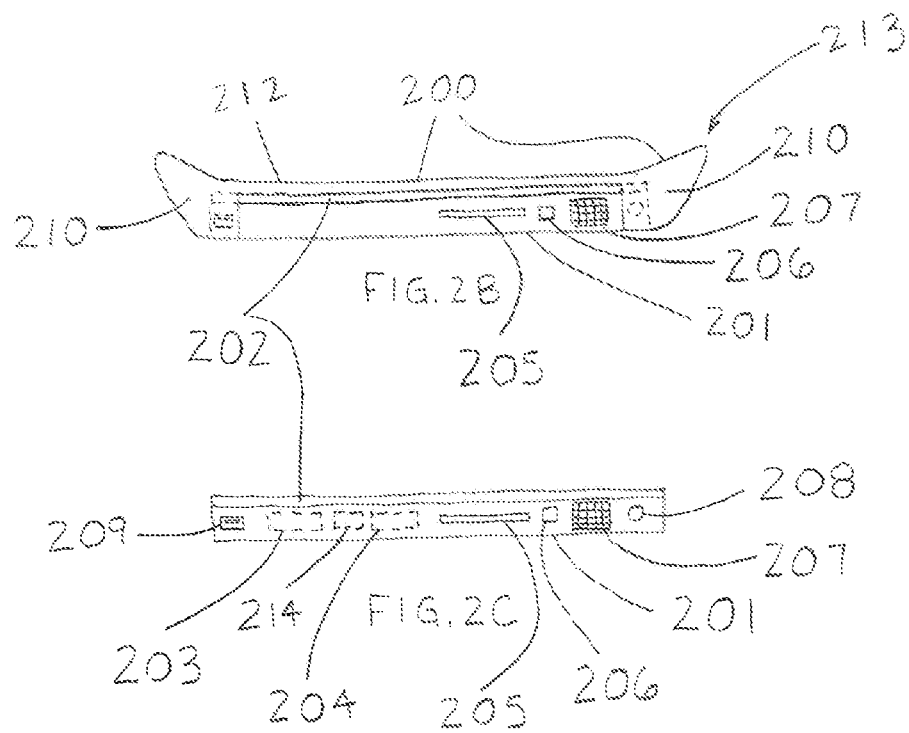

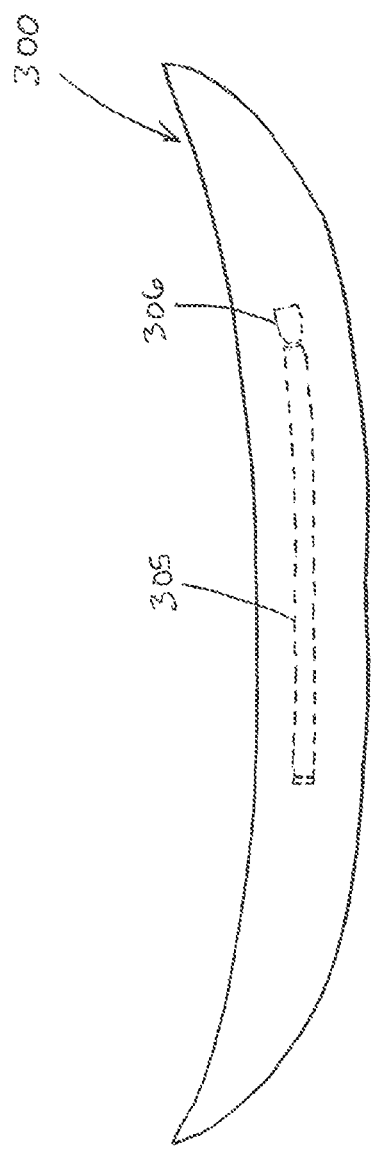

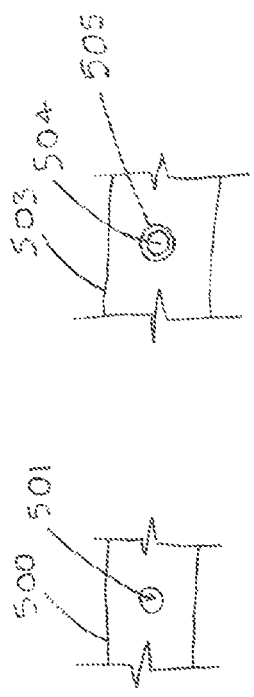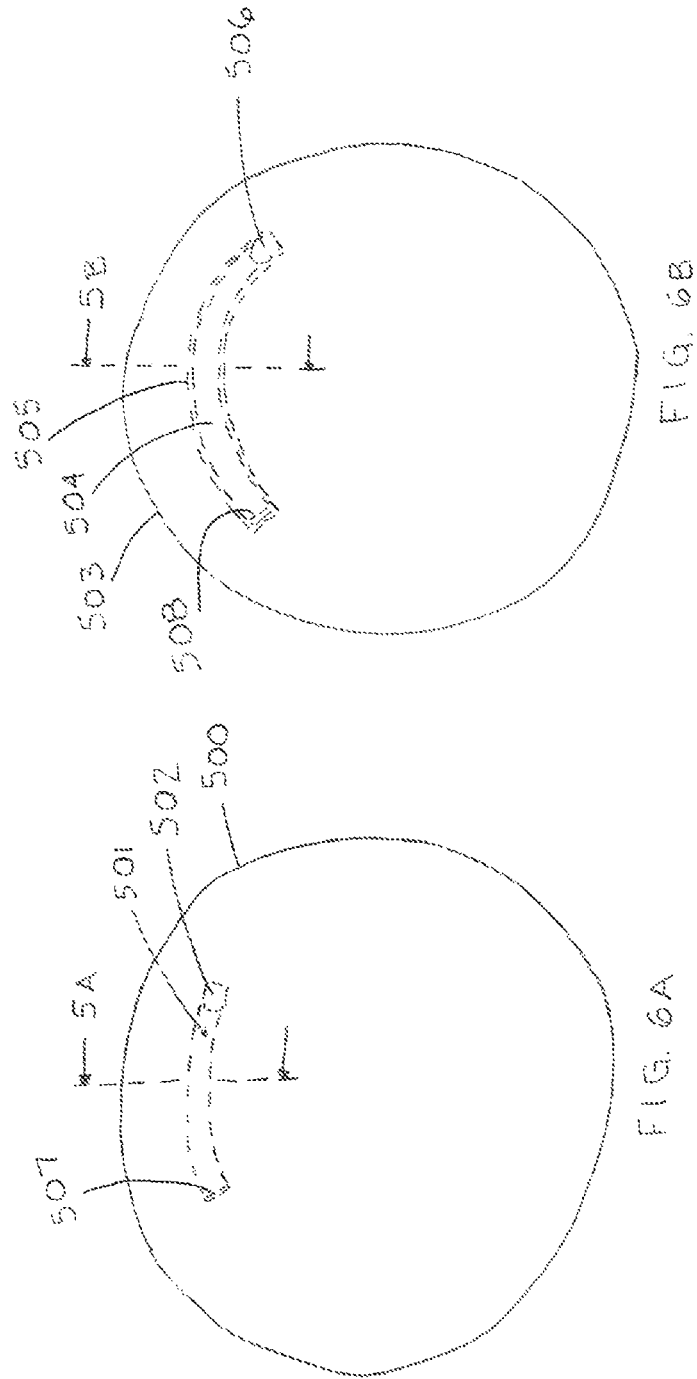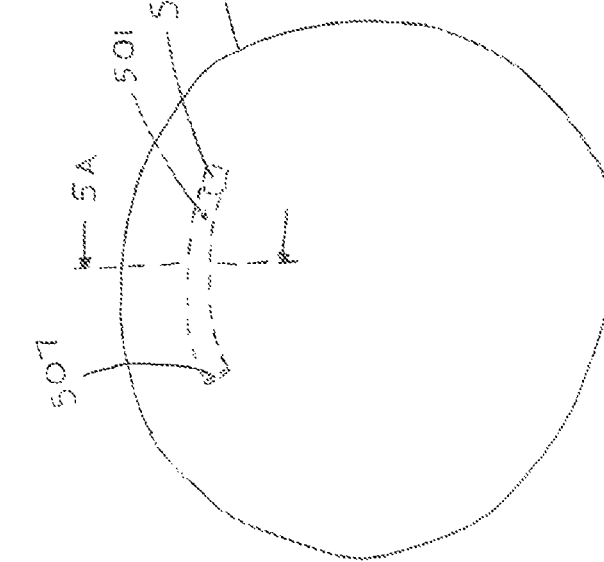

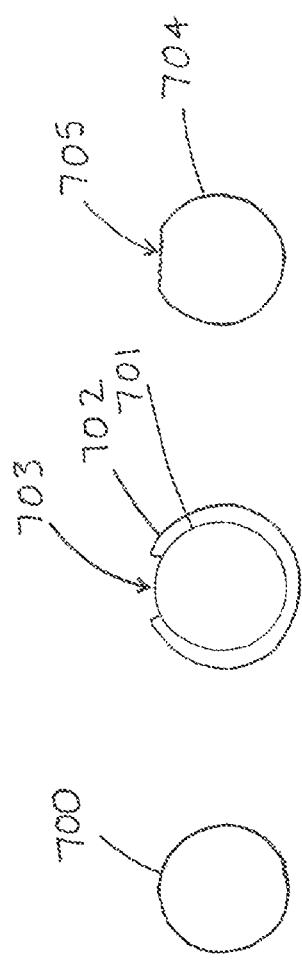

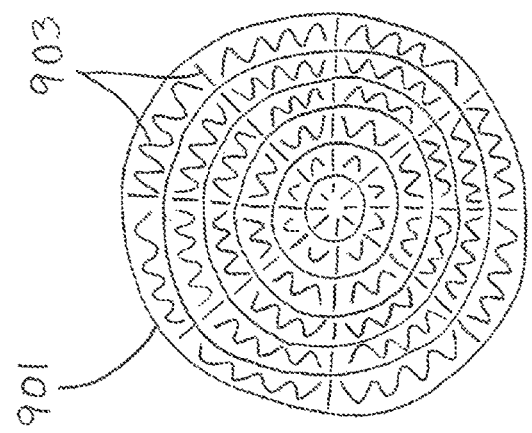
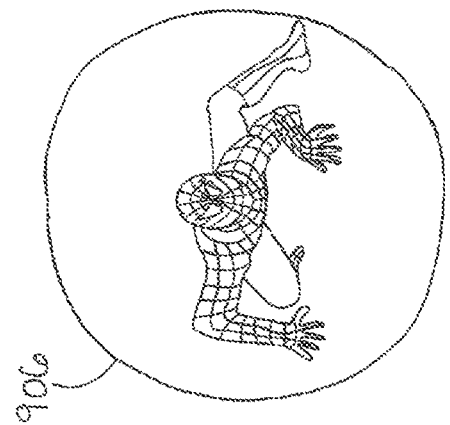
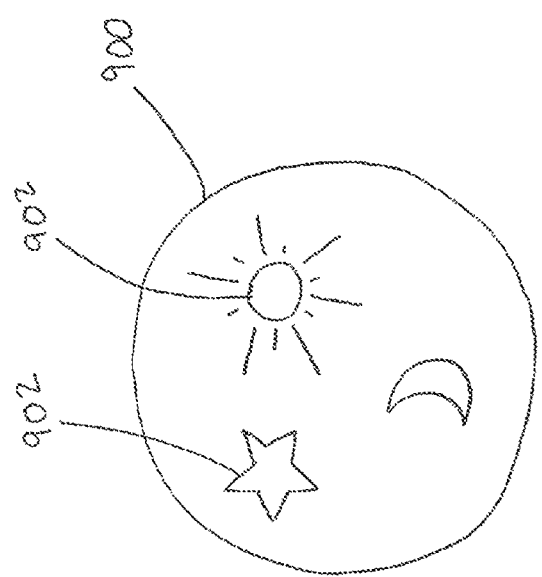
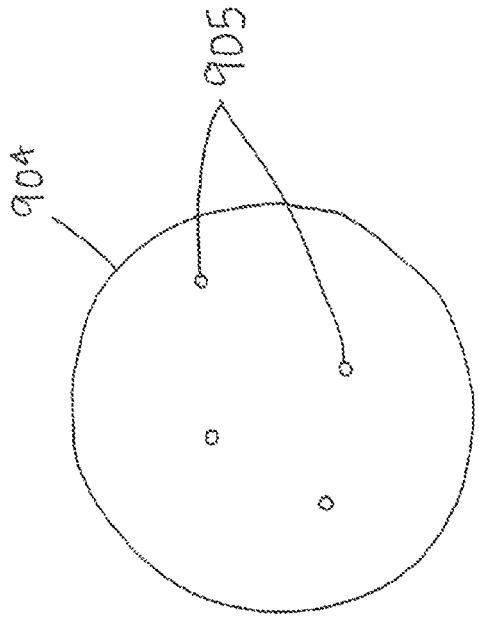
FIG. 9A
FIG. 9B
FIG. 9C
FIG. 9D

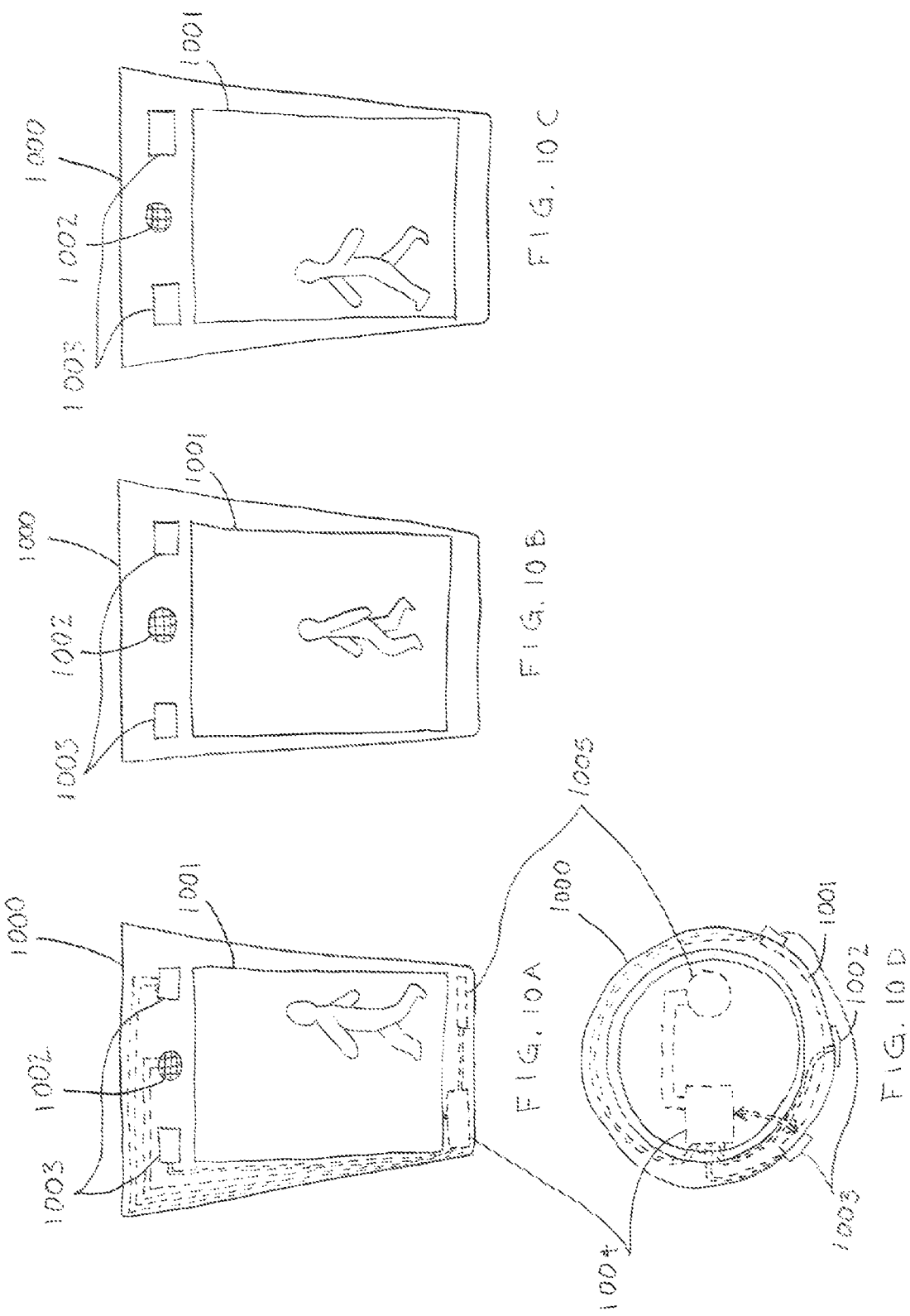

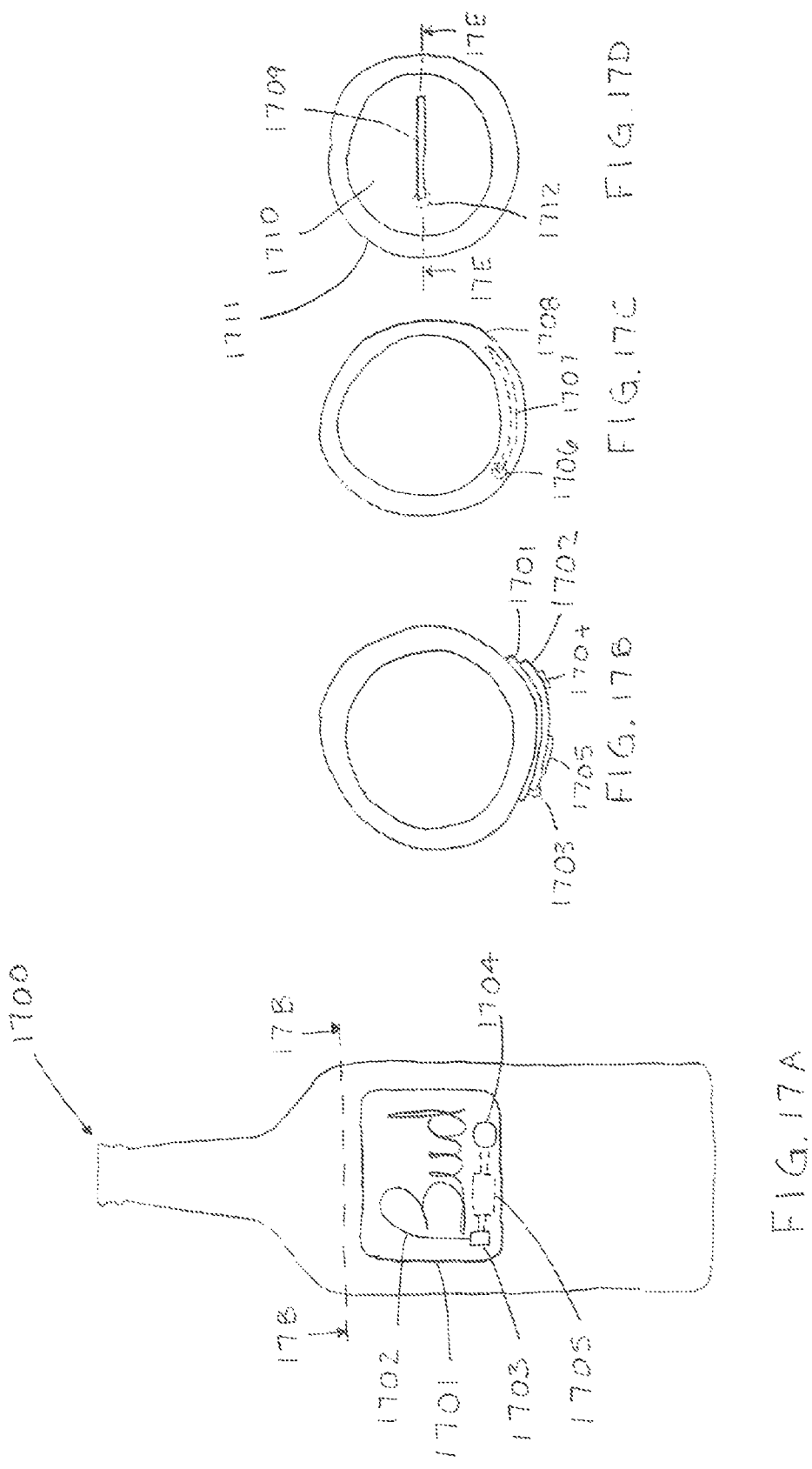

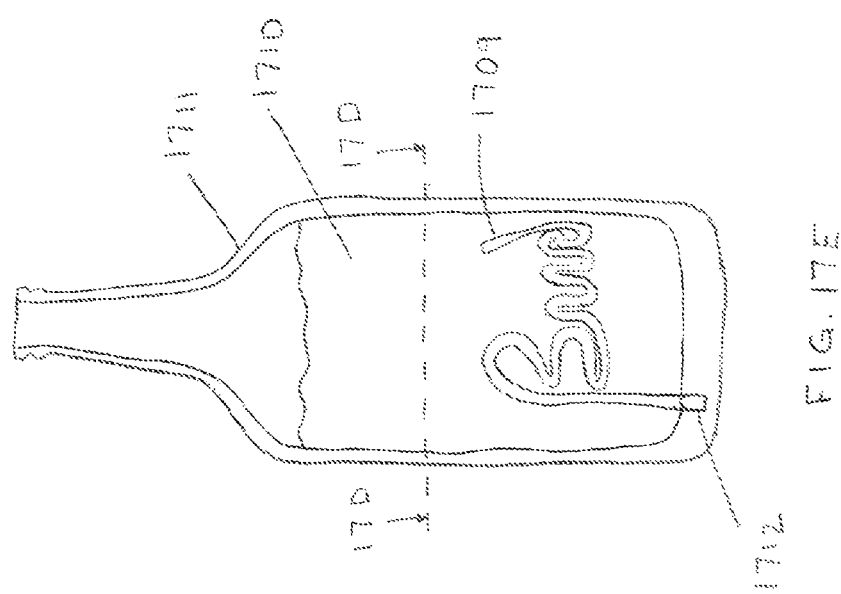

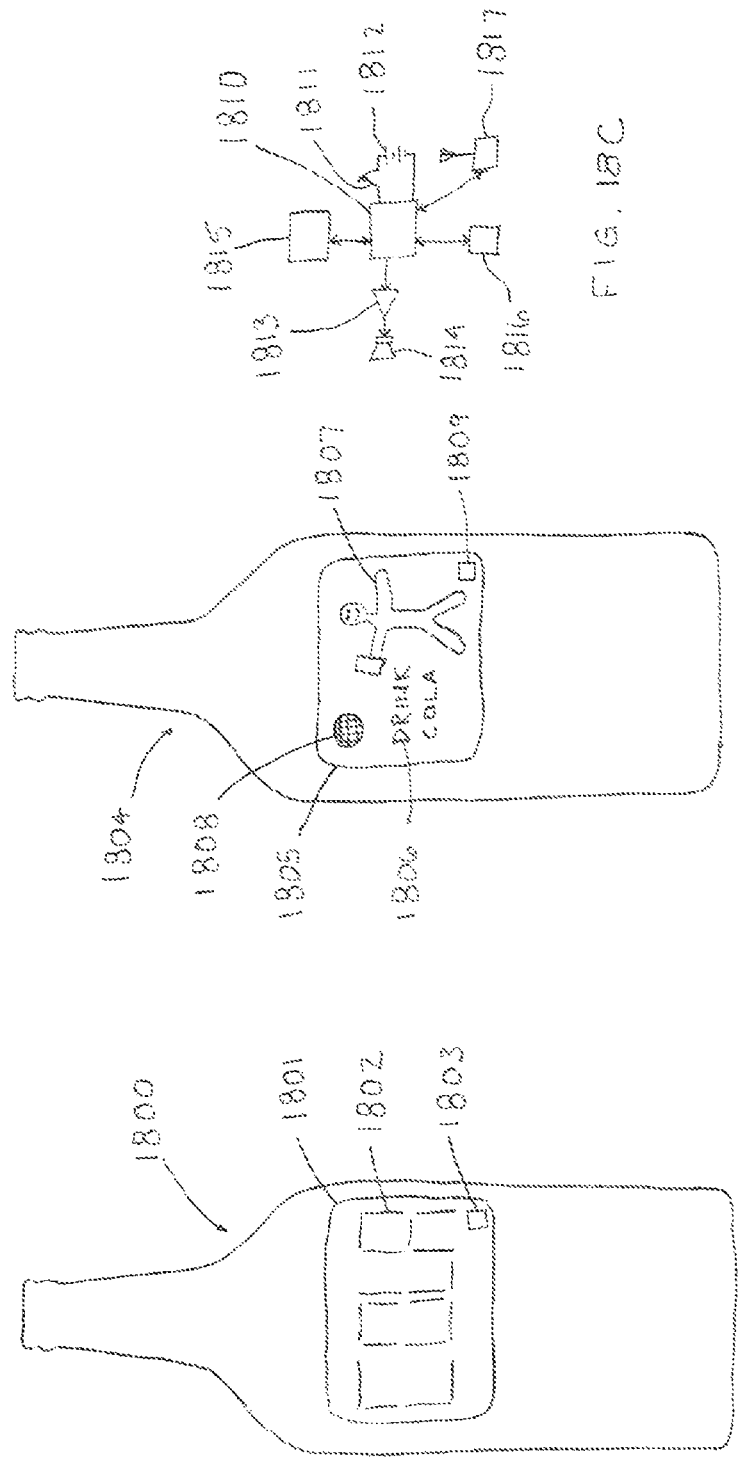

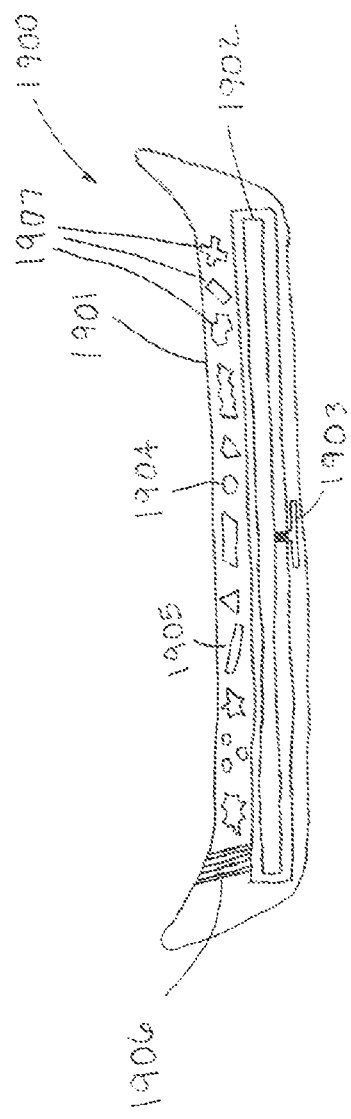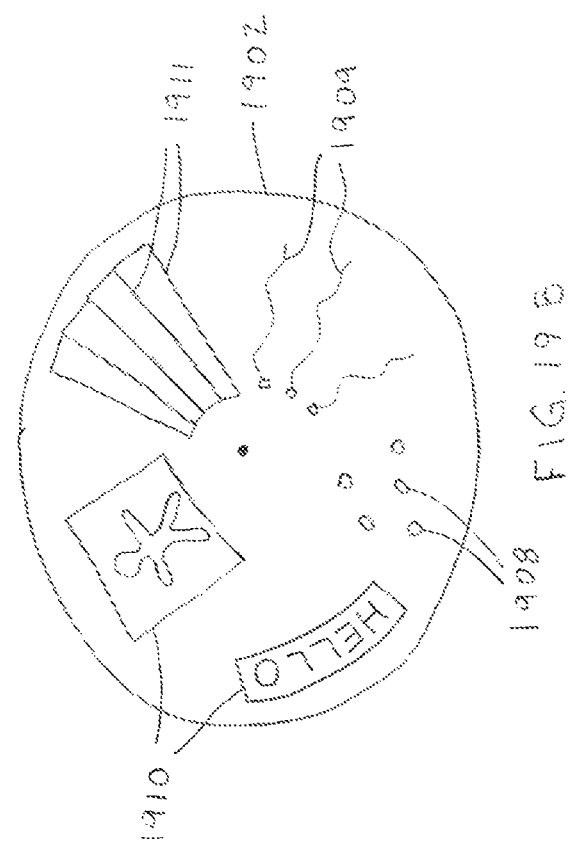
FIG. 19A
FIG. 19B

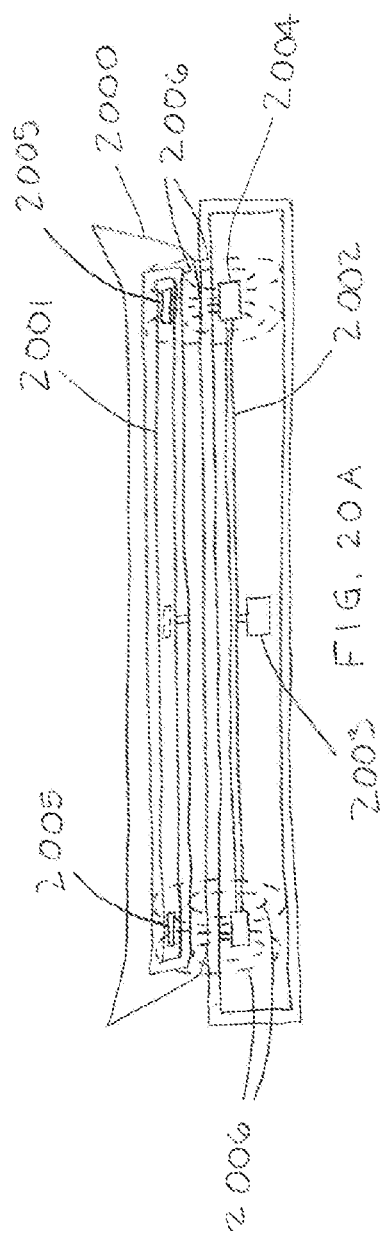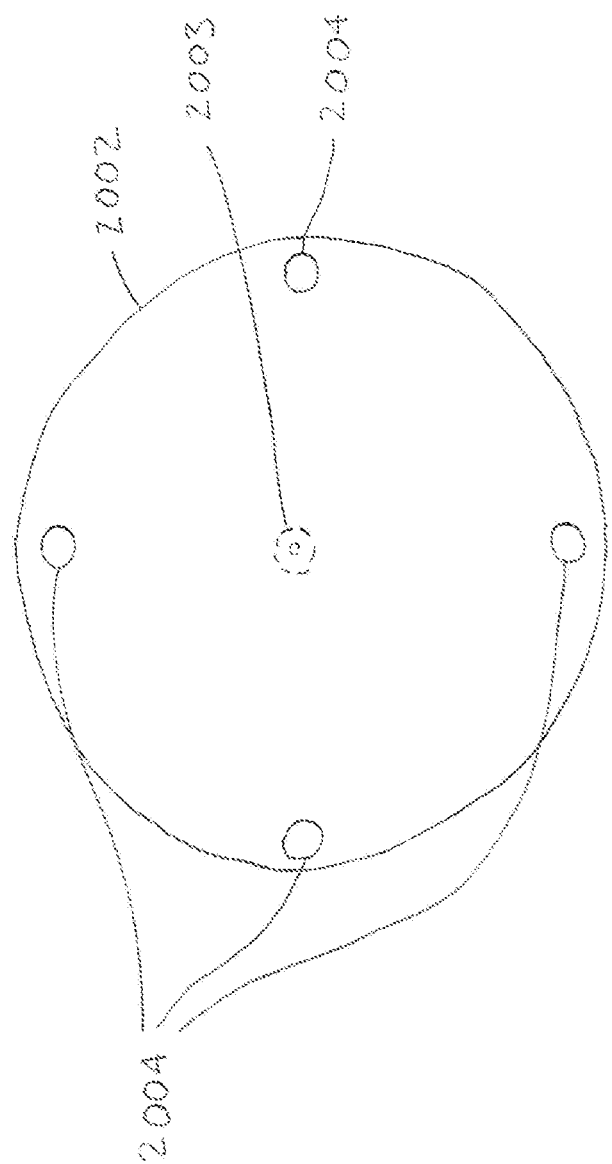

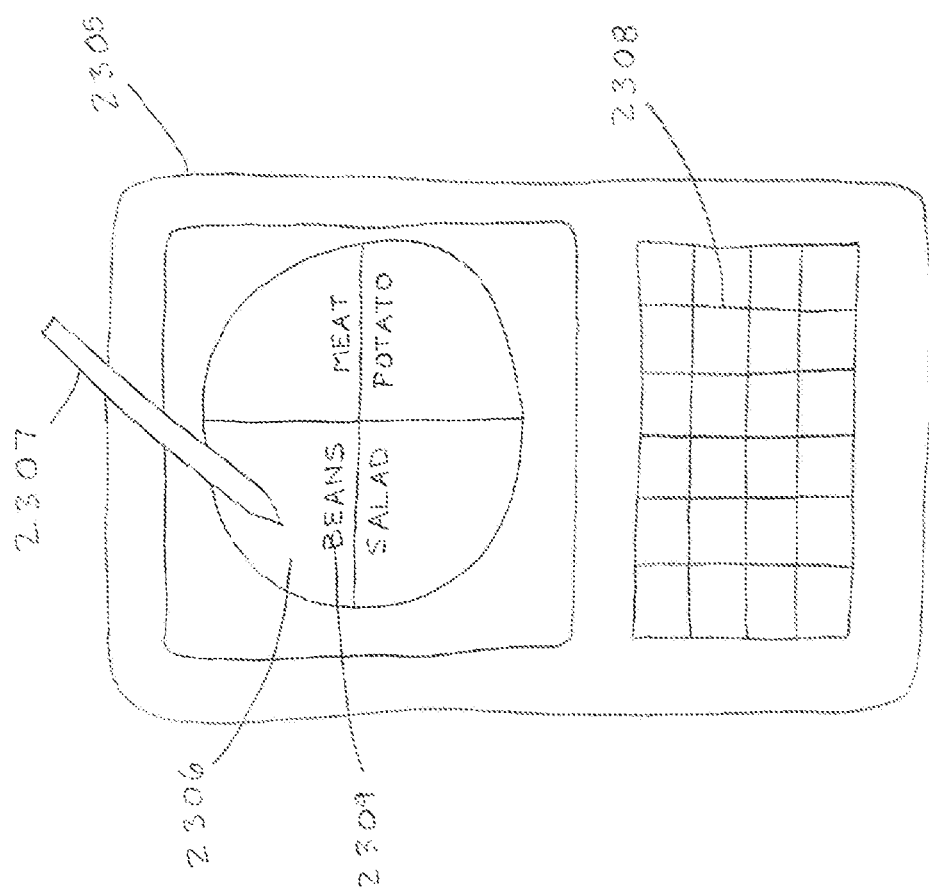

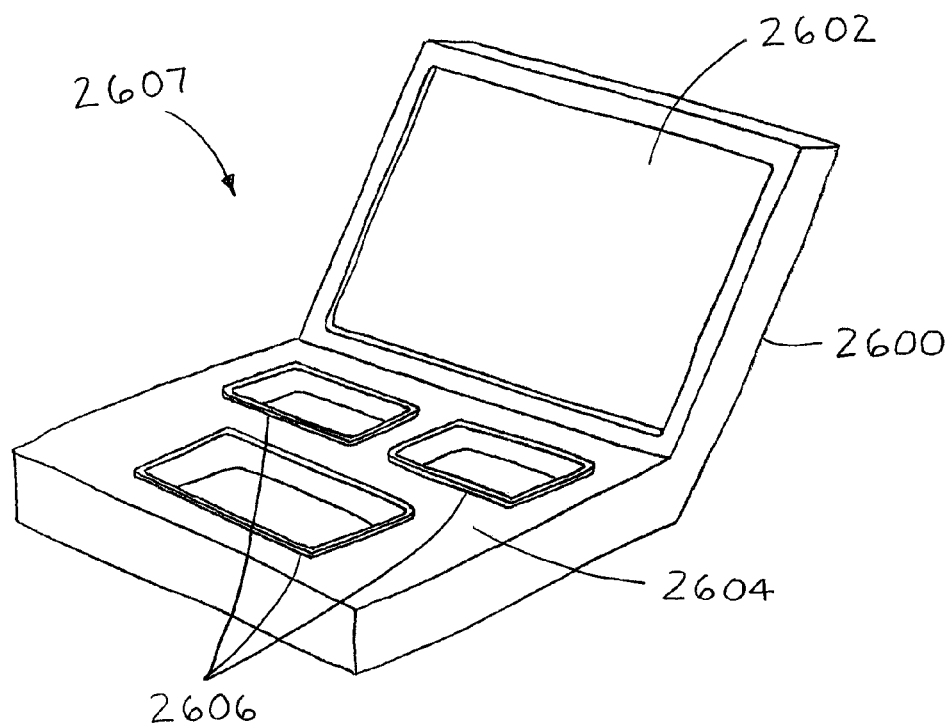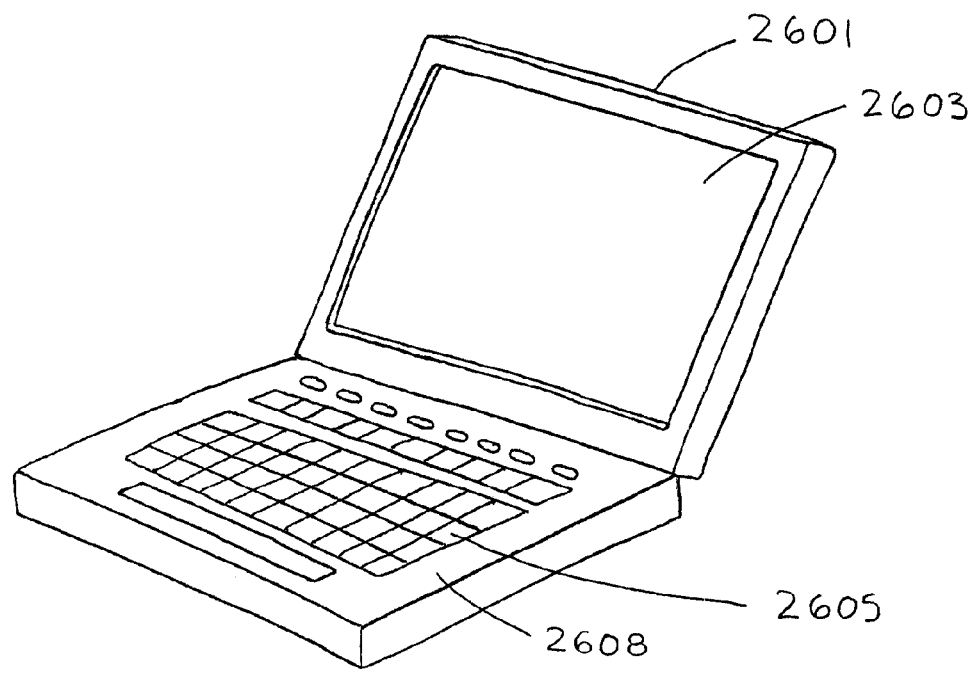
FIG. 26

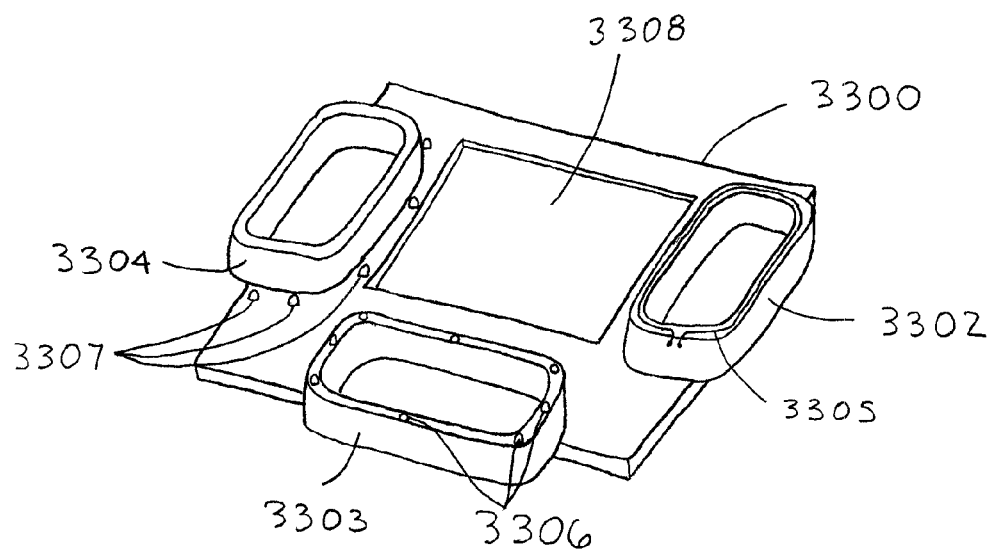
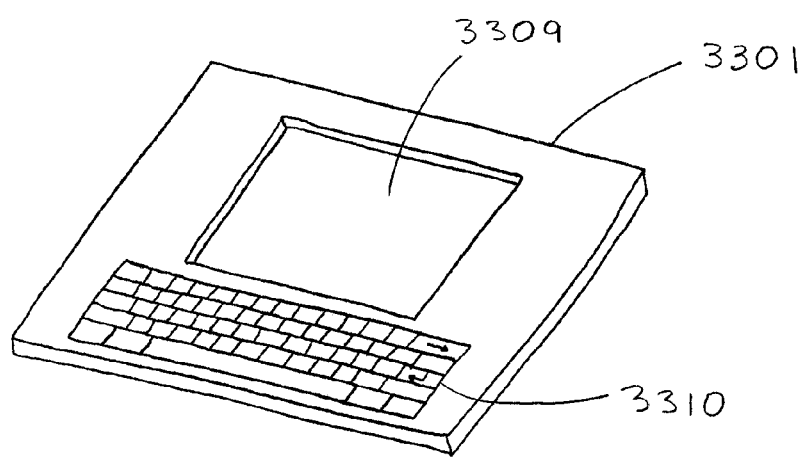
FIG. 33

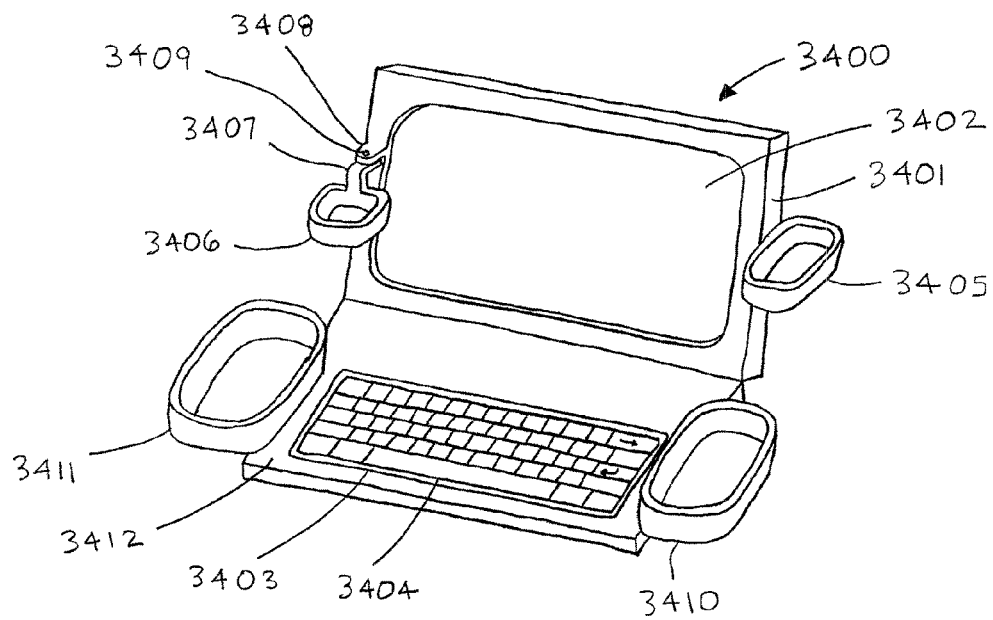
FIG. 34
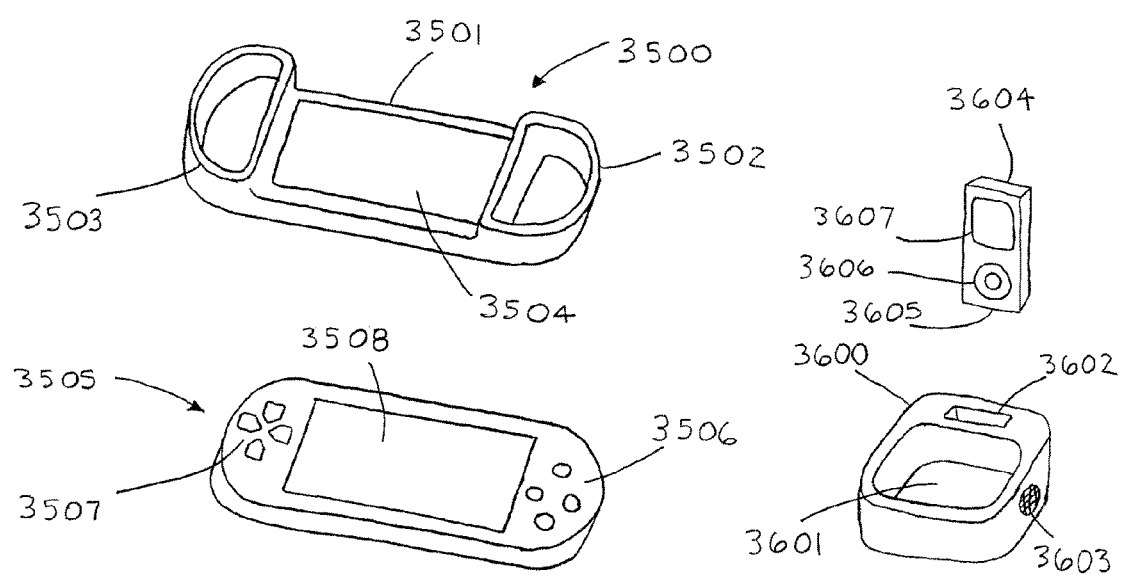
FIG. 35
FIG. 36

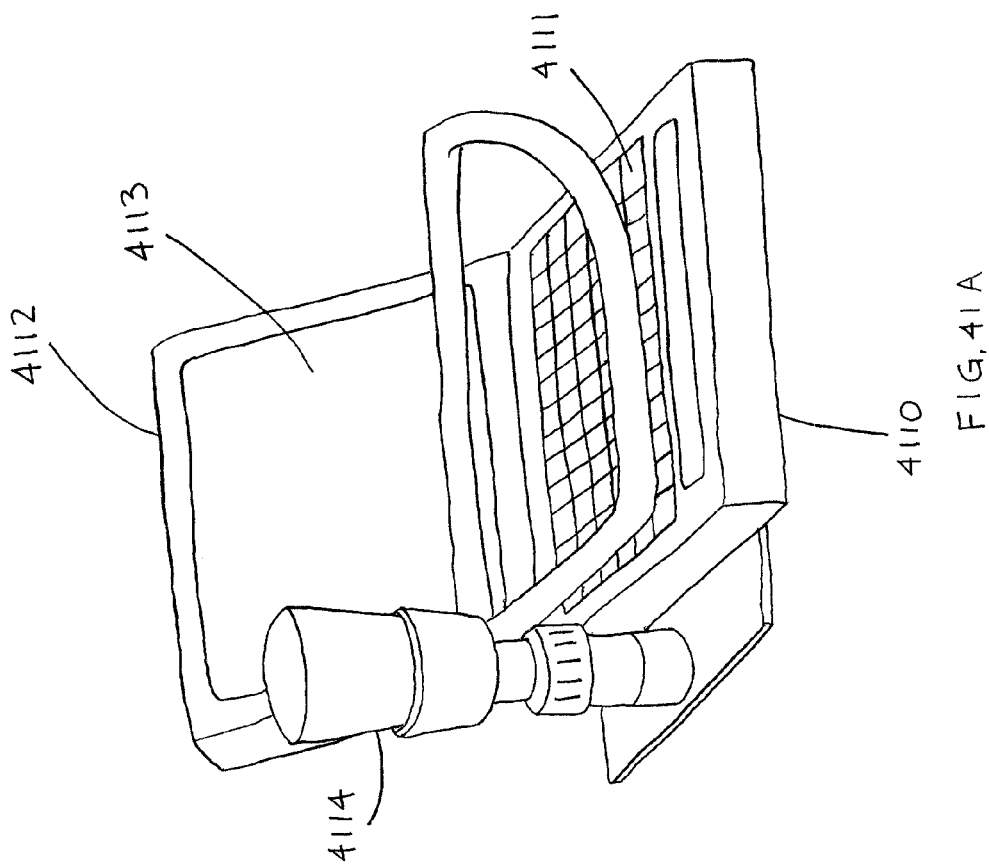
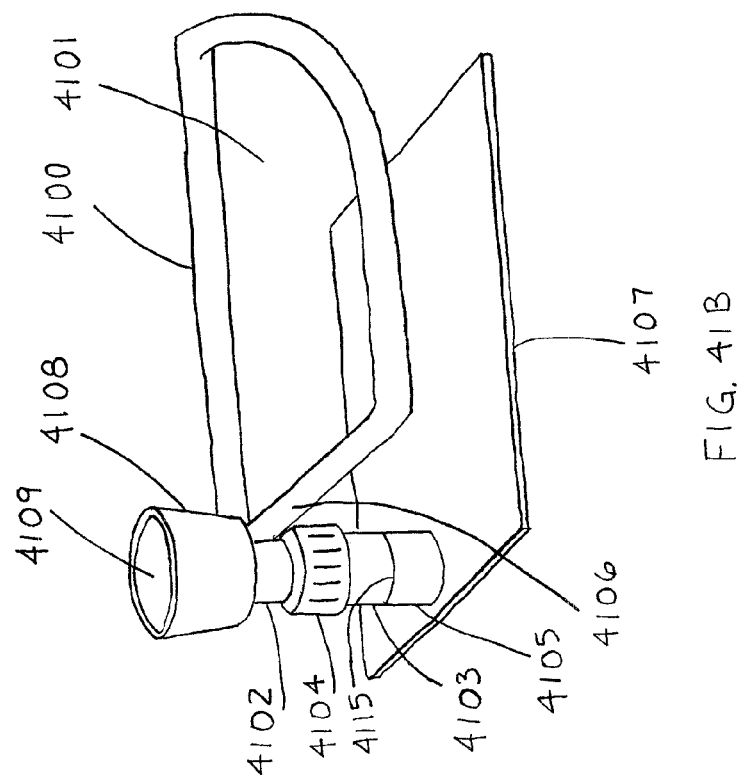
FIG. 41A
FIG. 41B

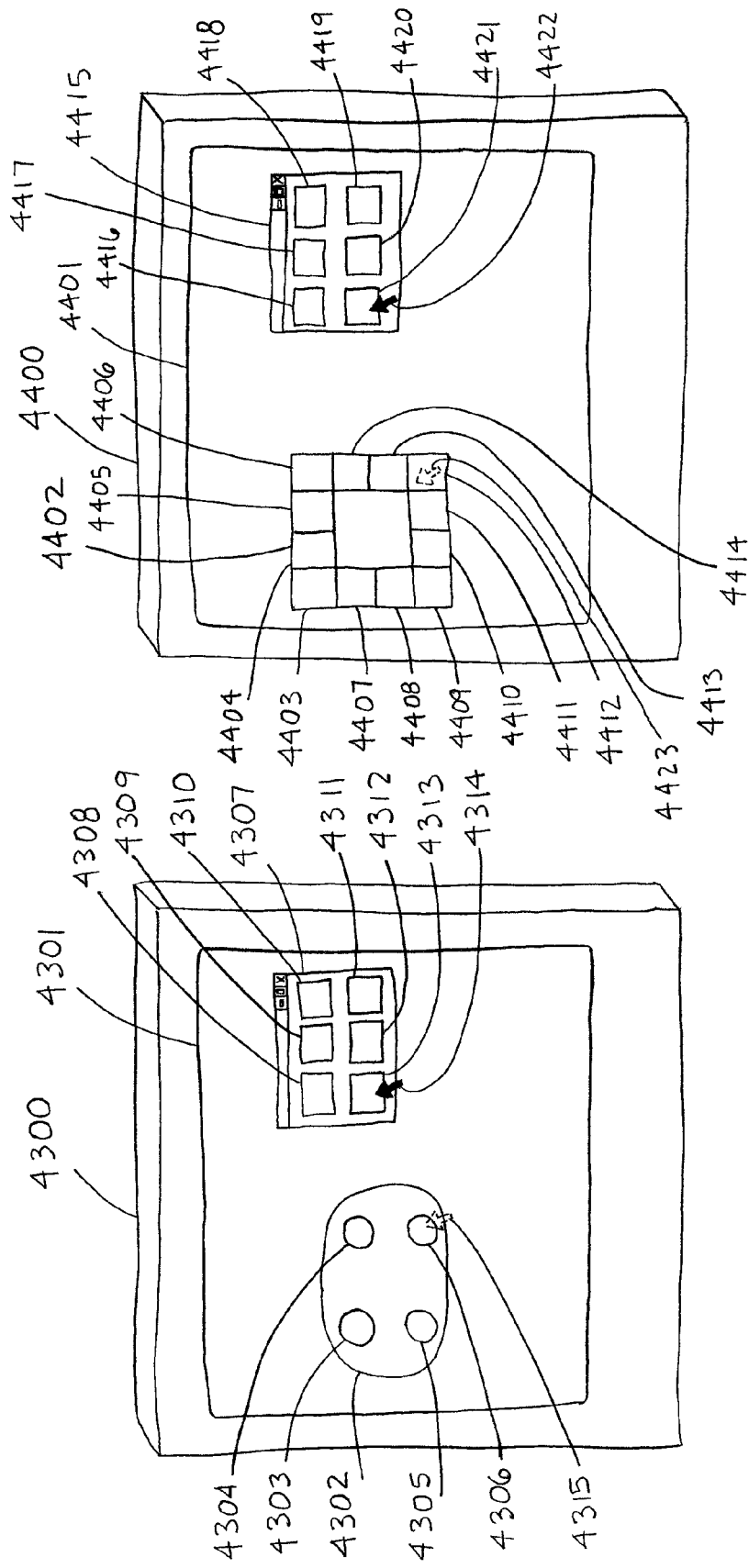

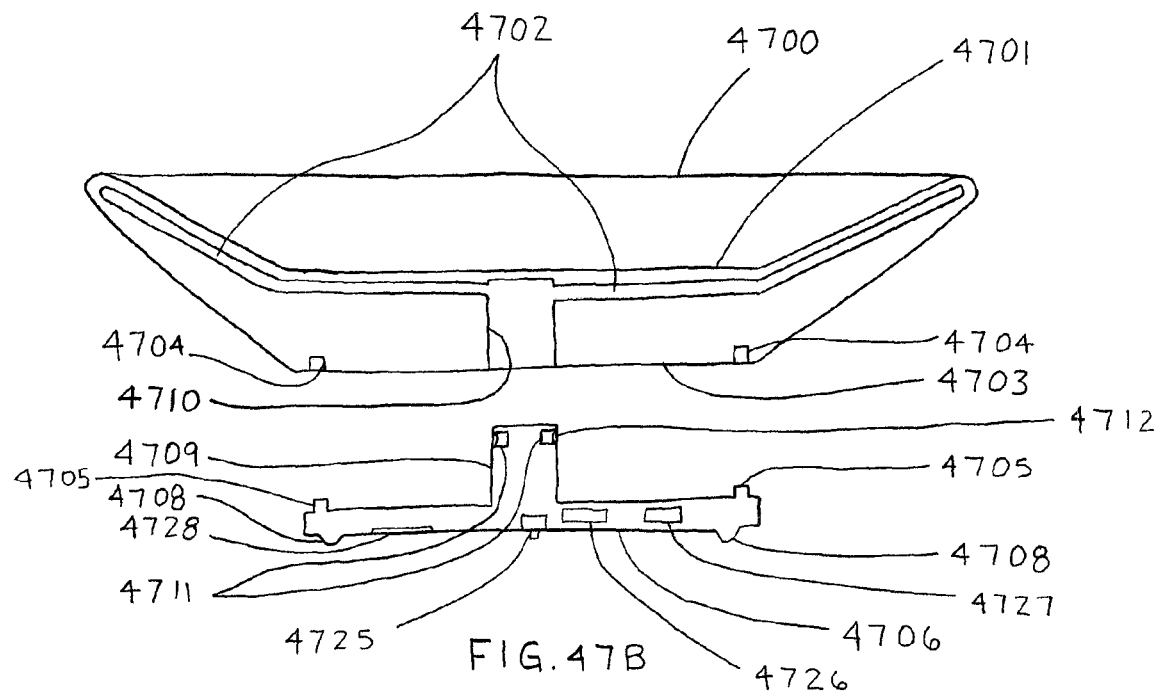
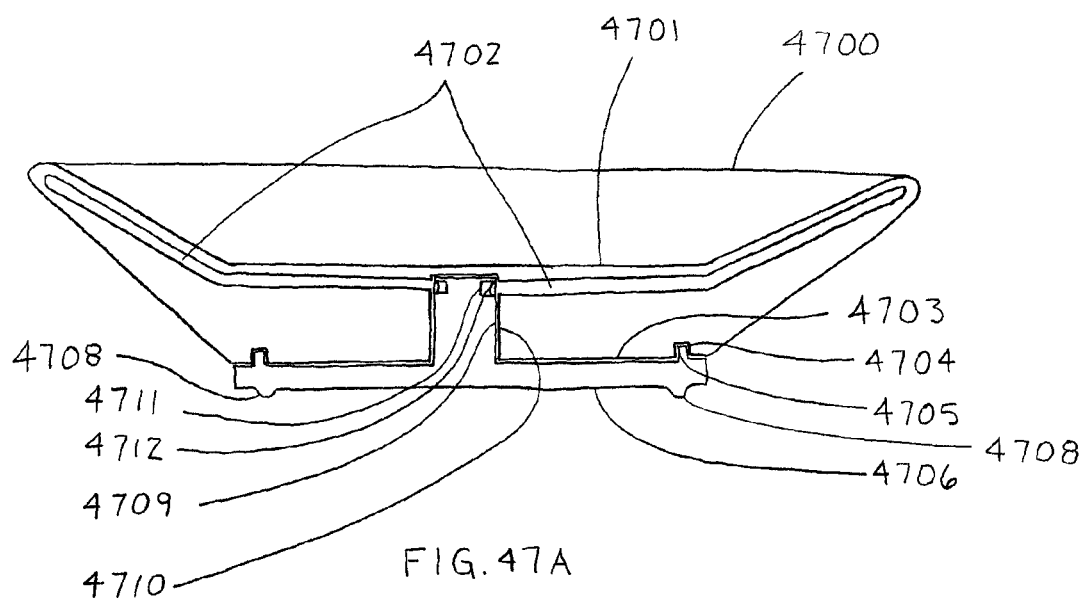

FOODWARE SYSTEM HAVING VISUAL-STIMULATING, SENSING, HEATING, AND WIRELESS-COMMUNICATION COMPONENTS

TECHNICAL FIELD

The field of this invention is devices associated with food presentation and/or consumption.

BACKGROUND

Much of our lives are spent consuming food, including beverages. Ingestion is the primary object. However, there are a number of situations where one wishes to have some additional experience with eating. With a number of people, one can have a conversation associated with the consumption. However, eating alone can be a solitary experience. We have all seen restaurants where the diners are involved in eating and watching television. Children can be recalcitrant when a parent is trying to feed them. To encourage children to eat, various plate designs have been used. Labels on containers are static and limited to having a printed design. Fast food chains have various dishes with graphic designs, such as the latest movie hero. In these situations the diner is involved with stimuli other than the food for different purposes. The other stimuli can involve entertainment, distraction, reward or the like.

For the most part the diner does not have control over what is being presented, as in the case of television, or the presentation is static and quickly loses its attraction, as in dining plate design. In addition, there is an interest in using the period of time in which the diner is eating to present information.

Also, there is an interest in providing dishware, utensils and beverage containers with attractive designs. At dinners, there is an effort to have the china, glassware, and utensils to be properly related to have an attractive table. On many occasions, one is celebrating an event or holiday where the decorations are related to the event or holiday. Having separate sets of china for each event is beyond the ability of most households to afford and store.

Furthermore, one is interested in providing dynamic flexible components, where the programs for the viewer can be readily changed, adapted to particular situations, and expanded, as desired. A personal computer ("PC") provides opportunities to devise programs that can be related to specific situations associated with dining. Even with the decreasing costs of computers, the computer is still a significant investment to be dedicated to a dining experience. Being able to use available data processing equipment without the investment associated with a dedicated instrument is advantageous. Marrying dishware with data processing equipment already owned by a user provides substantial economic advantages and encourages the combination of food presentation with a programmed data processor.

There are a number of devices that are found in non-analogous art and have found different purposes than providing a dining experience. For example, the game Pong, invented by Nolan Bushnell, was provided as a visual game to allow two players to compete in bouncing a virtual ball against a virtual wall. Such game could be produced in a table form where the players ostensibly could have had food that was supported by the table. However, the potential for food to be present existed, but the food was not associated with the game and the presence of food was incidental to the purpose of device. Other devices have been used to weigh food, such as a food scale. Conceivably, a food scale could have a processor for indicating the weight and allied information, e.g., units of weight, but any visual presentation is limited to weight and not to consumption of food.

An opportunity exists to provide devices associated with food presentation that provide more than support for the food and can be modified in relation to the needs of a particular situation.

RELEVANT LITERATURE

Garmaise, U.S. Pat. No. 5,678,925, describes a mug for sensing and indicating the temperature of its liquid contents. Tipton, U.S. Pat. No. 5,575,553, describes a container with light encapsulated in the sidewall for illuminating the sidewall. Crapio, U.S. Pat. No. 3,839,793, describes a utensil with exposed LED. Reber, et al., U.S. Pat. No. 5,969,606, describes a food storage container with humidity sensor. de Lange, U.S. Pat. No. 5,023,761, describes a utensil holder with light for illuminating the food at the working end of the utensil. Voskoboinik, et al., U.S. Pat. No. 5,485,355, describes cable-like electroluminescent light sources. Albert, U.S. Pat. No. 5,075,970, describes a sound-emitting utensil. Carson, U.S. Pat. No. 6,254,247 B1, describes a liquid container and method for producing a holographic image on the container.

SUMMARY OF THE INVENTION

The subject invention relates to foodware systems with single media or multimedia capabilities and optionally communication capabilities. Active foodware systems are provided producing sensory signals, particularly in recognizable formats, where the signals are initiated by an independent action, generally related to the food being presented. Such active foodware systems may also be associated with user input, such as verbal or contact, and can also be programmable. Typical active foodware system feedback will usually include at least one of visual, auditory and haptic feedback, employing optical sources, such as point light sources, images, and information; oral sources, such as microphones, speakers and voice synthesizers, allowing for verbal interaction and communication capability; and the like. The active foodware system may directly or indirectly provide the signals, where the active foodware system, particularly translucent plates or dishes, can be seated on an underplate having the indicated capabilities. Components of the devices include processors, memory, computer programs in the memory, power sources, feedback devices, speakers, fiber optic components, light sources, ports, and the like. In many instances when a light source is referred to as a light emitting diode (LED) the light source may be a laser diode. The active foodware system can have independent data processing and a monitor or be fitted to a laptop PC where the laptop monitor provides the visual presentation and data processing, analysis of signals obtained from the active foodware system and the opportunity to vary the visual presentation. The active foodware system of the subject invention has a multitude of uses, including but not limited to informing or entertaining the user/diner, and may display television signals, radio signals, music player signals, computer signals and the like.

BRIEF DESCRIPTION OF THE DRAWINGS

FIG. 2A is a plan view of a translucent square eating plate serving as a dining surface, a transmissive element and a support element, which eating plate is over a square underplate with LCD panel on its top. FIG. 2B is an end view of the translucent square plate over the square underplate. FIG. 2C is an end view of the square underplate with LCD panel on top.

FIG. 3B is an end view of a light fiber inside the body of the plate.

FIG. 5A is a cross-sectional view of a light channel in the plate of FIG. 6A. FIG. 5B is a cross-sectional view of a light fiber in a channel in the plate of FIG. 6B.

FIG. 6A is a top view of a plate with a light channel. FIG. 6B is a top view of a plate with a light fiber in a channel.

FIGS. 7A-7C are cross-sectional views of light fibers. FIG. 7A is a cross-sectional view of an unclad light fiber. FIG. 7B is a cross-sectional view of a light fiber with a portion of its cladding removed. FIG. 7C is a cross-sectional view of a light fiber with a portion of its wall etched or roughened.

FIGS. 9A-9D are plan views of plates with various active foodware system designs produced by one or more visual display technologies, such as light guides, light fibers, electroluminescent wire elements, LEDs, LCD panels, and the like.

FIGS. 10A-10C are three frontal views of an active foodware system container with a programmable moving image. FIG. 10D is a plan view of the container with image panel and circuitry components.

FIG. 14 is a plan view of an eating utensil (fork) with one or more active components, in this case, three light guides, an on/off switch, a battery and an electrical circuit.

FIG. 17A is a side view of a container with a label with one or more active components. In this case, one active component is a light fiber. Also shown are an LED, on/off switch and circuit. FIG. 17B is a cross-sectional view of the container of FIG. 17A with a label with one or more active components. FIG. 17C is a cross-sectional view of a container with one or more active components inside the wall of the container. FIG. 17D is a cross-sectional view of a container with one or more active components inside the container. In this case, one active component is a light fiber. FIG. 17E is a cross-sectional side view of the container of FIG. 17D with one or more active components inside the container. A light fiber is shown.

FIGS. 18A and 18B are side views of containers with labels with one or more active components. FIG. 18A shows a 7-segment display. FIG. 18B shows a more complicated label including an LCD panel and speaker. FIG. 18C is a block diagram circuit associated with FIGS. 18A and 18B. The circuitry is not shown on FIGS. 18A and 18B for clarity.

FIG. 19A is a side cross-sectional view of an active foodware system comprising a dining plate with a rotating component inside. FIG. 19B is a plan view of the rotating component of FIG. 19A. Additionally, the rotating component may comprise one or more active components. Among other things, the non-rotating portion of the eating plate may comprise one or more light guiding, light transmitting, light modifying or light distorting components.

FIG. 20A is a side cross-sectional view of an active foodware system comprising a dining plate with rotating component inside, where the dining plate is in functional relation to a dining plate base (also referred to as an underplate) with a powered rotating device magnetically coupled to the rotating component. FIG. 20B is a plan view of one example of magnetically coupled rotating device.

FIG. 23B is a plan view of a control pad for communicating information to the plate of FIG. 23A.

FIG. 26 is a perspective view of an active foodware dining surface computer cover and a laptop computer that the active foodware dining surface computer cover fits over.

FIG. 33 is a perspective view of a tablet computer and computer cover comprising three dining compartments, each exemplifying different feedback lighting.

FIG. 34 is an active foodware system in the form of a laptop computer with four dining surfaces: one to the side of the monitor, one capable of being swiveled in front of the monitor and two covering a portion of the laptop and to the side of the keyboard.

FIG. 35 is a gamepad with foodware cover.

FIG. 36 is a portable music player with active foodware docking dish.

FIG. 41A is a perspective view of an active foodware system comprising a portable computer and adjustable structure for positioning food and beverages in convenient proximity to the computer. FIG. 41B is a perspective view of the adjustable structure of FIG. 41A.

FIG. 43 is a computer monitor showing a graphical user interface for a computer program for communicating with an active foodware system.

FIG. 44 is a computer monitor showing another graphical user interface for a computer program for communicating with an active foodware system.

FIG. 47A is a cross section view of an assembled active foodware system including a passive plate with a dining surface and one or more light guides, and a removable active underplate with one or more light sources for emitting light into the one or more light guides of the passive plate. FIG. 47B is a cross section view of the unassembled passive plate and active underplate of FIG. 47A. FIG. 47C also shows an optional motor and rotating translucent film for affecting the emitted light before it reaches the one or more light guides.

DETAILED DESCRIPTION OF THE INVENTION

Figure 3A:
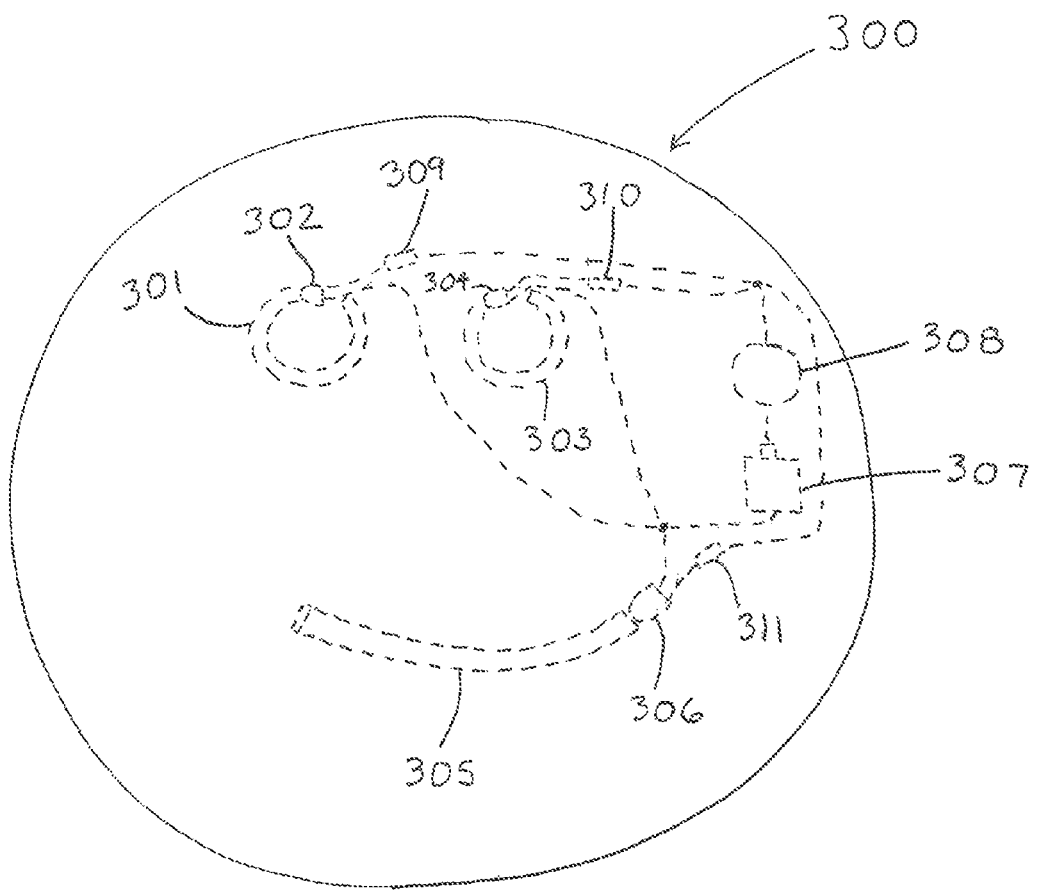
FIG. 3A is a plan view of a round eating plate with light guides, such as light fibers, and associated circuitry inside the body of the plate.

An active foodware system is provided that can afford single media or multimedia presentation. The active foodware system comprises devices that provide at least one of visual, auditory and haptic stimuli, usually at least visual, where the stimuli can be related to the food being presented. The active foodware system may comprise a power source, a device or devices for producing signals and may also include a device or devices for sensing and/or receiving signals and a processor for processing signals and/or data. The active foodware system may include all of the sensing and stimuli producing devices. The active foodware system may also include the circuitry to control the devices and perform the various activities provided by the active foodware system.

The active foodware system comprises as a central element a dining surface. The dining surface is equivalent to an eating surface and is the exposed surface of an eating or dining plate. The dining surface will be recessed as compared to a region surrounding the dining surface. The recessed surface serves to receive food and the surrounding region prevents spillage. In combination with the dining surface will be a mechanical structure supporting the dining surface.

Also as part of the system will be at least one of a sensing component, a stimulating component or a processor component; or the mechanical structure will have a form to separably receive a processor module. Typically, when the mechanical structure has a stimulating component as other than a software controlled graphical display below the dining surface, then light emanates from the dining surface or the mechanical structure is integral with the dining surface. When the sensing component senses weight, typically the stimulating component will include information other than information provided by a scale.

Typically one of the sensing, stimulating or processor components will be in functional relationship with a mechanical structure. These components may be attached, integral, molded or sealed into, encased, in contact with, connected to or otherwise directly involved with the mechanical structure. Alternatively, the mechanical structure may have a "space," where space includes a cavity, slot, opening, etc., for receiving a processor component, usually with the mechanical structure able to cover at least a portion of the processor component, particularly during dining.

The mechanical structure is intended to be supported by furniture, such as a dining table, desk, high chair, and the like, types of furniture that find use for dining, although not necessarily limited to dining. The furniture raises the mechanical structure to a level where dining is convenient with the mechanical structure, but may raise the dining surface to a level somewhat higher than the level at which one normally dines. The height to which the mechanical structure is raised will generally be about 2.5 feet or greater and less than about 3.5 feet, where the mechanical structure will generally raise the dining surface to less than about 1 foot above the support. In the case of a plate, the dining surface may be raised about an inch or less.

The active foodware system typically has a dining plate having an exposed dining surface for receiving and presenting food. Referring to a "dining plate" or "dining dish," the dining plate or dining dish typically includes any recessed relatively flat dining surface, deeper dining dish, dining bowl, and the like, where one typically uses a utensil or one's fingers to remove the food. It may also include a controller, such as a switch, control circuit, processor, etc. for controlling sensory stimulation or sensing components. Thus the active foodware system can appeal to various organoleptic characteristics. The stimulating and sensing components can be related to the food being presented, either directly or indirectly, such as presence of the food, consumption of the food, temperature, food menu, selection, etc., or providing attention-attracting stimuli, such as entertainment, information, educational presentation, promotional advertisements, etc., which can keep the diner interested and close to the food. The plate may be a unitary object that includes the dining surface, a light transmissive entity and a support member, where the latter may be the same structural element. Usually, the plate will be associated with a light generator that may be separate or be part of the same structural element. There can be one or more dining surfaces that are contiguous or separated. Each dining surface will usually be in close proximity or juxtaposition to one or more stimulating, e.g., transmissive, entities. Generally, the area under the dining surface will be light transmissive when the light generator is below the dining surface. Typically, the sensing component will be part of the mechanical structure.

Active foodware system components can include or be adapted to include a data processor and visual feedback display unit in an active foodware system. By designing an active foodware system component to fit the unit to form an integral structure, the resulting active foodware system has the flexibility of the unit in providing stimuli while at the same time presenting food to the viewer. Also, signals from the active foodware system component can be processed by the data processor and be used in providing the stimuli. The data processor and visual feedback display unit may be provided by a personal computer, such as a laptop computer with a monitor, or a game console. When the data processor and monitor are integral to other components of the active foodware system, other than a separable dining surface, the combined unit will be referred to as the "sensory unit." When the data processor and monitor are separable from the other components of the active foodware system, other than a separable dining surface, such other components will be referred to as the "separable sensory unit."

A subassembly of the subject invention employs a dining plate with an exposed dining surface and a connector to an external processor for controlling the stimuli. In this way, the subassembly can be sold as an individual entity separate from the processor, where the user may connect the subassembly to the external processor. By having appropriate components integrated with the plate in the subassembly, these can be controlled by the external processor when the subassembly is connected to the external processor.

For the purposes of this invention the "active foodware system" includes all of the components that serve as elements to present, store, utilize or consume food and provide sensory stimulation, sensing and controlling. The active foodware system includes foodware, such as dishware, utensils, containers, flatware, stemware, and ancillary devices used with such entities, such as cup holders. The active foodware system may comprise components or subsystems comprising individual components. A distinction will be made between physically separable and inseparable components and subsystems of the active foodware system. In the system there will be at least a dining surface, such as a dining plate, dining bowl or dining dish, from which food is consumed. The dining surface may be supported by one member of a place setting when in use. There is at least one active component that provides sensory stimulation. There may be one or more passive components. In describing the invention, those components generating or using electrical power will be referred to as "active" components and active subsystems comprise at least one active component. Each of the active components is active in employing electrical power to provide feedback to a user/diner and/or sensing user/diner input. Those components or subsystems that do not generate or use electrical power will be referred to as "passive" components or subsystems, respectively.

In referring to a processor, the processor may be programmable or non-programmable, e.g., hard wired, and there may be one or more processors. Programming may be accomplished with hardware or software. A programmable processor may be a central processing unit (CPU), microcontroller, microprocessor, digital signal processor (DSP), and the like, which is typically connected to ROM and RAM and has a software program in the ROM and/or RAM controlling the programmable processor's operation. The processor may also be a Programmable Logic Array (PLA), Field-Programmable Logic Array (FPLA), Programmable Array Logic (PAL), and the like. The processor will provide for receiving signals from sensors and outputting stimuli of the active foodware system. The processor can be part of an existing system, particularly a commercially available system, having in addition to the processor a graphic display and optionally one or more ports for connection to electronics of the mechanical structure. Such existing systems include generically laptops, where "Laptops" refers to the family of laptop computers, tablet computers, handheld computers, intelligent mobile terminals, and the like. The existing systems also include generically gamepads, where "Gamepads" refers to gamepads, game consoles, and the like. As exemplary are the Sony PSP®, Sony PlayStation® Game Console, Microsoft Xbox®, etc.

The active foodware system may also include sensing capability. Sensing may involve sensing components, including but not limited to contact sensors, touchscreens, motion sensors, proximity sensors, temperature sensors, moisture sensors, pressure sensors, light sensors, sound sensors and the like. The sensing capability may be associated with food characteristics, such as weight, position, center of mass, temperature, movement, color, reflectivity, opacity, size, density, volume, etc.

Stimulation directed to the diner can provide encouragement to eat, rewards for eating, minatory messages, educational messages, information, directions concerning food selection, etc. A portion of the dining surface may have access reversibly blocked. For example, access to dessert may be blocked until the active foodware system senses that the other foods have been eaten.

Other forms of stimulation may include heating of the plate and food, e.g. a heating element in the plate, color patterns, pictures, photographs, etc. For visual stimulation, a light generator is employed. The light generator may take various forms, such as an LCD, LED, electroluminescent wire, fluorescent light, plasma display, neon light, incandescent light, optical fiber, light channel or tube, CRT, etc. When referring to a light generator as a component of a system, the associated video processing, interface and circuitry is inherently included if not explicitly included. When referring to a light generator as a component of a system, the light generator may also include a touch screen, even if not explicitly shown.

The active foodware system can include utensils and vessels with the dining plate. The different components of a place setting may each provide stimulation and sensing and may communicate with each other and a user of the active foodware system. For example, one can provide that the proximity or contact of a utensil to the dining plate can result in encouragement to bring the utensil to the food on the dining surface and recognize when the utensil is moved away from the dining surface.

In distinguishing the subject invention devices from a food scale, the scale is limited to provide solely information about the weight of the food, such as the weight, the units, e.g., grams, in which the weight is presented, cost, and the like.

The active foodware system may be used in a restaurant and provide a food menu, which may be hierarchical. Such an active foodware system may display an image of various food options on the dining surface as the food would actually look if ordered. The active foodware system may allow diner input, ordering and payment, for example, by sensing contact with the plate or voice input. A diner's order on the active foodware system may be automatically directed to the kitchen.

Of particular interest are dining plates, which can be used for presenting food, particularly with conventional or active utensils and drinking receptacles, for demonstration of various designs, for providing information or entertainment, etc. The dining plate will usually be the center of the active foodware system involving most, if not all, of the stimuli to the user/diner.

The dining plates may be active systems or subsystems and have all or some of the circuitry and stimuli producing devices contained in the dining plate. For example, by molding an upper or lower layer of a dining plate having compartments and channels for housing the devices and connecting the devices, the various devices may readily be placed in their appropriate positions and relationships and connected accordingly. One may then seal all of the devices with potting compound, epoxy, fiberglass, and the like, to protect the devices and connectors from moisture. A complementary layer, e.g., undercover, can be attached while the sealant is curing, so as to be bonded to the sealant and provide for an attractive dining plate, e.g., an attractive underlayer. Alternatively, one may provide for a channel proximal to the edge of the dining plate with an underlayer having a ridge fitting into the channel. By having a sealant in the channel or on the ridge, fitting the ridge into the channel will hermetically seal the upper and lower layers to form the dining plate. The design will allow for chambers, leads or the like at the periphery of the dining plate for connection to other components, such as batteries, antennae, etc. A compartment can be provided at the periphery for receiving a battery that would be in operative connection with the internal devices through leads, pads, etc., that can be made of corrosion resistant materials, to allow for washing of the dining plate after removing the battery.

The manner in which the upper and lower layers of the plate are sealed is to provide for a water resistant seal. In this way the dining plate can be washed and the devices and circuitry between the layers are protected from corrosion. By having an external power source or providing for a sealed compartment for receiving a power source, one can provide an integral plate that only lacks the power source, but can be connected with the power source when in use.

The dining plate unit may have an upper dining plate, of which at least a portion is translucent, and an underplate having the various devices for the stimuli or sensing. Such translucent plate would include the dining surface, a transmissive entity and further serve as a support structure for the dining surface. The translucent plate can be glass or various plastics, such as polycarbonate, PVC, Plexiglas, polyethylene, polypropylene, poly-4-methylpentene-1, Delrin®, etc. The translucent plate may be readily molded and typically will be relatively thin to allow for efficient transmission of light from the underplate. Thicknesses in the range of about 1 to 10 mm may be employed. In addition, various designs may be incorporated into the translucent dining plate to cooperate with the stimuli emanating from the underplate.

The foodware system may be capable of communicating data, such as sending data or receiving downloaded data, such as video files, movies, pictures, designs, audio files, computer programs, etc. The data communication may be done offline or streamed in real time. The data communication may be via a wired or wireless link. The data communication may be from or to a website. The data communication may be from or to a server computer. Data communication may be from or to a peer-to-peer network. Data communication may be via any convenient protocol, including http, https, ftp, and the like. The active foodware system may accept external hardware media such as DVDs, CDs, memory sticks, floppy disks, hard drives and the like, where the content may be seen and/or heard on the active foodware system. By having ports, connectors, transmitters or receivers for receiving external signals that can then be presented as stimuli, the active foodware system provides great flexibility. Thus, the active foodware system can be self-contained or rely on external devices to provide signals which are then presented to the user/diner.

The data received by the active foodware system can be utilized in different ways depending upon the type of received data. Typically, if the data is a picture file format, the active foodware system will display a digital image; if the data is a movie or video format, then the active foodware system will display movie or video; if the data is a haptic feedback file format, the active foodware system will provide haptic feedback; if the data is an audio file format, the active foodware system will play sound; and if the data is a computer program, the active foodware system will run the program. However, one type of data may be converted into a different stimulation; for example, an audio format may be converted into a haptic format and/or visual format or may be used to augment a visual image.

By "image" is intended a representation formed by light emission at different sites, usually of other than a simple geometric form. For the most part, the image will be formed by a plurality of light-emitting sites. Light-emitting sites may be obtained with one or more electroluminescent elements, a plurality of LEDs, an LCD display, a fluorescent display, a plasma display, a plurality of incandescent lights, and the like. Simple geometric forms include circles and various regular polygons of from 3-4 sides, such as triangles, squares, and rectangles.

The active foodware system may comprise a mechanical structure having a dining surface and comprising any one of a stimulating component, a sensing component and a processor component, with the component being in proximity to the dining surface, with the dining surface being recessed in relation to a region surrounding the dining surface, with the dining surface being recessed for receiving food and preventing spillage from said dining surface, and in the event that the stimulating component is a visual stimulating component, (a) the visual stimulating component has a plurality of sites that emit light that produces other than a single simple geometric form, or (b) the visual stimulating component is sealed in the mechanical structure.

The active foodware system may also comprise: a dining surface, where the dining surface is recessed in relation to a region surrounding the dining surface, where the dining surface is recessed for receiving food and preventing spillage from the dining surface, and in combination with the dining surface, further comprising a mechanical structure for supporting the dining surface, and (1) in functional relationship to the mechanical structure, any one of the following functioning while dining: a sensing component, a stimulating component and a processor component, with the proviso that (a) when the mechanical structure has a visual stimulating component and the stimulating component is other than a software controlled graphical display, either (i) light emanates from the dining surface from a plurality of sites that emit light that produces other than a single simple geometric form, or (ii) the visual stimulating component is sealed in the mechanical structure or (b) when the sensing component senses weight, the stimulating component includes information other than information provided by a scale; or (2) the mechanical structure has an adjustable support structure, a horizontal dining platform for supporting food in a raised position, while a keyboard is positioned at least partially under the dining platform, at least a portion of the dining platform being translucent to permit viewing at least a portion of the keyboard during dining.

Typical active foodware system visual displays include light guides (such as optical fibers, electroluminescent light sources, light channels in the active foodware system material, light tubes, and the like), liquid crystal displays, light emitting diodes, laser diodes, plasma displays, fluorescent lights, fluorescing fluids, incandescent lights, and the like. The active foodware system may include haptic feedback, including but not limited to vibrotactile feedback, tactile feedback, electrocutaneous feedback, and force feedback, so the user/diner may feel desired vibrations, jolts, impacts or movements of the active foodware system. A useful vibrotactile feedback element is a rotating motor with eccentric mass, such as is found in vibrating cell phones. Typical auditory feedback displays include voice-coil speakers, piezoelectric speakers, and the like, including speakers and sound-generating elements used in cell phones.

The active foodware system may accept wired or wireless input that affects the visual, auditory or haptic display of the active foodware system, such as signals from a data processor. For example, the active foodware system may accept voice input, wired or wireless mouse input, wired or wireless peripheral device input. Games may be played using the active foodware system where the active foodware system dining plate comprises a visual feedback display. The active foodware system may have built-in controls for controlling the displayed content, providing game control input, communicating with other active foodware systems, and the like.

Embodiments of particular interest include having a passive or active component or subsystem comprising the dining surface that interacts with a separable active component or subsystem. For example, one may have an underplate as an active subsystem under a dining plate having a dining surface. Such underplate may rest on a table, be part of a table or be affixed to a table. In one embodiment, at least a portion of the dining plate is translucent while the underplate transmits visual sensory stimulation through the translucent portion of the dining plate. Another example, is the use of a data processor, e.g., laptop computer, and visual feedback display, e.g., monitor, that fits with a subsystem comprising a dining surface. The subsystem optionally includes a sensor for sensing changes in the amount of food present and provides feedback. One can also provide for recognition by the data processor of a unit of food related to an average amount per intake and have the sensor recognize when the change in the amount is unrelated to an average intake, e.g., where the food is discarded.

One may be interested in sensing the position of food on the dining surface. Various technologies that may be employed as the sensing component include infrared emitters/detectors, cameras, including CCD cameras, touch screens, pressure and weight sensors, ultrasonics, radar, temperature sensors, lasers, proximity sensors, and the like. Depending upon the technology, the different entities would be positioned in different known ways in relation to the dining surface. A signal from the sensing component may be transmitted to a stimulating component to modulate the stimulation. The sensed information can be used in a variety of ways by the active foodware system. For instance, if it is detected that while a child is eating, food is being moved about the dish rather than being consumed, the parent may be notified or the stimulation to the child may be altered. The parent may be notified by phone, email, pager, auditory signal, etc. In another embodiment, designs, both colors and patterns, displayed at the dining surface may be varied. Attractively, one could have simulated electrostatic patterns related to the position of the food.

One item of an active foodware system may communicate information with another item of an active foodware system. An active foodware system fork may communicate its movement to an active foodware system dining plate of the same user/diner or the active foodware system dining plate of a different user/diner. A computer which typically is not in physical contact with the active foodware system may communicate with the active foodware system in real time or offline.

Active foodware systems may include corded telephone technology, cordless telephone technology, walkie talkie technology, mobile/cellular telephone technology, internet access, web searching technology, and the like.

Advertisers may combine promotions with active foodware systems. For example, a fast-food store may provide active foodware system cups, dining plates and/or utensils with moving and/or talking movie characters or interactive games on them.

The subject active foodware system serves to provide an enhanced dining experience. One can present to a diner a visual, aural, haptic or other sensory stimulation to enhance the dining experience. A dining surface is maintained in proximity to a stimulating component. Of particular interest is to have a processor to communicate with the stimulating component to provide the desired stimulation. The method comprises presenting food to a diner on such dining surface; running a computer program on a computer with instructions for selecting at least one active foodware system; transferring data from the computer memory to the processor; and depending upon the type of the data, displaying, playing or operating the data, in conjunction with a member of the active foodware system, such as a dining plate or underplate. The selected member will have a receiver for receiving and storing the data. One may also select data from a data source to be included in the data transferred to the active foodware system member. In this way, stimulation may be provided during the consumption of the food. The stimulation can be related to the food and its consumption, providing information about the food, its preparation, its characteristics, etc.

Of particular interest is sensing the weight of the food on a dining surface. Visual or auditory stimuli in relation to the weight of food sensed can be provided. Auditory signals may be provided that relate to the consumption of the food and provide rewards, instructions, etc., in relation to such consumption.

The subject invention is further described in detail hereunder referring to the embodiments provided in the drawings.

Figure 1A:
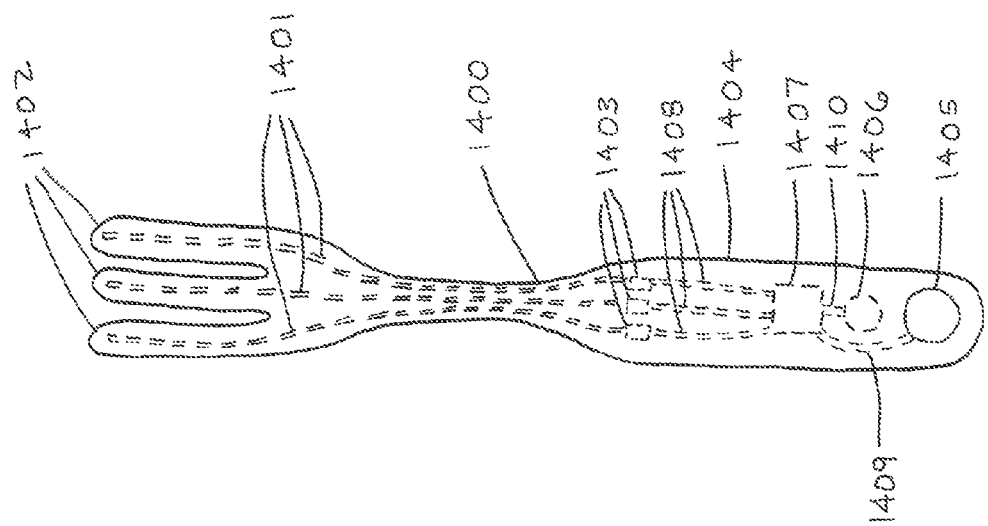
FIG. 1 is a perspective view of a child using an active foodware system, such as a plate, fork and cup.

FIG. 1 shows a user/diner 100 seated at a table 101 using a variety of active foodware system items, including an active dining plate 102, an active fork 103 and an active cup 104. Only these three active component examples are shown in the figure; however, many different items used to eat, drink, contain, serve, support, pour, store, prepare, hold, and mix food, when comprising active or passive components, may be considered as active foodware systems according to the subject invention. For clarity, the active dining plate 102 does not have any food on it. Such active component may comprise one or a multiplicity of a variety of active sensory stimulating and sensing components. Visual sensory stimulating components include but are not limited to light emitting diodes (LEDs), optical fibers, optical tubes, electroluminescent light sources, optical channels, liquid crystal display (LCD) panels, incandescent lights, fluorescent lights, fluorescing fluids, and the like. Such active foodware system may comprise one or a multiplicity of auditory sensory stimulating components, including but not limited to voice-coil speakers, piezo-electric speakers, and other sound generating components. Such active foodware system may comprise one or a multiplicity of sensing components, including but not limited to contact sensors, touchscreens, motion sensors, proximity sensors, temperature sensors, moisture sensors, pressure sensors, light sensors, sound sensors and the like. Such active foodware system may also comprise one or a multiplicity of haptic feedback components, including but not limited to tactile, vibrotactile and force feedback components to provide tactile and force feedback to the user/diner. Such active foodware system may provide a multimedia dining experience to the user/diner.

FIGS. 2A-2C provide one embodiment of the subject active foodware system invention where an LCD screen is positioned in functional relation to a dining plate surface, in this case under the dining plate. This embodiment provides a rectangular active foodware system 213 comprising an active underplate or active underplate subsystem 201 with LCD visual display 202 and a passive eating plate 200 with at least a portion of the top surface 212 being translucent to allow viewing of at least a portion of the information provided by the visual display 202. The passive dining plate 200 may be attached to the active underplate 201 or left unattached. FIG. 2A is a plan view of the passive dining plate placed over the active underplate. FIG. 2B is a side view of the passive dining plate 200 above the active underplate 201. FIG. 2C is a side view of the active underplate. The passive dining plate 200 may contact the table via supports 210 where the active underplate is accessible via openings 211 between the supports 210. Alternately, the passive dining plate may be supported by the active underplate and not contact the table surface directly.

The active underplate 201 of FIGS. 2A-2C comprises a processor 203 which generates a display control signal that is used by the display amplification circuitry 214 to drive the visual display 202. The interconnections are not shown here in FIGS. 2A-2C, but a general functional block diagram is provided later in FIG. 13. The electrical details are known to those skilled in the art. The active underplate 201 further comprises battery 204, electrical adapter/battery charger connector 208, speaker 207, on/off switch 206, external media slot 205 and data adaptor 209. The external media slot 205 may accept any of a variety of past, present or future media, including but not limited to CDs, DVDs, floppies, tape, memory sticks, and the like. The data adaptor 209 represents one or a multiplicity of port connectors for a variety of wireless and wireline data, and may be a USB connector, Firewire connector, serial connector, parallel connector, infrared connector, electromagnetic connector, and the like. In FIGS. 2A-2C, data adaptor 209 and electrical adaptor/battery charger connector 208 are optionally obstructed by supports 210 for safety reasons to prevent wired connection during dining to any device that might present an electrical hazard if a liquid were spilled on the wire or connection during dining.

FIG. 3A is a plan view of one embodiment of the subject invention where a visual display is made up of light guides, such as light fibers, electroluminescent light sources, light tubes, light channels and the like being placed in functional relation to a dining plate. In this embodiment, representations for two eyes and a smile are illuminated by light guides. The left eye comprises light guide 301 and associated LED 302; the right eye comprises light guide 303 and associated LED 304; and the smile comprises light guide 305 and associated LED 306. FIG. 3A also shows a power source 307, on/off switch 308 (such as a single pole, single throw switch), electrical resistors 309, 310, and 311, along with the interconnections. The embodiment as shown provides a very simple circuit where pressing the on/off switch illuminates the LEDs and their associated light guides. In a more complicated embodiment, a processor may be used to provide more sophisticated lighting effects. Electrical circuits to provide a wide variety of lighting effects are well known by those skilled in the art.

The power source 307 may be a battery, and may be rechargeable and may be replaceable. The battery may also be manufactured into the plate such that is cannot be user replaced. If rechargeable, the battery may be removed and recharged. Alternatively, the battery may be left in the plate and recharged via a connector (not shown) on the plate. If it is desired to not have any openings or connectors to the plate, the battery may also be associated with a transformer (not shown) in the dining plate so it can be inductively charged via an external electromagnetic field, such as provided in FIGS. 37A-37D. The battery may also be associated with a photovoltaic cell (not shown) in the dining plate which charges the battery using light.

The lighting power source, circuitry and/or one or more lighting components may be removable. The lighting components and circuitry may be located inside the material of the dining plate or positioned below the dining surface. In such cases, enough of the material between the dining surface of the dining plate and the lighting component(s) should be translucent to permit at least a portion of the light escaping from the lighting component(s) to be viewed by the user/diner. The dining plate may be manufactured from typical dining plate materials, such as China, glass, ceramic, plastic, porcelain and the like. Translucent portions of the dining plate are made from any hard non-toxic translucent material, such as glass, plastic and the like. Translucent liquids may also be encapsulated between the light source and surface of the dining plate.

FIG. 3B is a side view of the dining plate of FIG. 3A where only the light guide 305 and associated LED 306 producing the smile are shown for clarity, and which in this case are located inside the material of the dining plate.

Figure 4A:
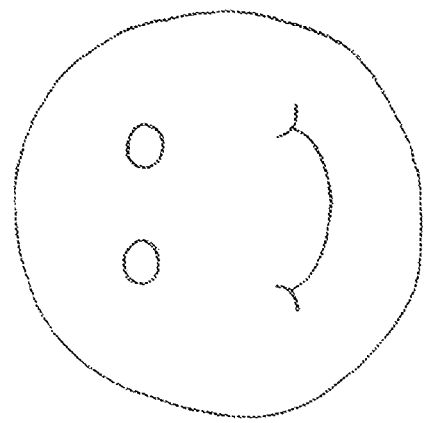
FIGS. 4A-4D are examples of simple designs which may be made by embedding light guides into a plate with translucent top surface. Each line shown inside the periphery of the round plate represents a portion of a light guide.
Figure 4B:
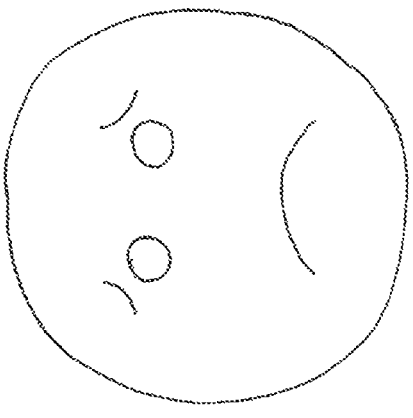
Figure 4C:
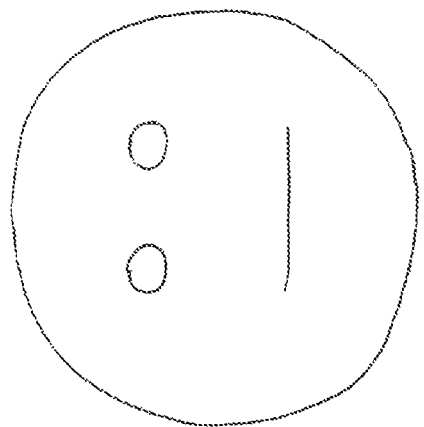
Figure 4D:
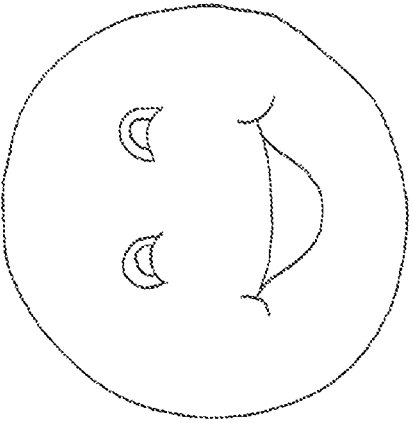

FIGS. 4A-4B are various dining plate designs that can be easily produced using the light guide embodiment of FIGS. 3A and 3B. Multiple light guides may co-exist in a single dining plate and be selectively activated to provide the illusion that the face is changing expression. In FIGS. 4A-4B, the lines making up the eyes and mouth may be produced using one or a multiplicity of light guides per facial line.

FIG. 5A is a cross-sectional view at section 5A-5A of the dining plate 500 of FIG. 6A. There is a channel 501 in the dining plate for directing and diffusing light from light source 502 on its way to the reflective surface 507. Light may be reflected internally or the light may refract. The refracted light that escapes the surface of the dining plate may be viewed by the user/diner. The diameter of the channel may be selected so that a desired amount of light escapes the channel for viewing by the user/diner. The surface roughness and optional coatings may also be selected to determine the amount of light that escapes the channel. Such augmentation of the channel may be graded to provide a desired intensity of glow along the channel by the user/diner. For example, it might be desired to have the ends of the channel emit more light, i.e., glow more, than the middle, or vice versa, or it might be desired to have a uniform glow along the length of the channel.

In a related embodiment, the channel may be filled with a fluorescing gas, material, liquid or other fluid, and where the light source 502 is an energy source that causes the gas, material or fluid to fluoresce.

FIG. 5B is a cross-sectional view at section 6B-6B of the dining plate 503. There is a channel 505 into which a light guide 504, such as an optical fiber, electroluminescent light source, or light tube, resides. The light guide has a light source 506 at one end and may have an optional reflective surface 508 at the other. The index of refraction of the light guide and of the dining plate channel, as well as any gap between the guide and channel wall, may be selected to produce the desired amount of refraction and perceived glow of the channel by the user/diner. Such optical technology is known by those skilled in the art.

FIG. 7A is a cross section of a light guide 700. Such a guide may be an optical fiber, electroluminescent light source, optical tube, or any other appropriate light guiding element. FIG. 7B is a light guide 701 with cladding 702 to help prevent light from escaping. In FIG. 7B, a portion 703 of the cladding has been removed to allow a desired amount of light to escape from a desire section of the guide. FIG. 7C is a cross section of a light guide 704 where a portion 705 of the light guide has been modified to allow light to escape. A light guide may be modified using a variety of techniques, such as by etching, scoring, and the like.

Figure 8C:
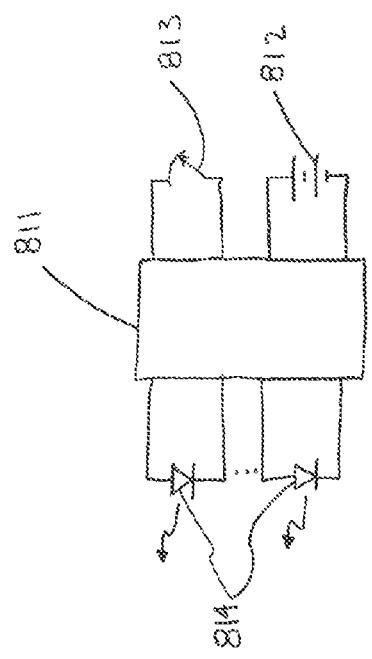
FIG. 8C is an electrical schematic of a circuit for driving one or a multiplicity of LEDs with an LED driver integrated circuit.
Figure 8A:
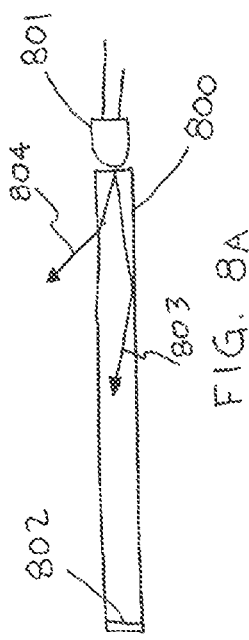
FIG. 8A is a side view of a light guide, such as a light fiber, with light emitting diode (LED).

FIG. 8A is a side view of a light guide 800. There is a light source 801 at one end and an optional reflective surface 802 at the other end. The light guide may be an optical fiber, electroluminescent light source, light tube or any other suitable light guiding element where light can be allowed to escape and pass through a translucent material for the user/diner to see. When the light guide is an optical fiber, theoretically, light 803 that does not exceed a critical angle of incidence with the surface will be internally reflected, whereas light 804 that does exceed the critical angle of incidence will be refracted according to Snell's Law. Refracted light that passes through a translucent material may be viewed by the user/diner. The light guide may also be a light tube with openings permitting the light to escape in desired locations and amounts.

Light sources are commonly light emitting diodes (LEDs) and/or laser diodes, but can be any of a variety of light producing devices, including incandescent lights, electroluminescent elements, fluorescent lights, glowing coils, and the like.

Figure 8B:
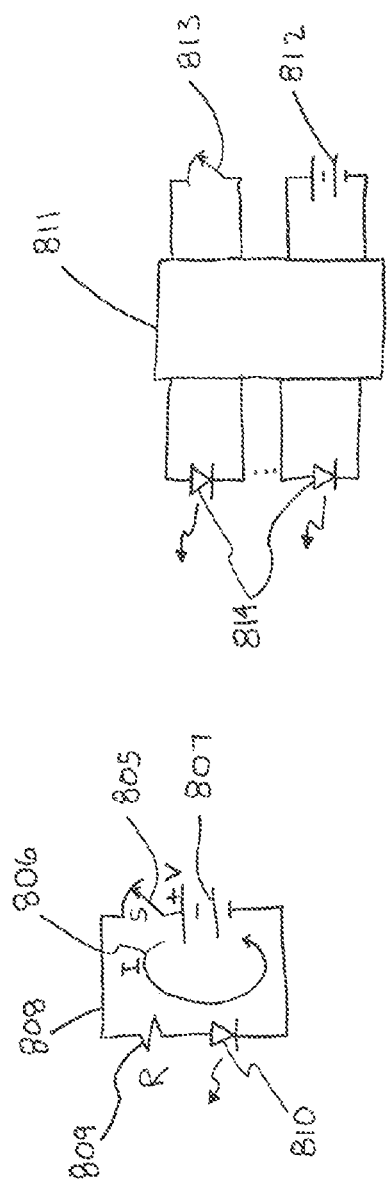
FIG. 8B is an electrical schematic of a circuit for driving the LED.

FIG. 8B is a simple electrical circuit schematic for driving an LED. When the switch 805 is closed, electrical current 806 from the power source 807 passes through the wires 808, through the resistor 809 and through the LED 810, causing it to give off light.

FIG. 8C shows an integrated circuit block 811 with a digital processor and memory and powered by a power source 812. When the processor detects that the switch 813 is closed, it runs a program in its memory that determines which of the light sources 814 to energize and when. The technology for creating such a circuit is known to those skilled in the art and actual circuit implementations may vary considerably. The invention is not limited to an embodiment using the simple exemplary circuits provided here.

FIGS. 9A-9D are active foodware system dining plates with varying visual display designs and technologies. Auditory output may be combined with any of these visual displays. FIGS. 9A and 9B are dining plates 900 and 901, respectively, using light guides to create desired patterns and designs. Each of the lines 902 and 903 may be illuminated using optical guides, including but not limited to "lossy" optical fibers (i.e., which allow some light to escape to be viewed by the user/diner), electroluminescent light sources, light channels, light tubes and the like.

FIG. 9C is a dining plate 904 comprising one or a multiplicity of LEDs 905 which may be illuminated in a desired sequence or in response to user/diner or food activity. The LEDs may be any of a variety of technologies and desirable colors, including but not limited to, red, yellow, blue, green, and the like. A matrix of colored LEDs may be used in combination to produce a composite image where one or more LEDs represent a single picture element (pixel).

FIG. 9D is an active foodware system dining plate 906 comprising an active LCD screen capable of displaying a large number of different images. The LCD screen may have a uniform matrix of pixels where any arbitrary image or alphanumeric character may be displayed. Alternatively, to reduce cost and complexity, the LCD screen may include only portions of a limited number of images or alphanumeric characters. By sequencing the LCD through a pattern of pixels or preset image portions, the user/diner may perceive an object or alphanumeric character to move. Moving or non-moving objects visually displayed by the active foodware system may be associated with aural stimulation from the active foodware system to provide a multimedia experience.

The user/diner may load pictures or movies onto the active foodware system dining plate for display, such as wedding pictures, baby pictures, pictures or movies from a trip and the like. Entertaining and/or other desired images, artwork, videos, graphics, sounds, haptic sensations, "screen savers" and the like, may be downloaded from websites for display on a member of an active foodware system, such as a dining plate. Digital images of the tablecloth or other desirable colors or patterns may be loaded and displayed on the dining plate so the dining plate matches the tablecloth or a dinner party theme. Slideshows may be displayed on the active foodware system plate. Movies may be displayed on the active foodware system dining plate. The dining plate may be associated with a television tuner, TV cable, satellite dish, and the like, such that the user/diner may watch television on their dining plate. The active foodware system dining plate may serve as a computer monitor. Sounds may be recorded and played back through a speaker or vibrating portion associated with the dining plate. For example, the dining plate could display stationary or moving text saying, "Happy Birthday, Jill!" while simultaneously audibly displaying the "Happy Birthday" song through the speaker. At the end of the song, an image or movie of Jill as a baby may be displayed on the dining plate.

FIGS. 10A-10C are three frontal views of an active foodware system liquid container, in this case an active foodware cup 1000 comprising a visual display 1001, auditory display 1002, user/diner interaction controls 1003, processor 1004 and power source 1005. The three views show an image perceived by the user/diner to move from the right to left by successively changing the displayed position of the image. The visual display uses any technology capable of displaying an image, including but not limited to LCD technology, LED technology, plasma screen technology, electroluminescent technology, and the like. The cup may have user controls for turning on the visual display, interacting with the image, playing a game, communicating with others, or otherwise controlling the operation of the cup. The cup may provide auditory feedback to the user/diner via the auditory display 1002. The auditory feedback may be sounds associated with the image and the sounds need not be associated with the image. The auditory feedback may contain speech, music, beeps and other noises and sounds. The auditory feedback may provide advertisements and entertainment. The cup may accept auditory input from the user/diner via a microphone (not shown). FIG. 10D is a plan view of the active foodware system cup 1000 of FIGS. 10A-10C.

Figure 11:
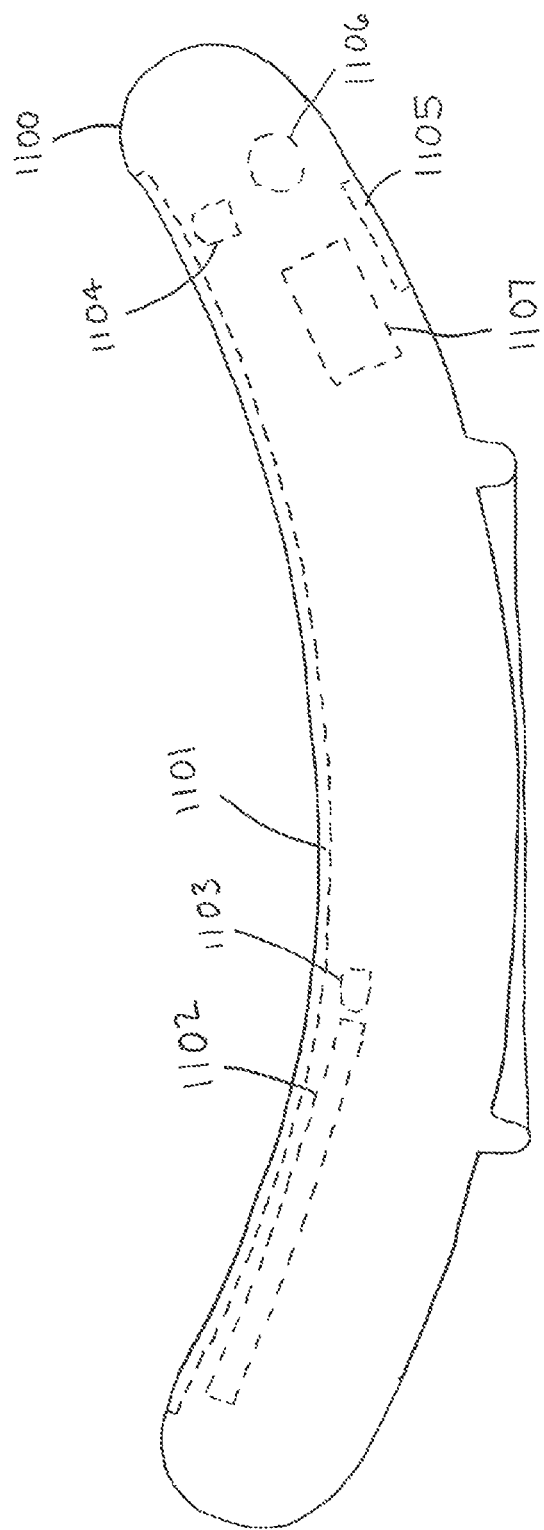
FIG. 11 is a cross-sectional side view of a plate with one or more active components, including, but not limited to a light guide, an LED, an LCD panel, an on/off button, a digital processor and a battery. The interconnections are not shown for clarity.

FIG. 11 is a side cross-sectional view of an active foodware system dining plate 1100 comprising a variety of visual displays, including an LCD screen 1101, a light guide 1102 with associated light-guide-illuminating LED 1103 and a separate LED 1104. Although one of each of three visual display components is shown in FIG. 11, an active foodware system may comprise only one of these visual display components, or it may comprise more than one of such visual displays, and/or an active foodware system may comprise other visual displays not shown in this figure, such as a plasma display, a fluorescent display, and the like. The active foodware system dining plate of FIG. 11 also comprises a switch 1105, which may be used to turn on/off the visual display(s), a power source 1106 and a processor 1107. An active foodware system may comprise multiple switches and controls to control a variety of modes and functions of the active foodware system dining plate. The power source may comprise a battery, rechargeable battery, A/C to D/C power supply, transformer and the like. The processor may be a central processing unit (CPU), microcontroller, microprocessor, digital signal processor (DSP), and the like, and may have associated with it computer memory, such as RAM and ROM, and have a computer program in the memory. The processor may also be a Programmable Logic Array (PLA) or Programmable Array Logic (PAL). The processor has connections to the visual displays, switch and power source, where the processor is able to cause the visual displays to be illuminated in a desired manner and/or display a desired image. Interconnections between the components of FIG. 11 and the specific electrical circuitry are known by those skilled in the art, and so they have been omitted from the figure for clarity.

Figure 12A:
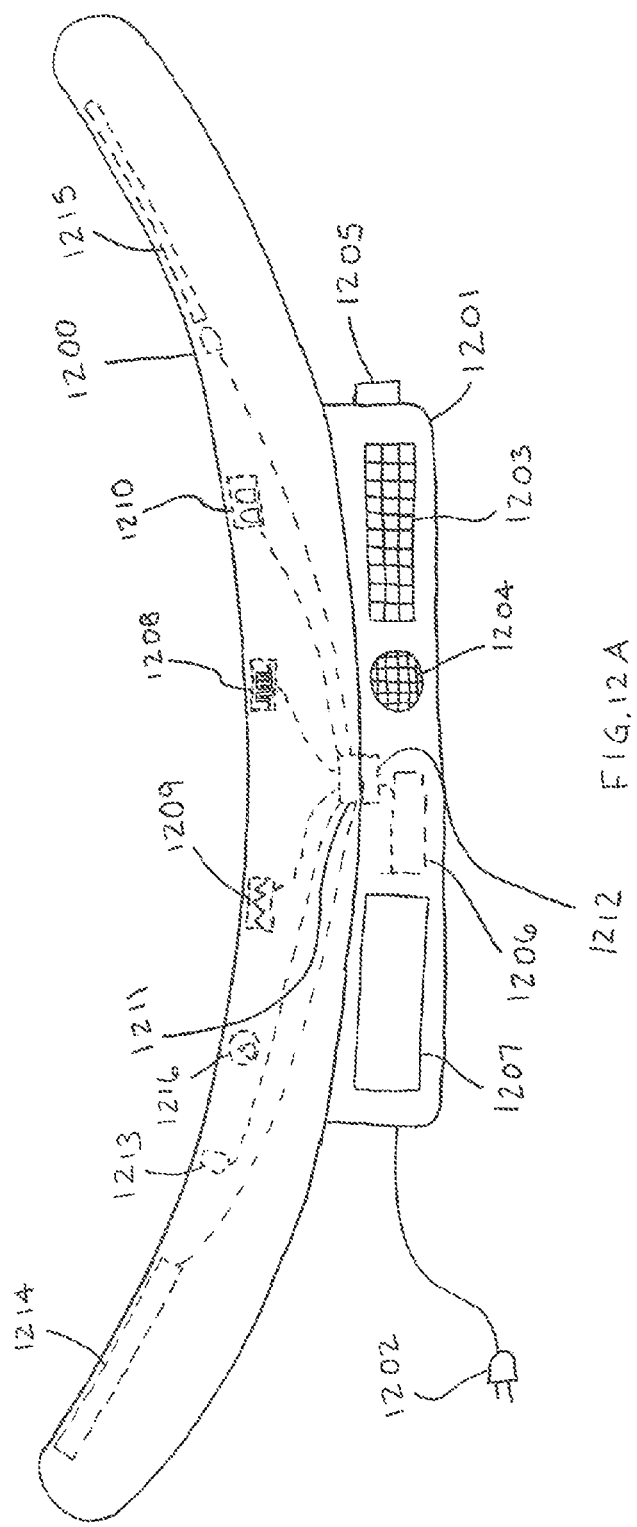
FIG. 12A is a cross-sectional side view of a dining plate positioned in functional relation to a dining plate base (also referred to as an underplate) where the dining plate has one or more sensors, and where the dining plate and dining plate base can communicate information between each other.
Figure 12B:
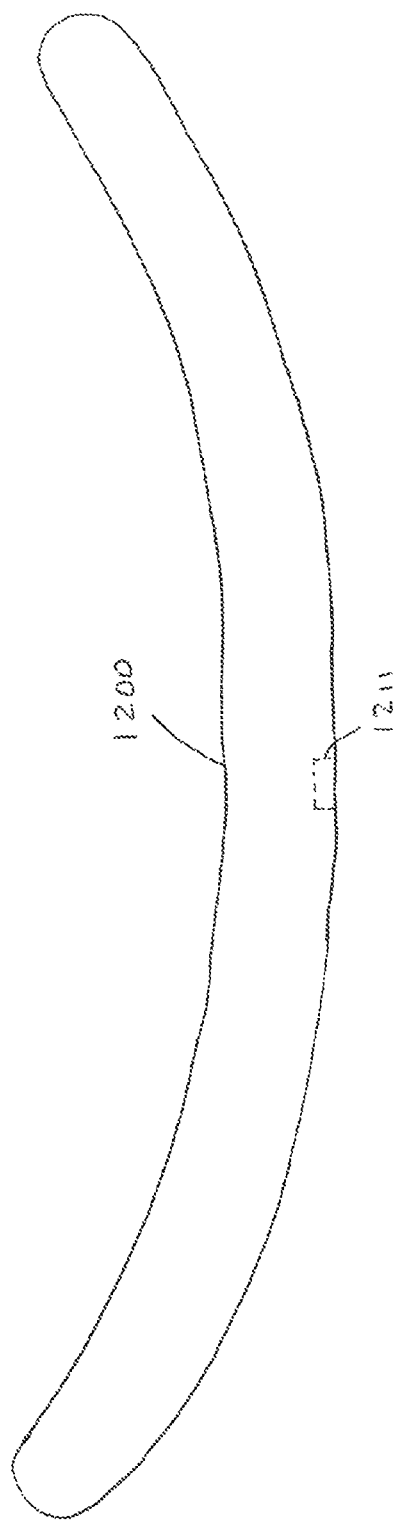
FIG. 12B is a simplified cross-sectional view of the dining plate of FIG. 12A where only the connector is shown.
Figure 12C:
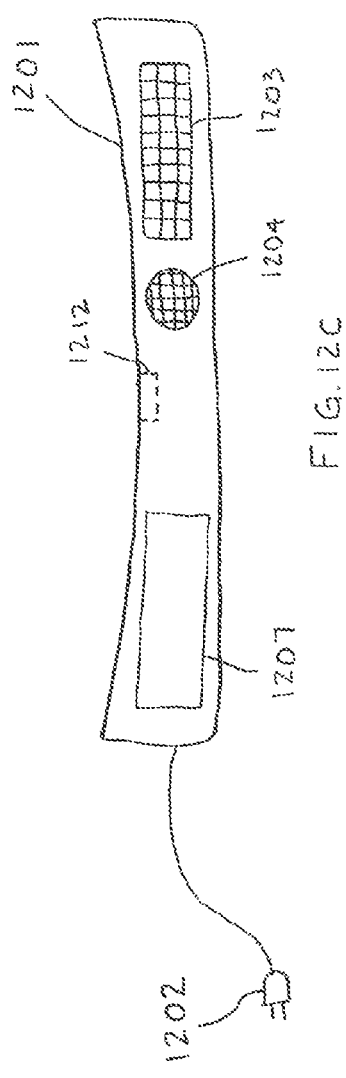
FIG. 12C is a side view of the dining plate base of FIG. 12A.

FIGS. 12A-12C are side cross-sectional views of an active foodware system comprising an dining plate 1200 in functional relation to a non-dining underplate 1201, where the dining plate and non-dining underplate are not permanently affixed to each other. Such a configuration of the dining plate 1200 and non-dining underplate 1201 finds use when it is desired to submerge the dining plate in water or place it in a dishwasher, which, depending on design choices, might not be advisable for the non-dining underplate. For instance, the non-dining underplate might have a cord and wall plug 1202 for 110V or other high voltage alternating current electrical power. The non-dining plate might also have a speaker 1203 (such as a voice-coil speaker), microphone 1204, a switch 1205, a processor 1206 and other components and compartments 1207 that might not fair well if submerged in water.

The dining plate of FIGS. 12A and 12B has at least one sensory element capable of providing feedback or sensing a state. Such a sensory element includes, but is not limited to an LED 1213, and LCD screen 1214, a light guide 1215, an electroluminescent element, a plasma screen, a fluorescent light, an illuminating fluid, a haptic feedback actuator 1216 (such as a vibrotactile feedback actuator (e.g., an eccentric mass actuator), a tactile feedback actuator, a force-feedback actuator, and the like), a pressure sensor 1208, a temperature sensor 1209, a tilt sensor, a proximity sensor, a speaker 1203, a microphone 1204, an electromagnetic sensor, a motion sensor, a position sensor, a velocity sensor, an acceleration sensor, a heart rate sensor, a blood pressure sensor, a calorimeter, and the like.

As depicted in FIG. 12A, a pressure sensor 1208 may comprise a strain gage placed under the surface of the dining plate and electrically connected to a Wheatstone bridge electrical circuit (not shown, but known to those skilled in the art). A temperature sensor 1209 may comprise a thermistor (electrical circuit not shown, but known to those skilled in the art). A proximity sensor may comprise an infrared emitter-detector pair of LEDs 1210 (electrical circuit not shown, but known to those skilled in the art). These sensors communicate their signals to the processor (memory and interconnections not shown, but known to those skilled in the art) via the connector 1211 on the dining plate mating with connector 1212 on the non-dining underplate. In conjunction with or independent of the temperature sensor 1209 one may have a heating element 1217 that serves to heat the food and, if desired, maintain the food at a desired temperature, where the temperature sensor 1209 may be used to control the heating element 1217.

The dining plate of FIG. 12B may communicate information with the non-dining underplate of FIG. 12C via a wired or wireless connection. Wired connections include, but are not limited to comprising metal contacts which touch mating metal contacts. Wireless connections include, but are not limited to electromagnetic communication, light-based communication, acoustic communication, and the like. Electromagnetic communication may be used to communicate data as well as power (typically via a transformer). Light-based communication may include optoisolators.

Figure 13:
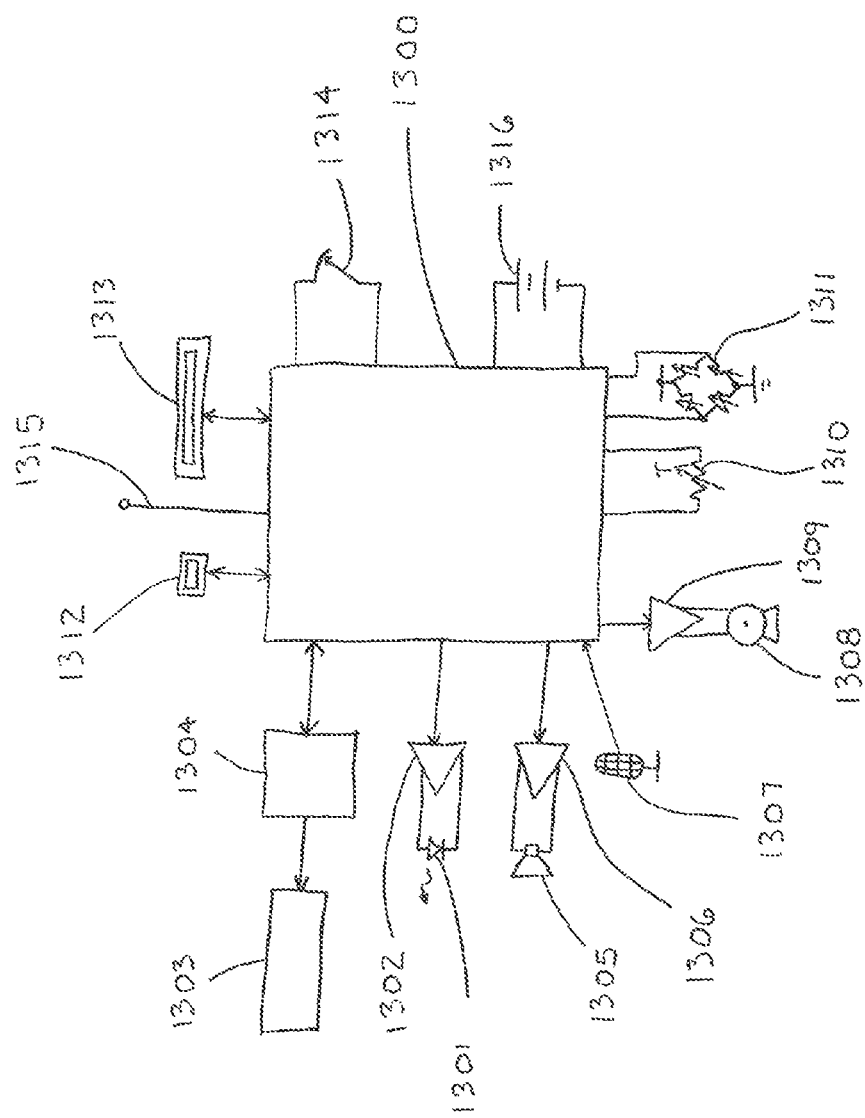
FIG. 13 is an electrical block diagram of a processor communicating with a variety of sensing and stimulation components, including display devices, of an active foodware system item of the subject invention.

FIG. 13 is a block diagram of a processor 1300, such as a microprocessor, microcontroller, digital signal processor (DSP), and the like. The processor may have associated with it computer memory, such as RAM and ROM, and have a computer program in the memory. The processor may also be a Programmable Logic Array (PLA) or Programmable Array Logic (PAL). The processor is communicating with one or more sensing and display devices. Such devices include, but are not limited to visual indicators including LEDs 1301, which may have associated control hardware and software 1302, LCDs 1303, which may have associated control hardware and software 1304, plasma displays, electroluminescent light sources and fluorescent displays, CRTs, speakers 1305, including voice-coil and piezo-electric speakers, which may have associated control hardware and software 1306, microphones 1307, motors 1308 which may have associated control hardware and software 1309, force- and tactile-feedback displays, motion sensors, temperature sensors 1310, pressure sensors 1311, contact sensors, moisture sensors, humidity sensors, tilt sensors, wireless ports, USB communication ports 1312, serial ports, parallel ports, Fire-wire ports, CD drives 1313, memory card ports, on/off and other control switches 1314, antennae 1315, power sources 1316, and the like. Any of the sensing and display devices may have their own dedicated control hardware and software even though not explicitly shown in the figure.

Not all possible sensing and stimulating components or devices according to the subject invention are shown in FIG. 13. Only a few exemplary sensing and display devices are depicted, and the details of the interconnections and interface hardware and software are known to those skilled in the art. There is a multitude of sensing and display technologies capable of providing the desired results, and not all such specific technologies are listed. For example, when a motor 1308 is listed, it may be an electrical motor, pneumatic motor, piezo-electric motor, hydraulic motor, or any other technology for producing a linear or angular displacement based on a control signal. When a temperature sensor is listed, it may be a thermistor, thermocouple, and the like, or any other device for detecting temperature and converting it into a usable signal. When a power source is listed, it may be a battery, A/C adapter, transformer, or any other device for storing, converting or generating electrical power.

FIG. 14 is a plan view of a dining utensil 1400 which includes active sensing and feedback. More specifically, the dining utensil is a fork, where light guides 1401 extend into the tines 1402 from LEDs 1403 positioned in the handle 1404. There is also an on/off switch 1405, power source 1406 and circuitry 1407 positioned in the handle 1404. The LEDs 1403 are connected to the circuitry 1407 via interconnections 1408, the switch 1405 is connected to the circuitry 1407 via interconnections 1409 and the power source 1406 is connected to the circuitry 1407 via interconnections 1410. The details of the circuitry 1407 are known to those skilled in the art. The switch 1405 may be any contact or proximity sensor, and the power source 1406 may be any device for supplying power, including but not limited to a battery.

Figures 15A, 15B, 15C:
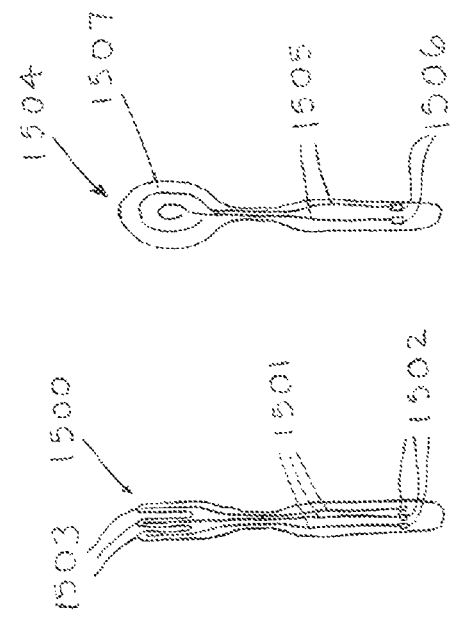
FIGS. 15A-15C are plan views of various active foodware system utensils with one or more active components.

FIGS. 15A-15C are plan views of three different examples of active dining utensils. In FIG. 15A, a fork 1500 has light guides 1501 emanating from light sources 1502 and where the light guides direct light emission for illuminating desired portions of the fork, such as each of three tines 1503. A power source, on/off switch, control electronics and interconnections are not shown for clarity and are known to those skilled in the art. Similarly, FIG. 15B is a spoon 1504 with light guides 1505 emanating from light sources 1506 and where the light guides direct light emission for illuminating desired portions of the spoon, such as a pattern in the end of the spoon 1507. Again, electrical details are omitted for clarity and are known to those skilled in the art. FIG. 15C is a knife 1508 with light guide 1509 emanating from a light source 1510 and where the light guide directs light emission for illuminating desired portions of the knife such as the blade 1511 of the knife. Again, electrical details are omitted for clarity and are known to those skilled in the art.

Figure 15D:
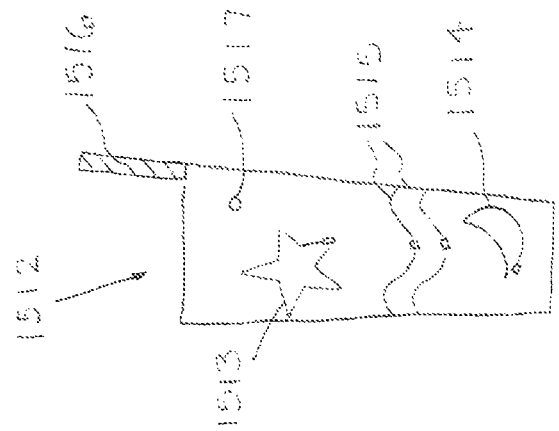
FIG. 15D is a side view of a cup with one or more active components. No circuitry is shown for clarity.

FIG. 15D is a drinking container 1512 with multiple active components. In this embodiment, four different light guide examples are shown, including a star 1513, a crescent moon 1514, a double wavy line 1515 and a spiral 1516. In this figure, the spiral 1516 is shown on an optional straw associated with the drinking container. Each light guide is associated with a light source and each light guide directs light emission for illuminating desired portions of the container. The drinking container as shown also comprises a light source 1517 without light guide. The light source may be an LED. Again, electrical details are omitted for clarity and are known to those skilled in the art. In each of the FIGS. 15A-15D, the light sources may be energized in a desired spatial or temporal pattern and may be energized based on a signal from any of a variety of sensors (not shown) and including but not limited to a contact sensor, tilt sensor, moisture sensor, temperature sensor, auditory sensor, radio frequency sensor, electromagnetic sensor, optical sensor, and the like.

Figure 16B:
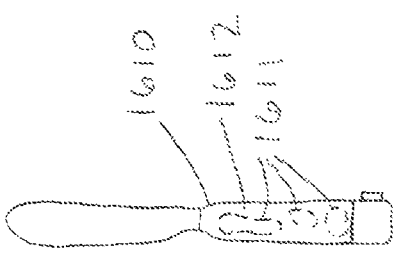
FIG. 16B is a side view of a utensil (knife) with one or more active components, such as oil in a non-oil-based liquid. Shown is an optional illuminating component in the base of the handle.
Figure 16A:
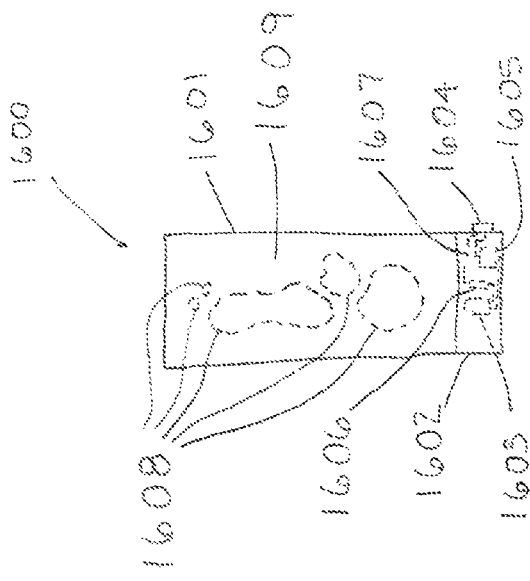
FIG. 16A is a side view of a cup with one or more active components. In this case, the active component is oil suspended in a non-oil-based liquid. Shown is an optional illuminating component in the base of the cup.
Figure 16C:
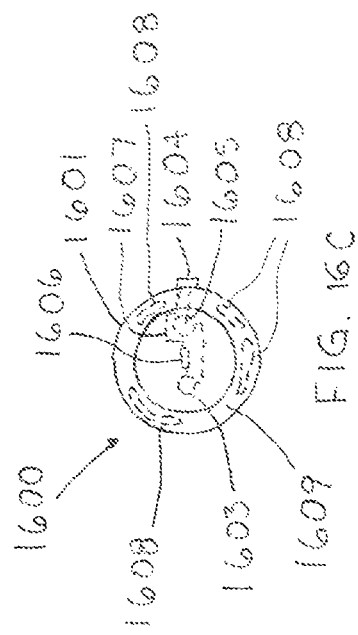
FIG. 16C is a plan view of the cup of FIG. 16A.

FIGS. 16A and 16C are a side view and plan view, respectively, of a drinking container 1600 with active components. In this embodiment, the container wall 1601 is filled with two liquids such as water with oil, where the specific gravity of the oil is greater than that of the water. In the base 1602 of the container are a lighting source 1603 and a heating source. In this embodiment, the lighting source is an incandescent light and also serves as the heating source. There may also be an on/off switch 1604, power source 1605, electrical control circuitry 1606 and interconnections 1607. In this embodiment, the electrical control circuitry is an electrical resistor and the power source is a battery. Such electronics may also be distributed throughout the container wall and need not be concentrated only in the base. The details of such electrical circuitry are known to those skilled in the art. Since oil and water don't mix, the oil will exist in amorphous shapes 1608 throughout the water 1609. Additionally, since the oil is heavier than water the oil shapes will sink to the bottom of the water near the base of the container. There the heating source will heat the oil, and surrounding water, causing the oil to rise to nearer the top of the container wall while the cooler oil shapes and the water nearer the top sink toward the bottom. Over time, some oil shapes will separate into multiple pieces, while other oil shapes will recombine. Additionally, due to the varying optical properties of the oil and water, the light source in the base will create interesting and entertaining optical patterns as the oil shapes move.

The specific type of oil and/or the particular properties of the water may be selected to provide desired physical and optical properties. For instance, different oils may exhibit desirable fluorescing properties; they may have different separating and recombining properties and may sink and rise at different rates.

FIG. 16B is an dining utensil comprising similar oil-water technology. In this embodiment, a knife handle 1610 has oil 1611 and water 1612 in it, and also comprises a lighting and heating source, along with the associated electronics, which are not shown in this embodiment and are known to those skilled in the art.

FIGS. 16A-16C are simple examples of components of an active foodware system, such as a drinking container and an dining utensil, which possess active components. The particular exemplifications shown in these figures are illustrative of these types of components and is not intended to be limiting.

Active foodware systems may also comprise electrostatic technology. For example, a component of an active foodware system may be partially hollow and filled with a gas containing ions and an energized electrode such that where the user/diner contacts the external surface of the component of the active foodware system an electrical arc will occur, looking like a miniature lightning bolt from the electrode to the point of user/diner contact. Such technology is known to those skilled in the art and the details are not presented explicitly but are incorporated herein by reference.

An active foodware system is desirable in many applications, including entertainment and promotion at home and in a restaurant. For example, fast food chains may provide an active foodware system as a promotional item. Active foodware systems with lighting sources will make it fun to eat in an otherwise dark environment. Lighting sources may include black lights, and oils may include associated fluorescence matched to the black lights.

FIG. 17A is a frontal view of a liquid container 1700 with an active component. In this particular embodiment a beer bottle has a label 1701 with light guide 1702, light source 1703, function control switch 1704 and electrical circuitry 1705 which contains an electrical power source. As is the case with other light guides, the light guide guides light from the light source to one or more locations where the light is emitted for the user/diner to see. The light may be emitted over the entire length of the light guide, over a portion of the light guide and/or at one or more discrete points. In the embodiment of FIG. 17A an indicia of label 1701, such as the name of a beer, is illuminated, producing a similar visual effect to a miniature neon street sign. Light sources producing different colors may be used.

FIG. 17B is a cutaway top view of FIG. 17A showing the light guide 1702 and associated components affixed to the label 1701 which is affixed to the front of the liquid container.

FIG. 17C is a cutaway view similar to FIG. 17B, but where the lighting source 1706 and light guide 1707 are positioned inside the wall 1708 of the liquid container. The light from the lighting source may be guided in a variety of manners, including via a light fiber, electroluminescent light source, a light tube, a light channel which may contain air, gas, or another fluid, which may fluoresce, and the like. The associated electronics are not shown but are known to those skilled in the art.

FIG. 17D is a cutaway view of FIG. 17E where at least a portion of the light guide 1709 is located inside the liquid 1710 of the liquid container 1711. The light from the lighting source 1712 may be guided in a variety of manners, including via a light fiber, a light tube, and the like. With such a location, the light guide 1709 can illuminate the liquid 1710 being contained. The light source 1712 may be located in a variety of convenient places, including inside the wall of the container, in the liquid inside the container, or in any location where light from the light source can enter the light guide. The associated electronics are not shown but are known to those skilled in the art.

FIG. 17E is a side cross-section view of the liquid container 1711 of FIG. 17D, where at least a portion of the light guide 1709 is positioned inside the liquid 1710 in the liquid container. The associated electronics are not shown but are known to those skilled in the art.

FIG. 18A is a frontal view of a liquid container 1800 with an active label. The label 1801 may include a variety of display elements such as pictures or the segments of a 7-segment display 1802. The active elements of the label may include LCD or LED technology. The label may have a function switch 1803 which may be used to turn on/off the display and select the desired images to display. The associated electronics, including the power source, are not shown for clarity but are known to those skilled in the art.

FIG. 18B is a frontal view of a liquid container 1804 with a label with a matrix of individually controllable picture elements (pixels) capable of producing a large number of desirable images. The label 1805 may be a separate component associated with the liquid container or the label may be a region of the container itself comprising one or more active components. Similar to a television screen, the pixels may produce text 1806 or other images 1807 which may appear to move given appropriate pixel sequencing. The label of this specific embodiment also comprises an auditory output device 1808. Such an auditory output device may be a piezo-electric speaker, voice-coil speaker, or any other suitable device for producing sound. The label as shown also comprises a function control switch 1809; although, multiple function control switches may be used. The function control switch may turn on/off the visual display, may turn on/off the auditory output and may select from one or more visual or auditory displays.

FIG. 18C is an electrical block diagram comprising a processor 1810, function control switch 1811, power source 1812, audio amplifier 1813, audio output device 1814 and visual display with driver 1815. The electrical block diagram also includes one or more optional sensors 1816 and optional wireless communication capabilities 1817. The label may also include a microphone (not shown) to detect spoken user/diner input. Sensors include, but are not limited to, contact sensors, motion sensors, temperature sensors, positions sensors, humidity sensors, light sensors, auditory sensors, liquid level sensors, sensors to detect whether the container is open, and the like. Details of the electrical block diagram and how to physically implement it are known to those skilled in the art.

With the embodiment of FIG. 18B a user/diner may see and/or hear moving advertisements on the label. Advertisements may be associated with signals from one or more sensors. A vendor can send updated advertisements that may be associated with signals from one or more sensors. For example, if a sensor is a global positioning system (GPS), a liquid container vendor may send an advertisement specific to the user/diner's city or restaurant. A restaurant may send an advertisement to a user/diner inside their restaurant, and the user/diner may respond by activating a function control switch on the liquid container or by speaking into the microphone. Using sensors, information may be collected about the user/diner.

Many of the embodiments depicted thus far have included a liquid container but are meant to exemplify how active components may be associated with a broad class of active foodware systems and not limited to liquid containers.

FIG. 19A is a side cross-sectional view of an active dining plate 1900 comprising a stationary dining surface 1901 and a movable inner portion 1902. In this embodiment, the movable inner portion is a rotating disk being rotated by a flat "pancake" motor 1903. A plan view of the rotating disk is shown in FIG. 19B. The stationary dining surface may comprise one or more active elements, including but not limited to LEDs 1904 and light guides. The stationary dining surface may also comprise a portion 1905 which is translucent such that light coming from the movable inner portion can be seen by the user/diner. The dining surface may have one or more elements for diffusing, modifying or transmitting light coming from the movable inner portion. Such elements may include light guides 1906, components 1907 with different shapes and indices of refraction, translucent films, and the like. The movable inner portion 1902 may comprise one or more active components, including but not limited to light sources such as LEDs 1908, light guides with associated light sources 1909, LED or LCD panels 1910, reflective surfaces 1911, electroluminescent elements, and the like. Text and images may be displayed and may provide advertisements. Kaleidoscopic images may be produced. Details of the electrical circuitry have been omitted for clarity but are known to those skilled in the art. As with other embodiments, the active technologies shown in the embodiment here with a dining plate may also be applied to other active foodware system components, including cups, utensils and the like.

FIG. 20A is a side cross-section view of a stationary dining surface 2000 with a first movable inner portion 2001. Although the active sensing and feedback features are not redrawn in FIG. 20A for clarity, the stationary dining surface 2000 and first movable inner portion 2001 of the embodiment of FIG. 20A may have similar active sensing and feedback features to the stationary dining surface 1901 and movable inner portion 1902, respectively, of FIGS. 19A and 19B; however, rather than the first movable inner portion 2001 being directly moved by a motor, the first movable inner portion 2001 of the embodiment of FIG. 20A is magnetically coupled via magnets to a second movable portion 2002 which is moved by a motor 2003 and which may be positioned below the first movable portion 2001. There are various ways to magnetically couple the first movable portion with the second movable portion such that movement of the second movable portion causes the first movable portion to move. For example, the second movable portion may have magnets 2004, which may be permanent magnets or electromagnets, which are positioned in functional relation to iron-based objects 2005 in the first movable portion, such that the magnetic fields 2006 provided by the magnets of the second movable portion pass through the stationary dining surface 2000 and provide a magnetic attraction to the iron-based objects 2005 in the first movable portion 2001. Accordingly, as the first movable portion moves, the second movable portion similarly moves. Alternatively, the first movable portion may comprise magnets, either permanent magnets or electromagnets, which magnetically couple to iron-based objects in the motorized second movable portion.

Figure 21A:
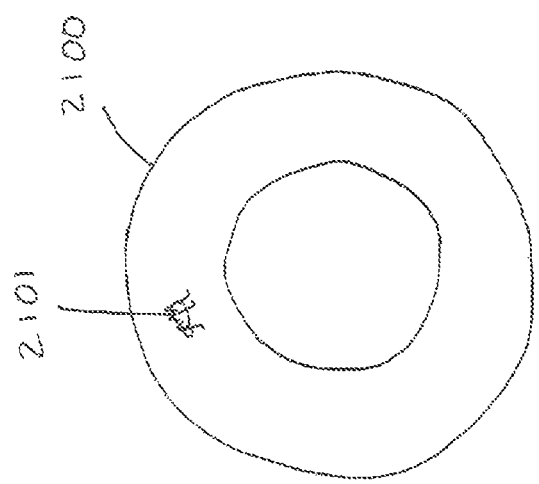
FIGS. 21A-21D are plan views of an active foodware system comprising a dining plate with a multi-pixel LCD display capable of displaying static images or images which appear to move.
Figure 21B:
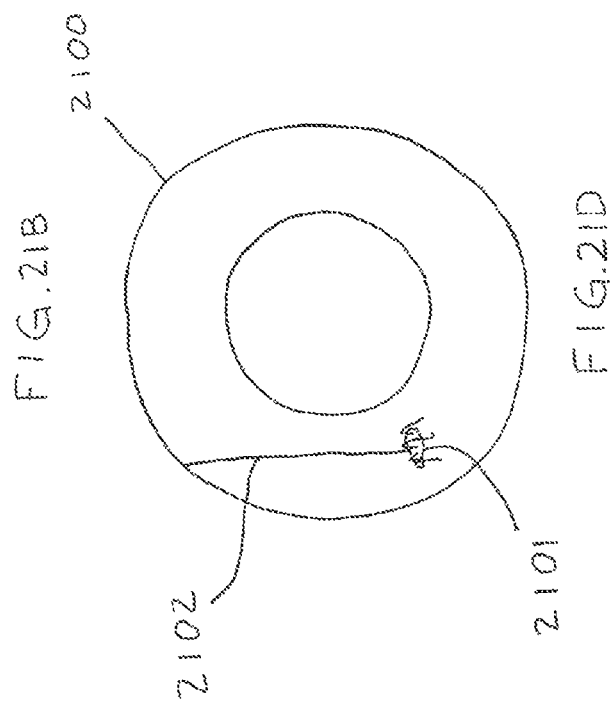
Figure 21C:
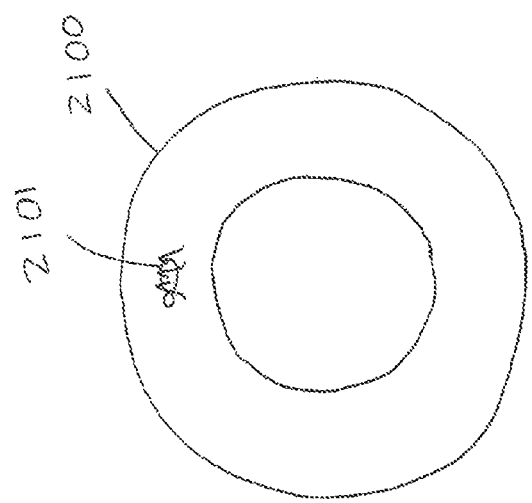
Figure 21D:
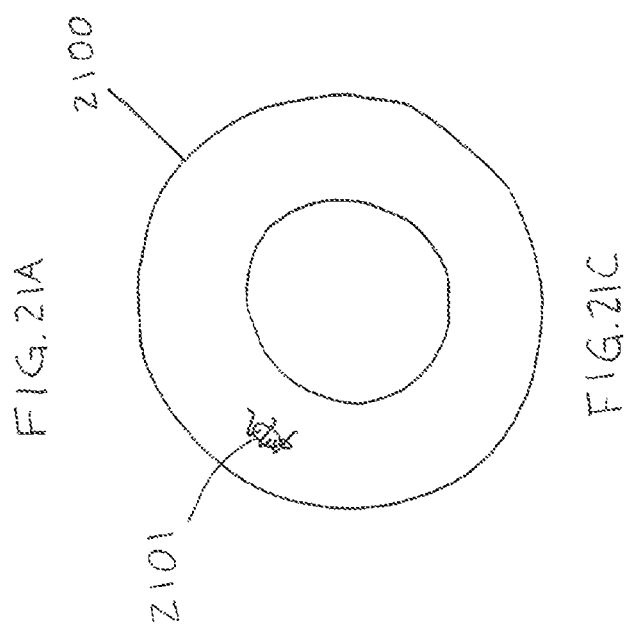

FIGS. 21A-21D are plan views of an embodiment of an active dining plate 2100 where a refreshable moving image, depicted as a spider 2101, may be viewed by the user/diner. The image may be generated by a variety of technologies including an LCD screen in functional relation to the dining plate. For instance, the LCD screen may be affixed to the dining plate, or it may be positioned beneath the top surface and viewed through optics in the dining plate. The dining plate may comprise optics, including but not limited to optics which enlarge the image, decrease the size of the image, distort the image, redirect all or a portion of the light from the image or allow the image to be viewed unaltered. FIGS. 21A-21D show images of a moving spider at different times. In FIG. 21A, the spider 2101 is at the top of the active dining plate 2100; in FIG. 21B, the spider 2101 has crawled counterclockwise around the perimeter of the active dining plate 2100; in FIG. 21C, the spider 2101 has crawled even further counterclockwise; and in FIG. 21D, the spider 2101 has descended down a web 2102.

Figure 22:
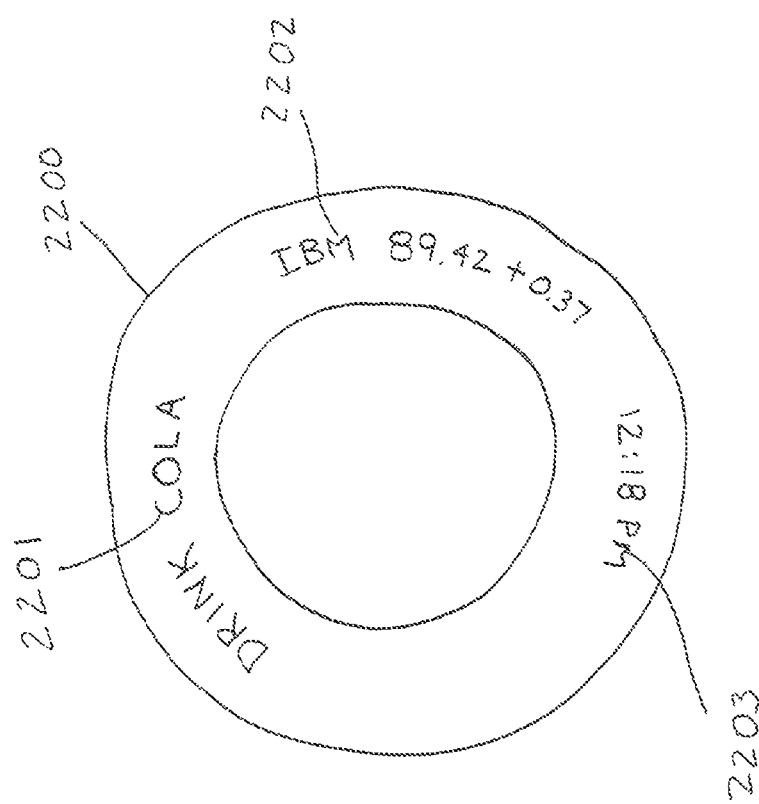
FIG. 22 is a plan view of an active eating plate where information is displayed and updated around the perimeter of the dining surface.

FIG. 22 is a plan view of an active dining plate 2200 where information is displayed. In this embodiment, the information is displayed around the periphery of the dining plate; although, it could be displayed at any convenient location on the dining plate. The information may include, but is not limited to, text, graphics, images, advertisements 2201, news flashes, stock quotes 2202, time 2203, temperature, weather, sports scores, song information which may be accompanied by music coming from a speaker associated with the plate, appointment notification, a phone number, a greeting, and the like. The information that is displayed on the active foodware system dining plate may be pre-programmed into memory associated with the dining plate, it may be received in real time and/or it may be provided to the dining plate via wired or wireless technology, external media, and the like.

Figure 23A:
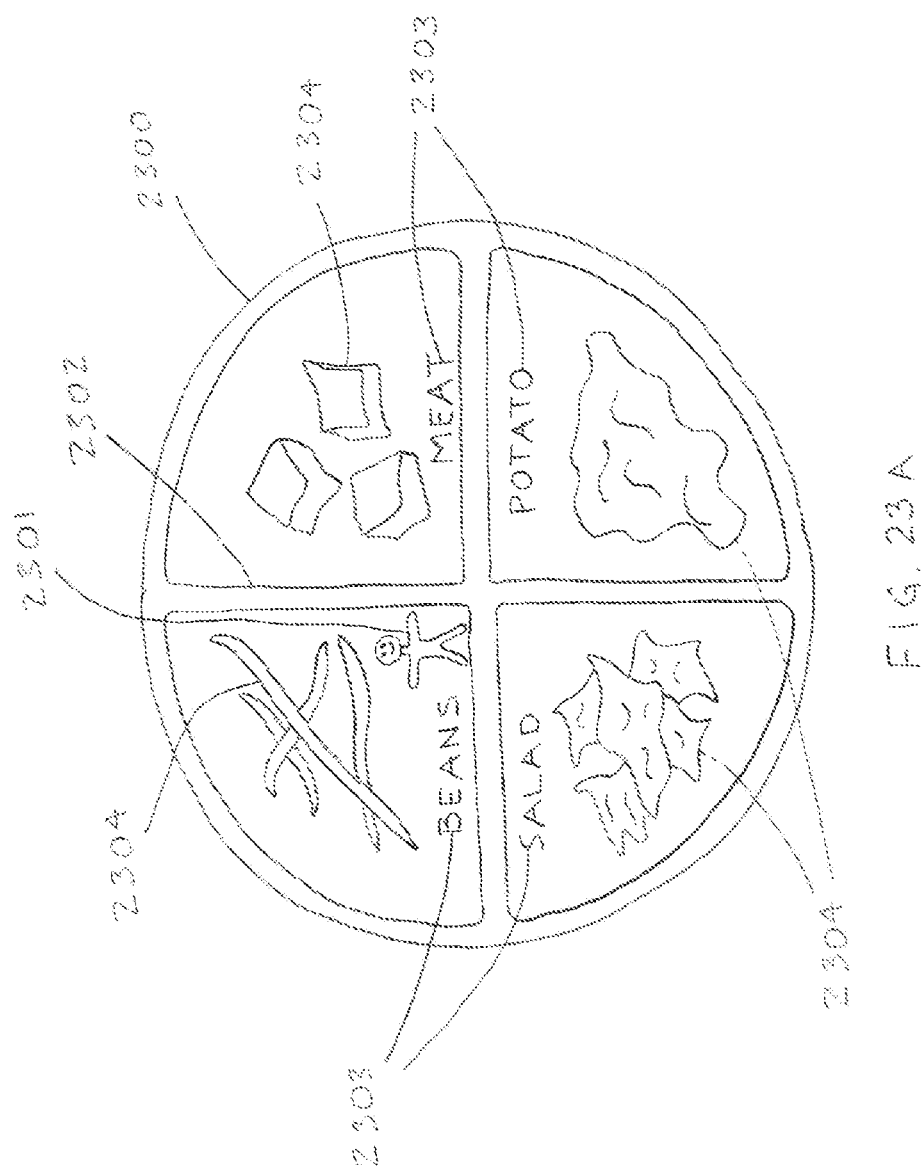
FIG. 23A is a plan view of an active foodware system comprising a dining plate with multiple compartments and one or more active components. In this case, the compartments include LCD panels where a small figure may be displayed to encourage the user/diner.

FIG. 23A is a plan view of an active foodware system dining plate 2300. This embodiment has a movable character 2301 for communicating with the user/diner. The plate also comprises optional boundaries 2302 and partition labels 2303 associated with the contents 2304 of the partitions. The boundaries may be physical or visually displayed boarders. The character may communicate with the user/diner, for example a child, where the character entertains, encourages and/or coaches, and the like, the user/diner while eating. The character may be a computer generated animation, recorded video, and the like. Visual, auditory and haptic feedback may be associated with the character. In one scenario, the character may use auditory feedback to tell a young user/diner how good beans taste and that all his friends finish their beans, so the young user/diner is encouraged to eat a food he might otherwise not.

FIG. 23B is a plan view of a computing device 2305 which is able to communicate with the active foodware system dining plate 2300, or in general, with any active foodware system component. In this embodiment, the computing device is handheld and has a touch screen 2306, including a graphical display, with optional stylus 2307 and keyboard 2308. The computing device may communicate with the active foodware system dining plate wirelessly or via wires. The details of such wired and/or wireless communication is known by those skilled in the art. One application is that a parent may use the computing device to communicate with a child user/diner via their active foodware system dining plate. For example, using an optional stylus 2307, the parent may touch a part of a touch screen 2306 on the computing device corresponding to a particular location or food on the child's active foodware system dining plate and which may invoke a desired response from the moveable character 2301 or may invoke some other feedback to the child. For example, the parent may touch a partition 2309 on their touch screen labeled "BEANS," causing the character animated on the dining plate to appear to jump over the partition on the dining plate from the "MEAT" to the "BEANS," and using auditory or visual feedback ask the child if he would please eat some beans. The dining plate may have contact or proximity sensing (not shown, but known to those skilled in the art) capable of detecting that the child is using a utensil in proximity to the beans such that the character then gives positively reinforcing feedback to the child. There may be a wide variety of commands the parent can invoke from the computing device that produce desired feedback to the child user/diner via his active foodware system.

Figure 24A:
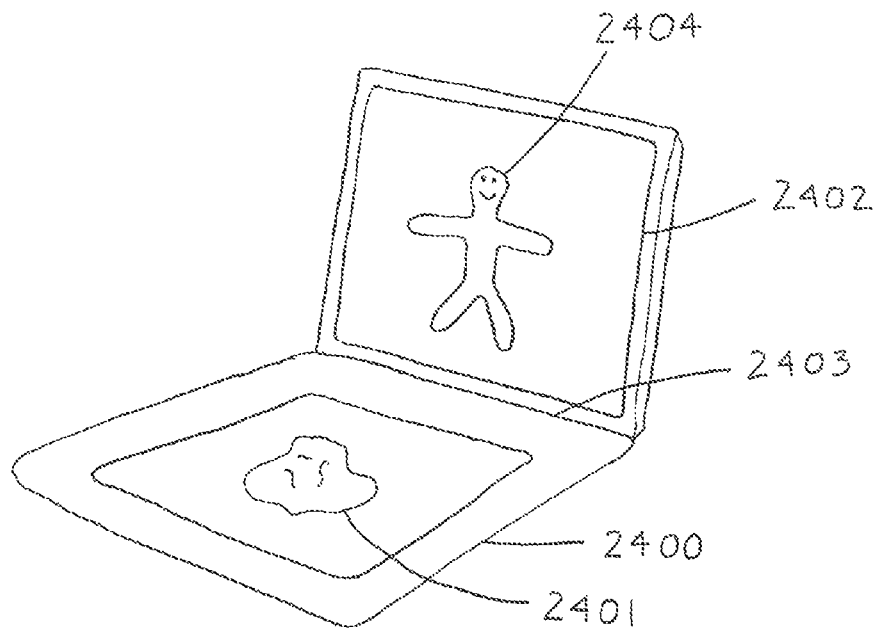
FIG. 24A is a perspective view of an active foodware system comprising a dining plate with a visual sensory stimulating component positioned in functional relation.

FIG. 24A is a perspective view of a dining plate 2400 with food 2401 on it and with a visual display 2402, such as an LCD or plasma display in close functional relationship to the dining plate. In this embodiment, the visual display 2402 is attached to the dining plate 2400 such that there is at least a portion of the visual display 2402 which is not intended to be covered by food 2401. The visual display 2402 may be attached to the dining plate 2400 by a hinge 2403 such that the angle of the visual display may be changed by the user/diner. Such optional hinge includes, but is not limited to two-piece hinges with a mating pin, living hinges, flexible joints, and the like. The visual display 2402 may be able to be tilted all the way back so it lies in the same plane as the dining plate 2400. The visual display 2402 may also be able to be tilted all the way forward so it covers the dining plate 2400. The control and communication circuitry of the visual display is known to those of ordinary skill in the art and may be located at any convenient location, including behind the visual display screen or under the dining plate. The circuitry is not shown here for clarity. One advantage of this embodiment is that information 2404 of the visual display 2402 will not be obscured by food 2401, yet the visual display 2402 is still closely associated with the dining plate 2400. Auditory sensory stimulating components, sensing components and/or haptic components may also be associated with the dining plate of this embodiment.

Figure 24B:
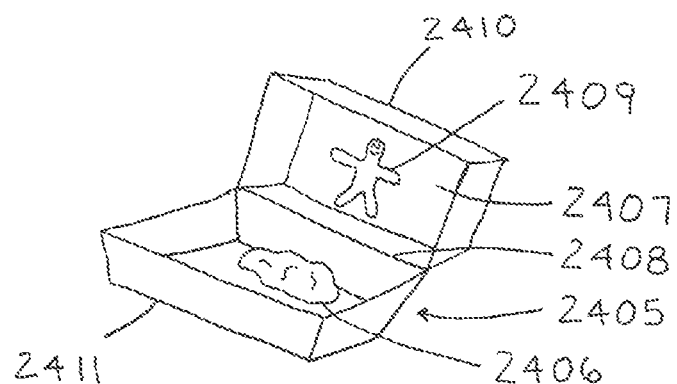
FIG. 24B is a perspective view of a food container with visual sensory stimulating component positioned in functional relation.

FIG. 24B is a perspective view of a food container 2405 with food 2406 in it and with a visual display 2407, such as an LCD, electroluminescent display, LED display or plasma display in close functional relationship to the container. A typical use for this embodiment is found with fast food restaurants, such as where children's meals, chicken pieces and the like are distributed. In this embodiment, the visual display 2407 is associated with the lid 2410 of the food container such that there is at least a portion of the visual display 2407 which is not intended to be covered by the food 2406. The visual display 2407 may be affixed to the lid 2410 of the food container, which may be flexibly attached to the bottom portion 2411 of the food container by a hinge 2408 such that the angle of the visual display may be changed by the user/diner. Such optional hinge 2408 includes, but is not limited to two-piece hinges with a mating pin, living hinges, flexible joints, and the like. The food container lid with associated visual display may be able to be tilted all the way back so the visual display lies in the same plane as the bottom surface of the bottom portion of the food container. The food container lid with associated visual display may also be able to be tilted all the way forward so the lid covers the bottom portion of the food container. The control and communication circuitry of the visual display is known to those of ordinary skill in the art and may be located at any convenient location on or about the food container, including in the lid behind the associated visual display screen or under the bottom portion of the food container. The circuitry is not shown here for clarity. One advantage of this embodiment is that information 2409 of the visual display 2407 will not be obscured by food 2406, yet the visual display 2407 is still closely associated with the food container 2405. Auditory sensory stimulating components, sensing components and/or haptic components may also be associated with the food container of this embodiment.

Figure 25:
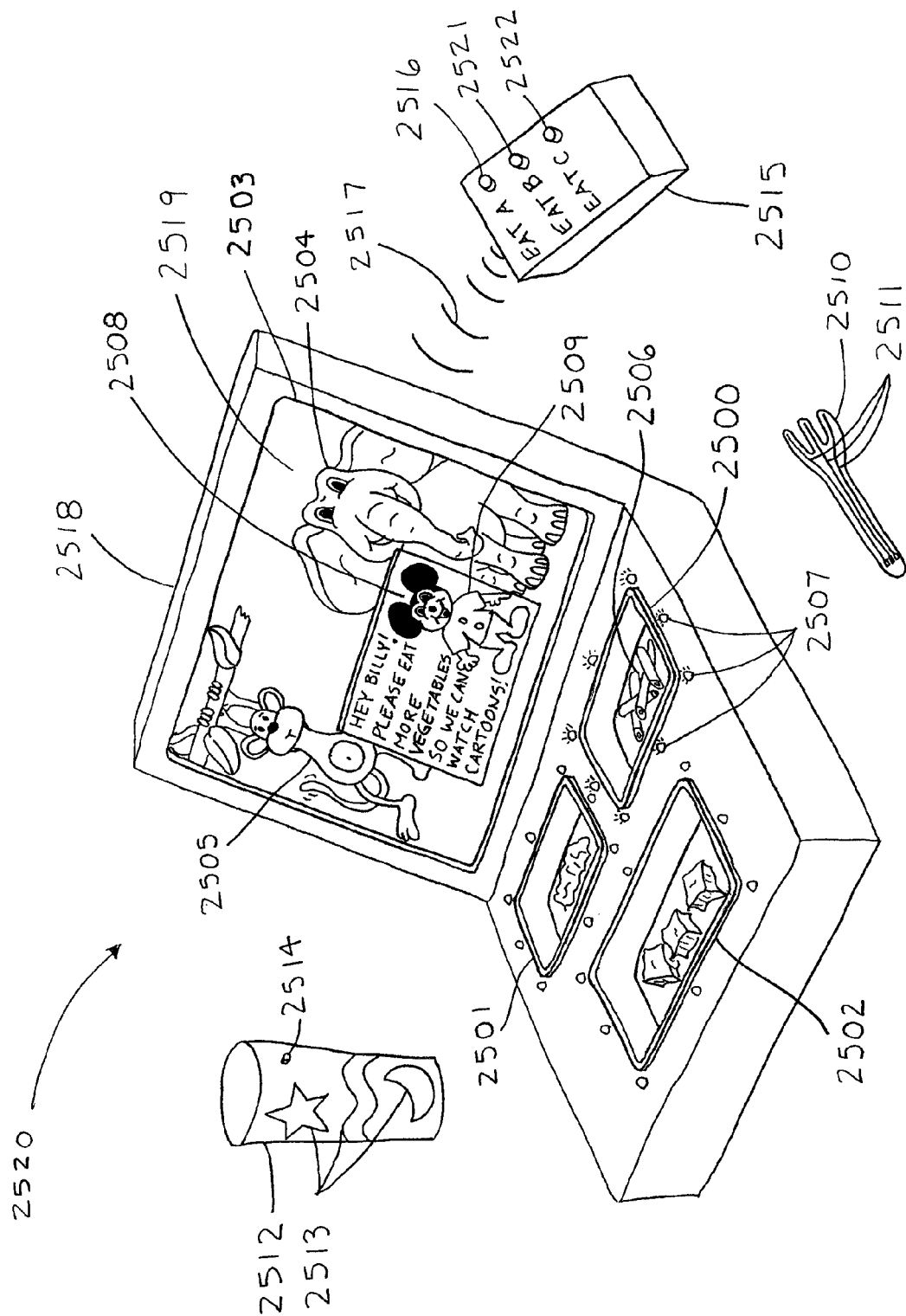
FIG. 25 is a perspective view of an active foodware system comprising a dining plate with three food dishes, a paused primary video behind a secondary video, a remote control for controlling the active foodware system, including at least one of the active foodware dining plate, an active foodware cup and an active foodware utensil.

FIG. 25 is a perspective view of one embodiment of an active foodware system 2520 comprising a structure 2518. In this embodiment there are three food dishes 2500, 2501 and 2502, respectively, each dish being on a food-sensing platform (not shown). A first video 2519 of a cartoon comprising a monkey 2505 and elephant 2504 is being displayed on the screen 2503. The example is demonstrating the case where the food 2506 from at least one food dish 2500 is not being eaten fast enough such that lights 2507 associated with the food dish 2500 are illuminated, the first video 2519 is paused and a second video 2508 predominates where a character 2509 of the second video 2508 encourages the diner (in this case, "Billy") to please eat more of the food 2506 in a particular food dish 2500.

Other active foodware components of the active foodware system include a fork 2510 with lighted tines 2511 and a drinking cup 2512 with lighted designs 2513 and an LED 2514. For further description of these and other foodware components refer to FIGS. 14-16. Operation of the active foodware system 2520 may be controlled by other devices. Controller 2515, as depicted, allows a person to direct commands to the diner to eat from a specified dish by pressing any of the buttons 2516, 2521 and 2522. The controller 2515 sends a wireless signal 2517 to controlling circuitry (not shown) in the structure 2518. The wireless signal 2517 causes the first video 2519 to pause and launches the second video 2508, where the second video 2508 instructs the diner to eat more of the food 2506 in the dish 2500. The signal 2517 also causes lights 2507 to be illuminated. The signal 2517 may be transmitted to the circuitry using infrared or RF technology, and the like. Alternately, the signal 2517 may be sent using a wired connection.

FIG. 26 is a perspective view of an active foodware system 2607. In a first useful embodiment, the structure 2600 includes an integral processor (not visible) and a display 2602; in a second useful embodiment, the structure 2600 is capable of receiving a processor and display, such as may be provided by a laptop computer 2601 with display 2603 and keyboard 2605. In the second embodiment typically at least a portion 2604 of the structure 2600 covers at least a portion 2608 of the laptop computer 2601, and protects the laptop computer 2601 and its keyboard 2605 from food. Also in the second embodiment, the screen 2602 of the structure 2600 is translucent and protects the laptop display 2603 from food. In both the first and second embodiments, the structure 2600 includes at least one food dish where at least one characteristic or attribute of food (not shown) put on the dining surface of the dish is sensed. Typical food characteristics that are sensed include weight and center of mass. In the figure, three dishes 2606 are depicted. Regardless of whether the structure 2600 includes an integral display or receives a display, the structure 2600 may include stimulating components, such as visual, auditory or haptic stimulating components, none of which are shown in FIG. 26. Typical visual stimulating components include LEDs and electroluminescent wire. The sensing circuitry is not shown and typically is connected either by wire or wirelessly to the circuitry associated with the processor. A computer program controlling the processor may cause an action in response to the characteristic of the food that is sensed. For example, a video or music file being displayed by a stimulating component may be paused if the food is not being consumed at a desired rate as determined by a sensor sensing the weight of the food over time.

Figure 27A:
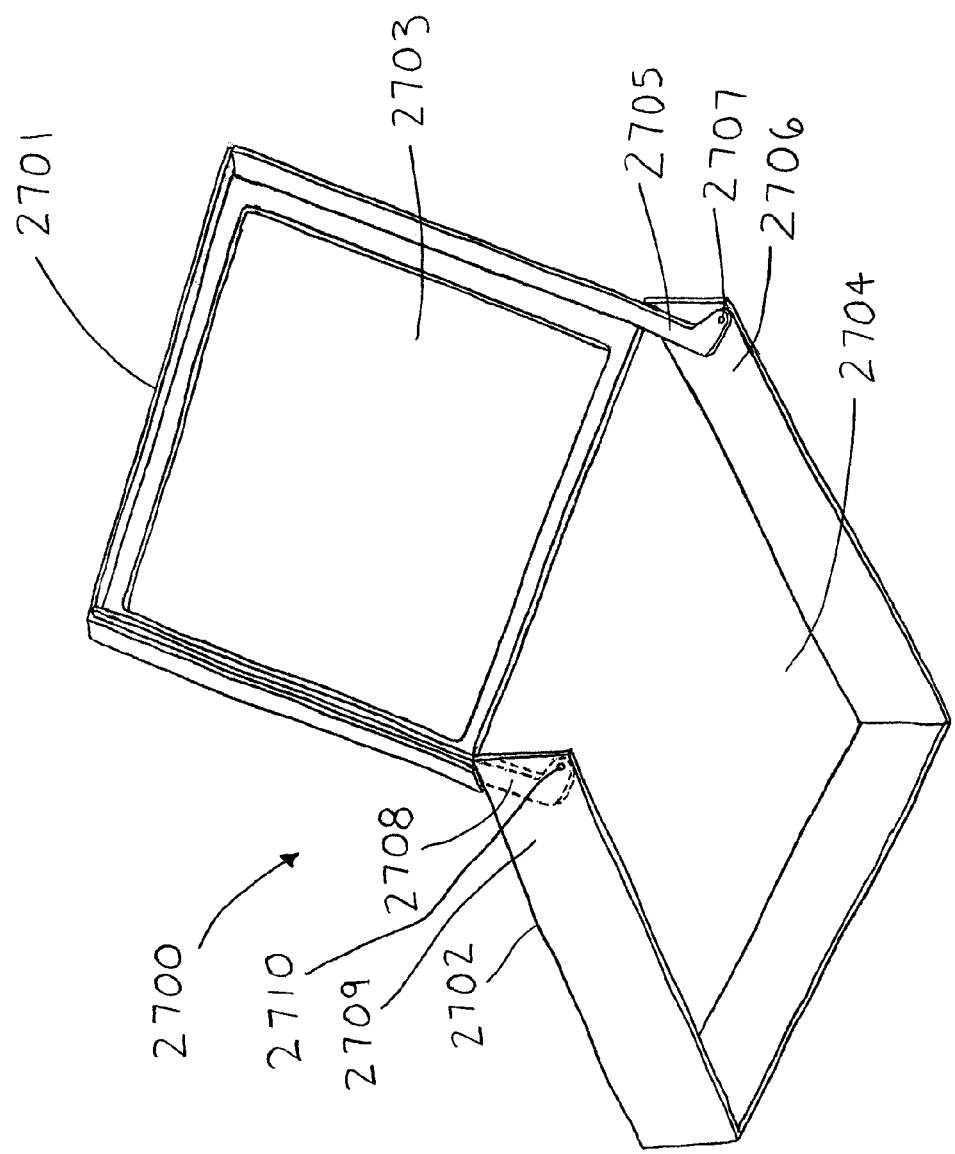
FIG. 27A is a perspective view of the underside of an active foodware dining surface computer cover where the computer monitor food shield articulates with the computer keyboard food shield.
Figure 27B:
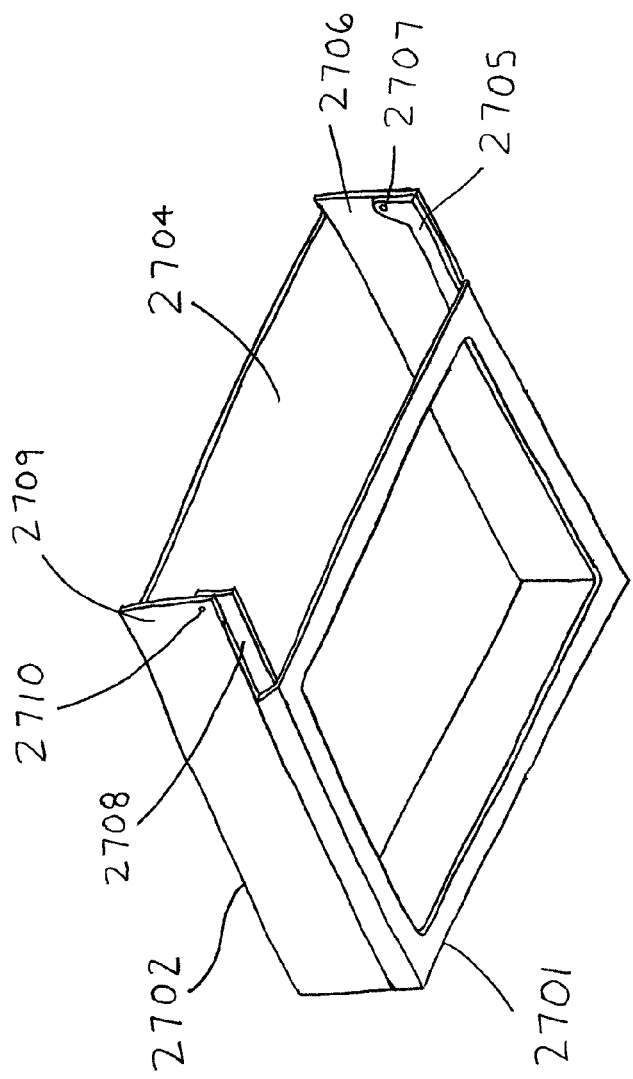
FIG. 27B is a perspective view of the active foodware dining surface computer cover where the computer monitor food shield is folded back to mate with the computer keyboard food shield.

FIGS. 27A and 27B are perspective views of a portion of an active foodware system structure 2700. The structure 2700 is capable of receiving a processor and display, such as provided by the laptop computer 2601 of FIG. 26. The structure 2700 may include any of a variety of useful stimulation and sensing components, none of which are shown in FIGS. 27A and 27B. Rather, FIGS. 27A and 27B are simplified here to exemplify key concepts of a useful hinge structure, such as may be employed by the second embodiment of FIG. 26. When the hinge structure of FIGS. 27A and 27B is employed by the second embodiment of FIG. 26, the view of FIGS. 27A and 27B is looking up from the lower right of the structure 2600 of FIG. 26. The hinge structure permits the structure 2700 to open into a first configuration (FIG. 27A), where it may cover all or a portion of a laptop computer 2601 to protect it from food. The hinge structure also permits the structure 2700 to close in a second configuration (FIG. 27B), where it becomes more compact for storage and also serves to protect sensing and circuitry components.

In FIGS. 27A and 27B the active foodware structure 2700 has a display structure 2701 for supporting a translucent surface 2703 in proximity to the display 2603 of the laptop 2601 to protect the display 2603 from food. The display structure 2701 may rest on, contact or register to the frame surrounding the display 2603. The display structure 2701 includes links 2705 and 2708 and, via hinge pins 2707 and 2710, respectively, is positioned relative to a structure surface 2704 which includes mating links 2706 and 2709, respectively. The edge 2702 between the structure surface 2704 and mating link 2709 is identified to help clarify the relation between the configurations of FIGS. 27A and 27B.

Figure 28:
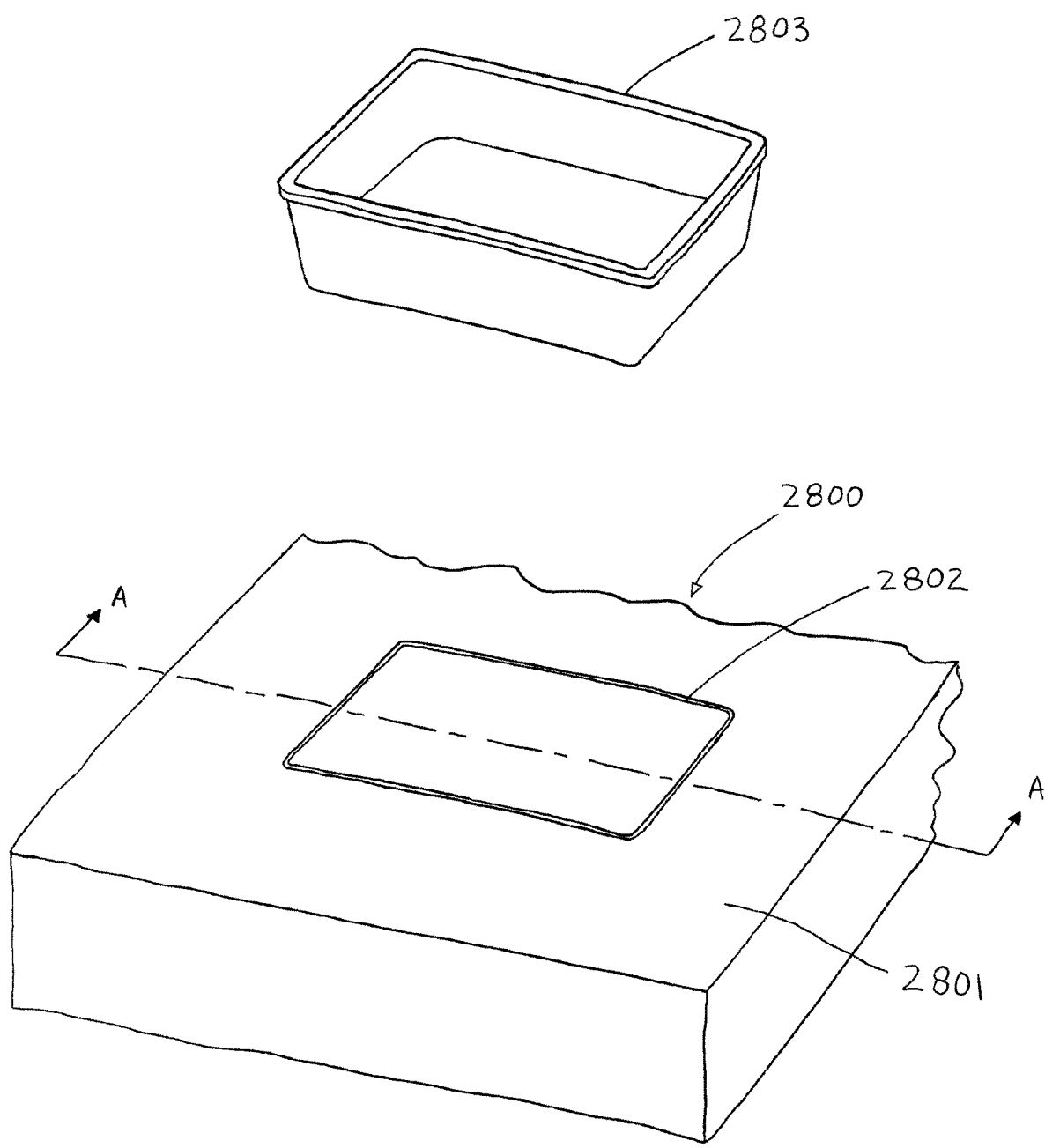
FIG. 28 is a perspective view of a portion of an active foodware dining surface with a food-sensing platform and food dish.

FIG. 28 is a close-up perspective view of a portion of an active foodware system 2800 including a structure with a surface 2801, a food-sensing surface 2802 and a dining dish 2803. Sometimes, the food-sensing surface 2802 with its electrical circuitry is referred to as an active component; whereas, the dining dish 2803 when it contains no electronics is referred to as a passive component. The food-sensing surface 2802 may lie below, lie at the same level or lie above the structure surface 2801. The dining dish 2803, which may be microwavable, refrigerator safe, freezer safe, oven safe, etc., is typically filled with food and then placed on the food-sensing surface. The circuitry for the food-sensing surface is not shown. The portion of an active foodware system 2800 may include any of a variety of useful and desirable stimulation and sensing components, and may represent the front portion of the active foodware systems of FIGS. 25-27. The cross-section A-A through the portion of the active foodware system 2800 of FIG. 28 that includes the food-sensing surface 2802 is further described in FIGS. 29A-29D. Each embodiment of FIGS. 29A-29D is sometimes referred to as a type of active subsystem.

Figure 29D:
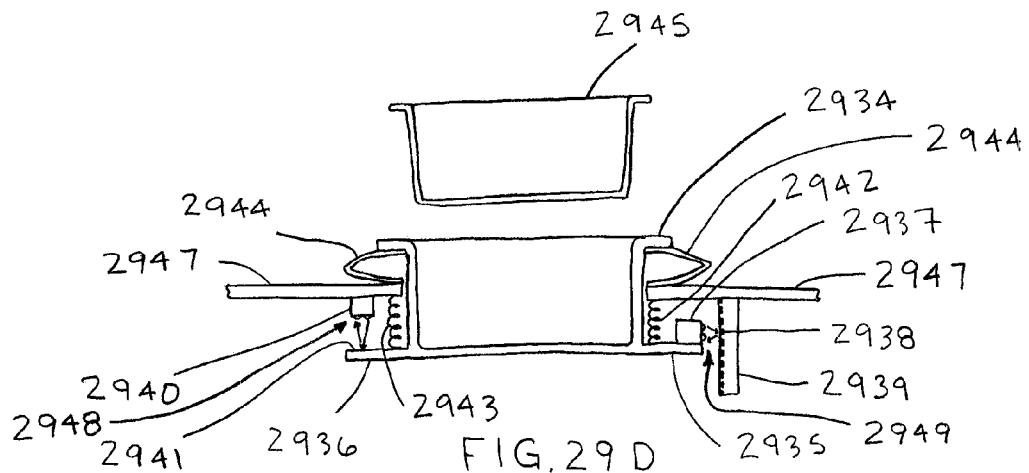
FIG. 29D is a cross section of a third type of food-sensing platform portion of an active foodware dining surface.
Figure 29C:
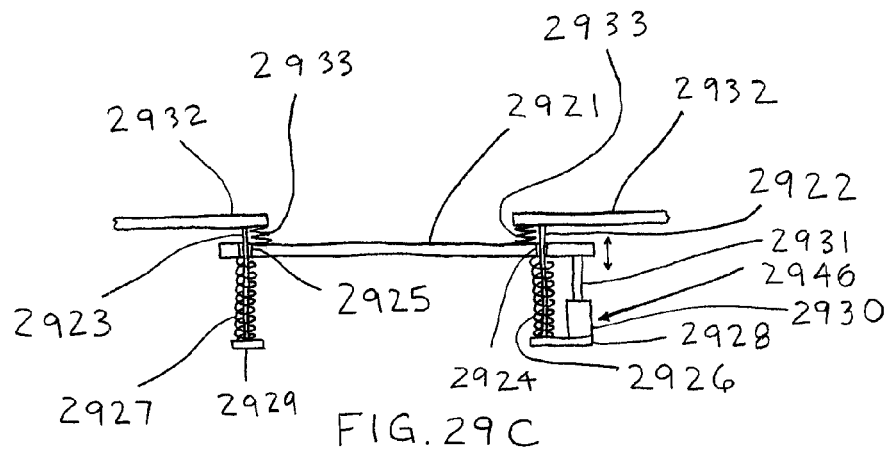
FIG. 29C is a cross section of a third type of food-sensing platform portion of an active foodware dining surface.
Figure 29B:
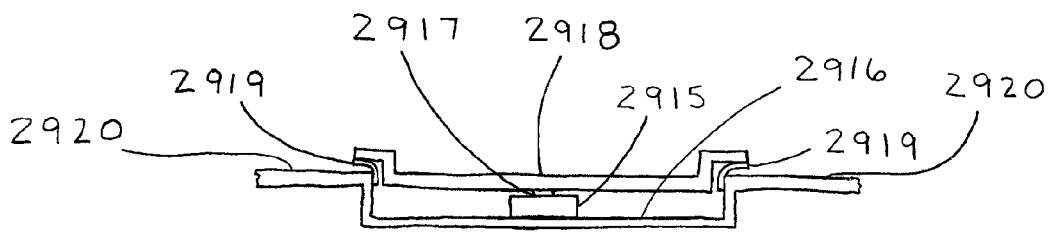
FIG. 29B is a cross section of a second type of food-sensing platform portion of an active foodware dining surface.
Figure 29A:
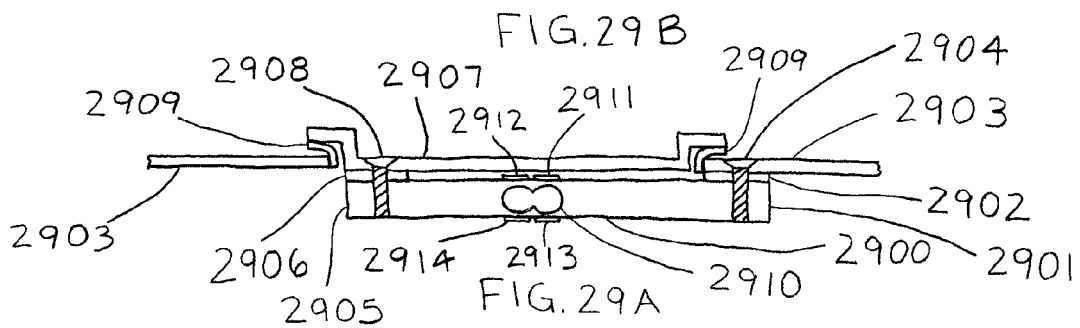
FIG. 29A is a cross section of a food-sensing platform portion of an active foodware dining surface.

FIG. 29A is a first embodiment of cross section A-A through the portion of the active foodware system 2800 of FIG. 28 that includes the food-sensing surface 2802. The food-sensing surface 2907 and the surface 2903 of FIG. 29A correspond to the food-sensing surface 2802 and the surface 2801, respectively, of FIG. 28. In FIG. 29A a load cell 2900 is used to measure the "combined weight" of the food-sensing surface 2907, a food dish 2803 resting on the food-sensing surface 2918, and any food put on the dining surface of the food dish. In this first embodiment, the active foodware system 2800 employing the load cell 2900 senses in real time changes in the weight of food present on the dining surface of the food dish and infers how quickly food is being eaten, and the active foodware system 2800 causes a corresponding stimulation to be presented to the diner and/or inform another person.

In FIG. 29A, the end 2901 of the load cell 2900 is spaced away from the surface 2903 by a spacer 2902 and affixed to the surface 2903 by a fastener 2904. The end 2905 of the load cell 2900 is affixed to the food-sensing surface 2907 by a fastener 2908 and spaced away from the food-sensing surface 2907 by a spacer 2906. Food spilled from the food dish 2803 is prevented from reaching the load cell 2900 and its associated electrical circuitry (not shown) by a seal 2909. The seal 2909 is typically a flexible material, such as rubber or plastic, that can be cleaned and sanitized and can provide a water-tight seal between the food-sensing surface 2907 and the surface 2903.

The load cell 2900 has a flexible section 2910 that helps direct bending in a known manner. The flexible section 2910 of the load cell 2900 may be created by removing material from the load cell, such as by drilling, sanding, machining, milling, etc. The flexible section 2910 may also be created by an appropriate mold in the case where the load cell is molded or cast. The flexible section 2910 of the load cell 2900 causes a "double bending" of the load cell 2900 when a load is applied to the end 2905 relative to the end 2901, resulting in a deflection of the end 2905 relative to the end 2901. The load cell 2900 has four strain gages 2911, 2912, 2913 and 2914 mounted near the flexible section 2910 to measure the amount of double bending when the end 2905 deflects relative to the end 2901 due to the combined weight. Wires from the strain gages are omitted from the drawing for clarity. As food is added to the dining surface of the dish 2803 resting on the food-sensing surface 2907, the end 2905 deflects further relative to the end 2901, and the strain gages 2911 and 2914 increase their strain while the strain gages 2912 and 2913 decrease their strain. Similarly, as food is removed from the dining surface of the dish 2803 resting on the food-sensing surface 2907, the deflection of the end 2905 relative to the end 2901 decreases, and the strain gages 2911 and 2914 decrease their strain while the strain gages 2912 and 2913 increase their strain. An electrical circuit which converts signals from the strain gages into an electrical signal related to the combined weight is provided in FIG. 30.

One useful embodiment of the load cell 2900 is made from an aluminum alloy, where the depth dimension (into the page) and height dimension typically range from ¼" to 1", and the length dimension typically ranges from 1" to 6". Transducer Techniques® of Temecula, Calif. manufactures such load cells, including their EBB Series. Another type of load cell which may be employed to sense weight of food on the food-sensing surface is a "thin beam" load cell, which may be made from a material such as 301 SS beryllium copper with a thinner height dimension that typically ranges from 0.002" to 0.1". Again, Transducer Techniques manufactures such thin beam load cells, including their TBS series.

FIG. 29B is a second embodiment of cross section A-A through the portion of the active foodware system 2800 of FIG. 28 that includes the food-sensing surface 2802. The food-sensing surface 2918 and the surface 2920 of FIG. 29B correspond to the food-sensing surface 2802 and the surface 2801, respectively, of FIG. 28. In FIG. 29B a compression load cell 2915 is used to measure the "combined weight" of the food-sensing surface 2918, a food dish 2803 resting on the food-sensing surface 2918, and any food put on the dining surface of the food dish. In this second embodiment, the active foodware system 2800 employing the compression load cell 2915 senses in real time changes in the weight of food present on the dining surface of the food dish and infers how quickly food is being eaten, and the active foodware system 2800 causes a corresponding stimulation to be presented to the diner and/or inform another person.

In FIG. 29B, the food-sensing surface 2918 rests on the load button 2917 of the compression load cell 2915 which rests on the recessed section 2916 of the surface 2920. Food spilled from the food dish 2803 is prevented from reaching the compression load cell 2915 and its associated electrical circuitry (not shown) by a seal 2919. The seal 2919 is typically a flexible material, such as rubber or plastic, that can be cleaned and sanitized and can provide a water-tight seal between the food-sensing surface 2918 and the surface 2920.

As food is added to the dining surface of dish 2803 resting on the food-sensing surface 2918, the load button 2917 applies pressure to the body of the compression load cell 2915. The applied pressure is typically sensed by strain gages inside the body of the compression load cell 2915. Electrical wires from the compression load cell 2915 are omitted from the figure for clarity. Using an electrical circuit consistent with the configuration of strain gages employed, the combined weight and changes in the amount of food present on the dining surface can be measured. A typical electrical circuit is similar to the circuit of FIG. 30. When three or more compression load cells 2915 are used, the center of mass of the food on the dining surface can also be measured.

One useful embodiment of the compression load cell 2915 is made from heat treated 17-4ph stainless steel, with body diameter ranging from ¼" to 3" and height ranging from ⅛" to 2". Transducer Techniques manufactures such compression load cells, including their SLB series.

FIG. 29C is a third embodiment of cross section A-A through the portion of the active foodware system 2800 of FIG. 28 that includes the food-sensing surface 2802. The food-sensing surface 2921 and the surface 2932 of FIG. 29C correspond to the food-sensing surface 2802 and the surface 2801, respectively, of FIG. 28. In FIG. 29C a displacement sensor 2946 is used to measure the displacement of the food-sensing surface 2921 resulting from the "combined weight" of the food-sensing surface 2921, a food dish 2803 resting on the food-sensing surface 2921, and any food put on the dining surface of the food dish. The displacement sensor 2946 has a movable element 2931 attached to the food-sensing surface 2921 and a stationary element 2930 attached to spring-retention member 2928. The displacement sensor 2946 may be any convenient displacement sensor, including but not limited to (1) a linear encoder, where a movable element 2931 has encoder slots, and a stationary element 2930 contains optical sensors for sensing the encoder slots; (2) an LVDT (linear variable displacement transducer) where a movable element 2931 is the LVDT movable core, and a stationary element 2930 contains the sensing coil; (3) an optical displacement sensor and the like. In this third embodiment, the active foodware system 2800 employing the displacement sensor 2946 senses in real time changes in displacement corresponding to changes in the weight of food present on the dining surface of the food dish and infers how quickly food is being eaten, and the active foodware system 2800 causes a corresponding stimulation to be presented to the diner and/or inform another person.

In FIG. 29C, the food-sensing surface 2921 rests on the compression springs 2926 and 2927 which are attached to the surface 2920 by guide members 2922 and 2923, respectively. The guide members 2922 and 2923 pass through guide openings 2924 and 2925, respectively, of the food-sensing surface 2921. The guide members 2922 and 2923 are affixed at one end to a surface 2932 and have spring-retention members 2928 and 2929 at the other end. Accordingly, springs 2926 and 2927 apply a force between the spring-retention members 2928 and 2929 and the food-sensing surface 2921. There is at least one compression spring with associate guide member, and typically there are more than two compression springs with associated guide members. Food spilled from the food dish 2803 is prevented from reaching the compression springs 2926 and 2927, guide members 2922 and 2923, displacement sensor 2946 and its associated electrical circuitry (not shown) by a seal 2933 which follows the perimeter of the opening in the surface 2932 and is attached to the surface 2932 and to the food-sensing surface 2921. The seal 2933 is typically a flexible material, such as rubber or plastic, that can be cleaned and sanitized and can provide a water-tight seal between the food-sensing surface 2921 and the surface 2932.

As food is added to the dining surface of dish 2803 resting on the food-sensing surface 2921, the food-sensing surface 2921 compresses compression springs 2926 and 2927 against spring-retention members 2928 and 2929, respectively, while a displacement sensor 2946 measures the displacement of food-sensing surface 2921 relative to a spring-retention member 2929. Electrical wires from the displacement sensor 2946 are omitted from the figure for clarity. Using an electrical circuit consistent with the type of displacement sensor employed, the combined weight and changes in the amount of food present on the dining surface can be measured. A block diagram of an electrical circuit which converts signals from a linear encoder into an electrical signal related to the combined weight is provided in FIG. 31. Multiple displacement sensors may be used, and when three or more displacement sensors are used, the center of mass of the food on the dining surface can also be measured.

FIG. 29D is a fourth embodiment of cross section A-A through the portion of the active foodware system 2800 of FIG. 28 that includes the food-sensing surface 2802. The food-sensing surface 2934 and the surface 2947 of FIG. 29D correspond to the food-sensing surface 2802 and the surface 2801, respectively, of FIG. 28. In FIG. 29D at least one displacement sensor is used to measure the displacement of the food-sensing surface 2934 resulting from the "combined weight" of the food-sensing surface 2934, a food dish 2945 resting on the food-sensing surface 2934, and any food put on the dining surface of the food dish. The displacement sensor employed may be any convenient displacement sensor, including but not limited to (1) a linear encoder, (2) an LVDT (linear variable displacement transducer), (3) an optical displacement sensor, and the like. The left portion of FIG. 29D shows the use of an optical displacement sensor 2948, while the right portion of FIG. 29D shows the use of a linear encoder 2949. Typically, a single displacement sensor technology is employed; however, two different displacement sensor technologies are exemplified in FIG. 29D. The displacement sensor 2948 includes an infrared emitter-detector pair 2940 which senses the amount of infrared light that is reflected from the reflective surface

2941, which is rigidly attached to the food-sensing surface 2934. As the food-sensing surface moves up and down, the reflective surface 2941 moves closer to, and further from, respectively, the infrared emitter-detector pair 2940, and so the signal from the infrared emitter-detector pair 2940 increases and decreases, respectively. The displacement sensor 2949 includes and infrared emitter-detector pair 2937 which reflects light off of a stationary encoder element 2939 which is attached to a surface 2947. The stationary encoder element 2939 has a series of light reflective and non-reflective lines 2938 such that when the infrared emitter-detector pair 2937 moves relative to the stationary encoder element 2939 and passes by the series of light reflective and non-reflective lines 2938 the electrical signal from the infrared emitter-detector pair 2937 increases and decreases, respectively. The peaks of the electrical signal may be counted to determine the location of the infrared emitter-detector pair 2937 relative to the stationary encoder element 2939. In this fourth embodiment, the active foodware system 2800 employing at least one displacement sensor senses in real time changes in displacement corresponding to changes in the weight of food present on the dining surface of the food dish and infers how quickly food is being eaten, and the active foodware system 2800 causes a corresponding stimulation to be presented to the diner and/or inform another person.

For a given combined weight, the amount of displacement of the food-sensing surface 2934 relative to the surface 2947 is determined by the tension in the tension springs 2942 and 2943 which are attached at one end to food-sensing surface portions 2935 and 2936, respectively, and at the other end to the surface 2947. There is at least one tension spring, and typically there are more than two tension springs. Food spilled from the food dish 2945 is prevented from reaching the tension springs 2942 and 2943, displacement sensors 2949 and 2948 and their associated electrical circuits (not shown) by a seal 2944 which follows the perimeter of the opening in the surface 2947 and is attached to the surface 2947 and to the food-sensing surface 2934. The seal 2944 is typically a flexible material, such as rubber or plastic, that can be cleaned and sanitized and can provide a water-tight seal between the food-sensing surface 2934 and the surface 2947.

As food is added to the dining surface of the dish 2945 resting on the food-sensing surface 2934, the food-sensing surface 2934 extends the tension springs 2942 and 2943 while the displacement sensors 2949 and/or 2948 measure the displacement of food-sensing surface 2934 relative to the surface 2947. Electrical wires from the displacement sensors 2949 and 2948 are omitted from the figure for clarity. Using an electrical circuit consistent with the type of displacement sensor employed, the combined weight and changes in the amount of food present on the dining surface can be measured. Multiple displacement sensors may be used, and when three or more displacement sensors are used, the center of mass of the food on the dining surface can also be measured.

Figure 30:
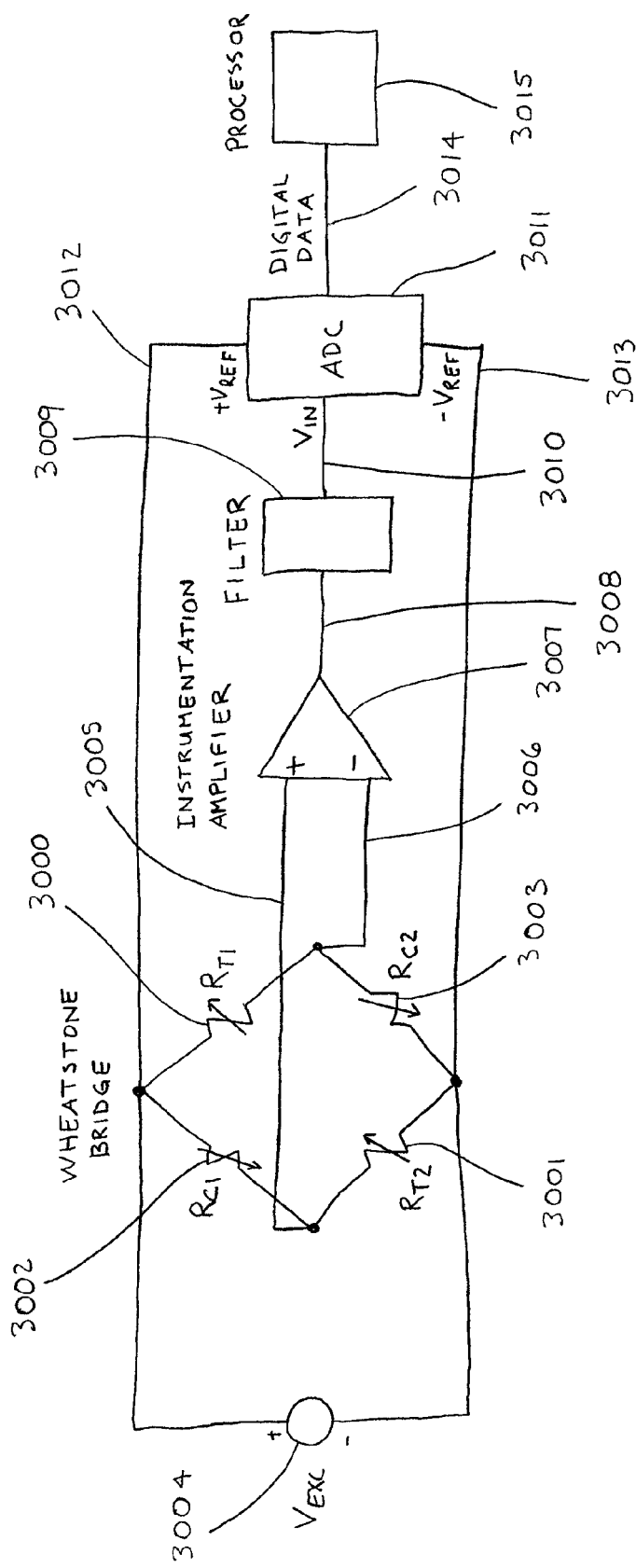
FIG. 30 is a circuit block diagram of a processor receiving weight information from a food-sensing platform of an active foodware dining plate.

FIG. 30 is an electrical circuit which converts signals from strain gages of a load cell into an electrical signal related to the deflection of the load cell. Such an electrical circuit may be employed to determine the deflection of the load cell of FIG. 29A or FIG. 29B. Relating to FIG. 29A, the strain gages 2911, 2912, 2913 and 2914 correspond to FIG. 30 as the strain gages 3000, 3002, 3003 and 3001 which are wired in a Wheatstone Bridge configuration. As the load cell 2900 deflects under the load of food, the strain gages 3000 and 3001 experience tension (positive strain) and the strain gages 3002 and 3003 experience compression (negative strain). These four strain gages form two separate voltage dividers of the excitation voltage 3004. The voltage divider consisting of the strain gages 3001 and 3002 produces a voltage 3005, and the voltage divider consisting of the strain gages 3003 and 3000 produces a voltage 3006. The difference in these two voltages 3005 and 3006 is determined by the instrumentation amplifier 3007. An instrumentation amplifier typically has a high-impedance input stage, which often includes amplification and filtering, followed by a differential amplification stage. An instrumentation amplifier may be realized by a single integrated circuit or may be realized using multiple integrated circuits and discrete components, such as operational amplifiers, resistors, capacitors and the like. The output voltage 3008 of the instrumentation amplifier 3007 may be filtered by a filter 3009. Such a filter may be any convenient filter, including a second order Butterworth filter realized by a Sallen-Key operational amplifier topology. The filtered analog voltage 3010 is input to an analog-to-digital converter (ADC) 3011 which may use the excitation voltage 3004 as the conversion reference inputs 3012 and 3013. The ADC 3011 may be any convenient converter and may be a single integrated circuit or be realized using multiple integrated circuits and discrete components. The ADC 3011 may be any desired resolution. The digital data 3014 from the ADC 3011 is inputted to a processor 3015 for processing.

Figure 31:
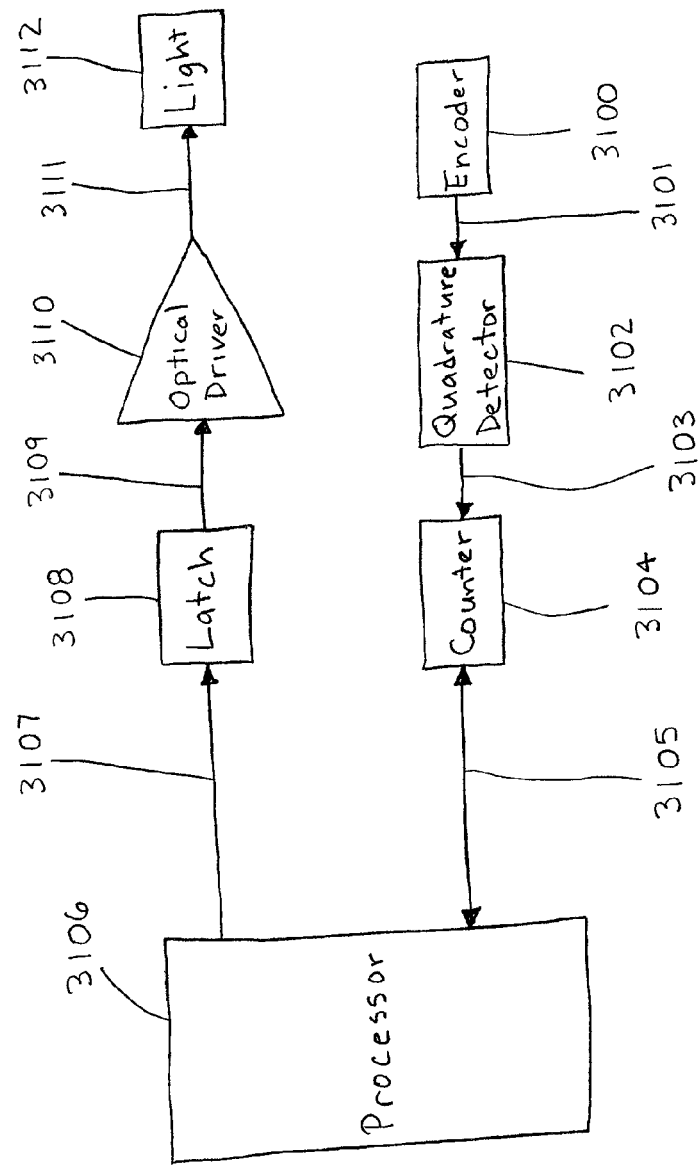
FIG. 31 is a block diagram of a computer processor receiving encoder information from a food-sensing platform of an active foodware dining plate and outputting a signal to illuminate one or more lights on the active foodware dining plate.

FIG. 31 is a block diagram of an electrical circuit which converts signals from a linear encoder into an electrical signal related to the combined weight and which outputs a light stimulus. Such a circuit may be employed by the displacement sensors of FIGS. 29C and 29D. The linear encoder 3100 may be any convenient linear encoder, including an optical linear encoder. An optical linear encoder typically has a movable element which is movable relative to a housing, where the movable element is opaque with slots or translucent bands. The housing typically has an infrared emitter for transmitting light and an infrared detector for receiving light that passes through the slots or translucent bands of the movable element. The linear encoder may be used to measure the displacement between the moveable element and the housing. An infrared emitter-detector that was used in an exemplary embodiment is a Fairchild H21LTB Optologic® Optical Interrupter Switch.

The linear encoder 3100 outputs an encoder signal 3101 comprising two pulse trains one quarter period out of phase. The quadrature detector 3102 converts the encoder signal 3101 into a single pulse train and a direction signal, collectively referred to as the quadrature output signal 3103. The quadrature detector 3102 may be a specialized single integrated circuit or realized using a 74LS74 flip flop or equivalent. The counter 3104 receives the quadrature signal 3103 and determines a total count signal 3105 corresponding to the absolute position of the linear encoder. A counter that was used in an exemplary embodiment is a Fairchild 74F579A1 integrated circuit. The processor 3106 receives the total count signal 3105 and processes it. Based on the value of the total count signal 3105, the processor 3106 may output a light command 3107 to a latch 3108 which stores the command as the stored light command 3109. The latch 3108 that was used in an exemplary embodiment is a 74LS373. The stored light command 3109 is input to the optical driver 3110 which generates the necessary signal 3111 to turn on the light 3112. In an exemplary embodiment the optical driver 3110 is a 7406 integrated circuit and the light 3112 is an LED.

Figure 32:
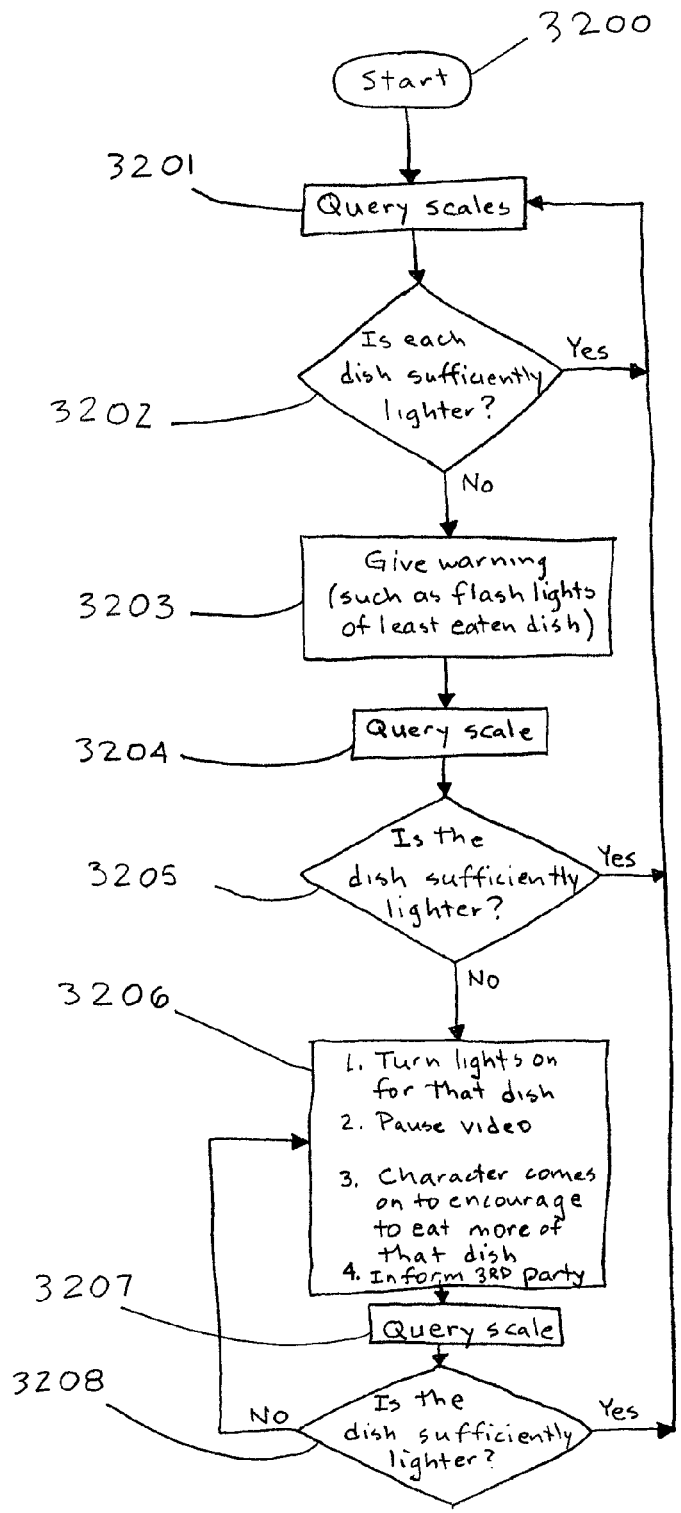
FIG. 32 is a flowchart describing a portion of an exemplary computer program controlling an active foodware dining plate.

FIG. 32 is a block diagram of an exemplary algorithm and logic of a computer program for controlling an embodiment of the subject invention. The logic is for an embodiment where a child is to be encouraged to eat one or more foods at least at a minimum rate. The form of encouragement provided by this embodiment is his being allowed to watch a video of his choice while eating, as long as he eats each of the foods in front of him fast enough until each is sufficiently gone. Any of a variety of single- or multimedia forms of entertainment or information may provide the encouragement. In this embodiment, if the child does not eat each of the foods at least at a specified minimum rate, his desired video is paused and a warning video is run which specifically asks the child to eat the food he isn't eating fast enough so his desired video may continue playing.

In particular, the program starts with block 3200. At this point, the child's video may be started if it is not already playing. After performing typical programming initialization, such as memory allocation, the weights of each food compartment are queried in block 3201 by the program. Querying the weight may include reading the digital output of the analog-to-digital converter 3011 in FIG. 30. Various functions of the weights are then determined by the program. For example, the rate of change of weight in each food compartment is typically calculated. The absolute weights of the foods in each compartment, as well as, the rate of decrease of weight, are compared to desired values in block 3202. Until the weight in each compartment is below a specified level, then as long as the rate of decrease of weight of each food compartment (which is assumed to correlate with the rate of consumption of the food in the respective compartments) is beyond a required level, the video (i.e., the type of encouragement in this case) is allowed to continue.

If the rate of decrease of food in a particular compartment is not fast enough, then a warning signal is provided to the diner as denoted by block 3203. A typical warning signal includes the flashing of one or more lights, typically LEDs, and may include LEDs of different color, and the flashing may be in a variety of sequences. The weights of the food compartments are queried again as depicted by block 3204 and the necessary conditions are again tested.

If a warning signal was provided following the previous test and still the rate of food consumption is not fast enough in one or more food compartments as determined in block 3205 then the video is paused and one or more severe warnings are issued to the diner, such as shown by block 3206. Such severe warnings may include LEDs that are consistently on and a graphical character that comes on a video monitor and specifically informs the diner that the video will not continue until more of a particular food is eaten. The parent may also be alerted by any of a variety of methods, including paging, calling on the phone, email, an auditory signal, text message, and the like. The graphical character associated with a severe warning may be selected by a parent to be a cartoon that the child diner specifically likes, respects or identifies with. The character and its attributes (such as synthesized voice parameters and movement information) may be selected in variety of ways, including selection from a library of characters in memory on the active foodware system, or the character and its attributes may be downloaded from a website. The request the character makes may be entered into a file by the parent and spoken by the active foodware system in a synthesized voice corresponding to the cartoon character. An exemplary character might be a mouse, and an exemplary request is the following: "Hey Billy. We're having a lot of fun watching the video together, but we won't be able to keep watching it unless you eat more vegetables." The character may then point to the particular dish that isn't being eaten from quickly enough.

The weight of the food compartments are monitored again as shown by block 3207. If sufficient food is still not being consumed, as determined by block 3208, control of the program returns to block 3206. The parent may enter multiple requests to be spoken by the character, where each time block 3206 is run, a different request may be spoken. Such requests may be selected to be spoken by the character at random or in a particular sequence, such as may be desired when successively more severe warnings are to be issued.

When the weight of each food container falls below predetermined levels the program terminates. Prior to program termination the parent may be alerted that the child has finished eating by any of a variety of methods, including paging, calling on the phone, email, auditory signal, text message, and the like. Also prior to program termination, the character may issue a congratulatory stored message, such as: "Good boy, Billy! Thank you for eating all your food. I look forward to watching another video with you again later."

FIG. 33 is an active foodware system comprising a computer 3301 and an active foodware computer cover 3300. In the figure, the computer 3301 is a portable tablet computer. The active foodware computer cover 3300 shows a few exemplary features that an active foodware cover may comprise; however, the active foodware computer cover 3300 embodiment as shown is not intended to limit the scope of features or structure that active foodware computer covers may comprise. In general, an active foodware computer cover comprises typically at least one food compartment, at least one sensory stimulating or sensing component, and cleanable material (typically plastic) for covering and protecting from spilled food at least a portion of a computer, such as the visual display screen 3309 and keyboard 3310 of a computer 3301.

In FIG. 33 the active foodware computer cover 3300 illustrates three different food compartments; however, typically, when an active foodware computer cover has multiple food compartments each compartment will be of the same general design. The food compartment 3302 includes electroluminescent visual stimulation 3305 outlining at least a portion of the food compartment 3302. The food compartment 3303 includes LED visual stimulation 3306 positioned on the food compartment. The food compartment 3304 includes LED visual stimulation 3307 positioned near the food compartment. As shown, the active foodware computer cover 3300 has a transparent screen 3308 for covering the visual feedback display screen 3309 of the computer 3301.

The visual stimulation of a food compartment (3302, 3303 or 3304) may be activated in association with a computer program running on the computer 3301. The active foodware computer cover 3300 typically communicates information with the computer 3301 via wired or wireless technology. The computer 3301 may also provide electrical power to the active foodware computer cover 3300 via wired or wireless technology. When electrical power is provided wirelessly, it is typically provided via inductively coupling the active foodware computer cover 3300 with the computer 3301.

The food compartments may include food sensors, such as weight sensors or optical sensors, for detecting food and/or monitoring consumption of the food in the food compartments. The food compartments may also be used with dishes that may be removed for cleaning and/or microwaving.

FIG. 34 is an active foodware system 3400 illustrating how and where food compartments may be positioned relative to a keyboard and monitor. The active foodware system 3400 may comprise an active foodware computer cover and computer, or it may be an integrated unit. The following description is for the case where the active foodware system 3400 is an integrated unit, i.e., the food compartments and any associated stimulation or sensing are integrated into a computer structure comprising a processor, memory, keyboard, visual display, and other components typically associated with a laptop computer.

The active foodware system 3400 comprises a transparent cover 3402 over an LCD monitor, where the transparent cover 3402 forms a water tight seal with the monitor housing 3401. A food compartment 3405 is attached to the monitor housing 3401 and to the side of the monitor screen and transparent cover 3402. A food compartment 3406 is attached to the monitor housing 3401 via a swivel mounting. The swivel mounting comprises a first link 3407 with a first end extending from the food compartment 3406 and a second end attached to the first end of a second link 3408 by a hinge pin 3409. The second end (i.e., non-pinned end) of the second link 3408 is attached to the monitor housing 3401. Accordingly, the food compartment 3406 may be rotated to a variety of desired positions, such as in front of the monitor or the side.

Food compartments 3410 and 3411 are mounted to the keyboard housing 3412 and typically mounted to the side of the keyboard 3404; although, either food compartment 3410 or 3411 may also cover a portion or all of the keyboard 3404. As shown, the keyboard 3404 is covered by a cleanable material 3403 which is typically a transparent, flexible plastic. Although not explicitly shown, as with other embodiments, the food compartments may comprise stimulating and/or sensing components, and such component may communicate with a processor.

FIG. 35 is an active foodware system comprising a hand-held computer 3505 and an active foodware computer cover 3500 which fits over the hand-held computer 3505. The hand-held computer 3505 may be most any portable device comprising a visual display 3508, processor, memory and a computer program. Types of portable devices include a game pad, personal digital assistant (PDA), portable PC, mobile telephone, and the like. Examples of such portable devices include the PlayStation Portable® (PSP) by Sony, the Game Boy® Micro by Nintendo, the Tungsten® hand-held computer by Palm, Treo® cell phone by Palm and the Blackberry® by Research In Motion. In the figure, the hand-held computer 3505 has user inputs 3506 and 3507. The active foodware computer cover 3500 has a structure 3501 and food compartments 3502 and 3503; although, only one food compartment is necessary. The active foodware computer cover 3500 also has a transparent material, such as plastic, attached to the structure 3501 which allows the user to see important information on the visual display 3508, such as a video or gaming feedback, but prevents food from damaging the hand-held computer 3505 and associated components.

As was discussed relative to other embodiments of the subject invention, the food compartments may include stimulating and/or sensing components. Such components include LEDs, electroluminescent elements, food sensing devices such as load cells, and the like. The active foodware computer cover 3500 may communicate one or more signals with the hand-held computer 3505, where such communication may be via wire or wireless connection. The active foodware computer cover 3500 may operate in association with a computer program running on the hand-held computer 3505. For example, the hand-held computer 3505 may run a video that is paused by a computer program running on the hand-held computer 3505 if the user isn't eating food in the food compartments 3502 and 3503 at a desired rate as sensed by load cells associated with the food compartments 3502 and 3503. If the video is the output display of a videogame, in addition to pausing the game, the game could deduct points from the user if the user weren't eating at a desired rate. The controls 3506 and 3507 of the hand-held computer 3505 may be fully covered, partially covered or not covered at all by the active foodware computer cover 3500 depending on the desired level of control accessibility.

FIG. 36 is an active foodware system 3600 capable of accepting a portable device 3604 such as a music player (e.g., an iPod® by Apple Computer), video player, mobile telephone, hand-held gamepad, hand-held computer, and the like. The active foodware system 3600 has a food compartment 3601, a docking location 3602 which may comprise a cavity and/or connector, and may comprise a speaker. The speaker may be of any convenient speaker design including voice coil or piezoelectric. If it is desired to make the active plate 3700 water tight so it is dishwasher safe, a piezoelectric speaker may be preferred. The portable device 3604 typically includes a visual feedback screen 3607, a user input control 3606 and a docking connector 3605. A useful embodiment is where the portable device 3604 is an Apple iPod® playing a music video, where the music video is viewable while eating the food in the food compartment 3601 and the music is heard through the speaker 3603. As with other embodiments, the food compartment 3601 may have associated stimulation and sensing technology (not shown). The sensing technology may comprise a food sensor, such as a load cell, for sensing the amount of food present. The active foodware system 3600 may contain an integral processor (not shown) or may use a processor associated with the portable device 3604 to acquire data from the food sensor and affect the operation of the portable device 3604, such as pause its operation until food is consumed as desired.

Figure 37:
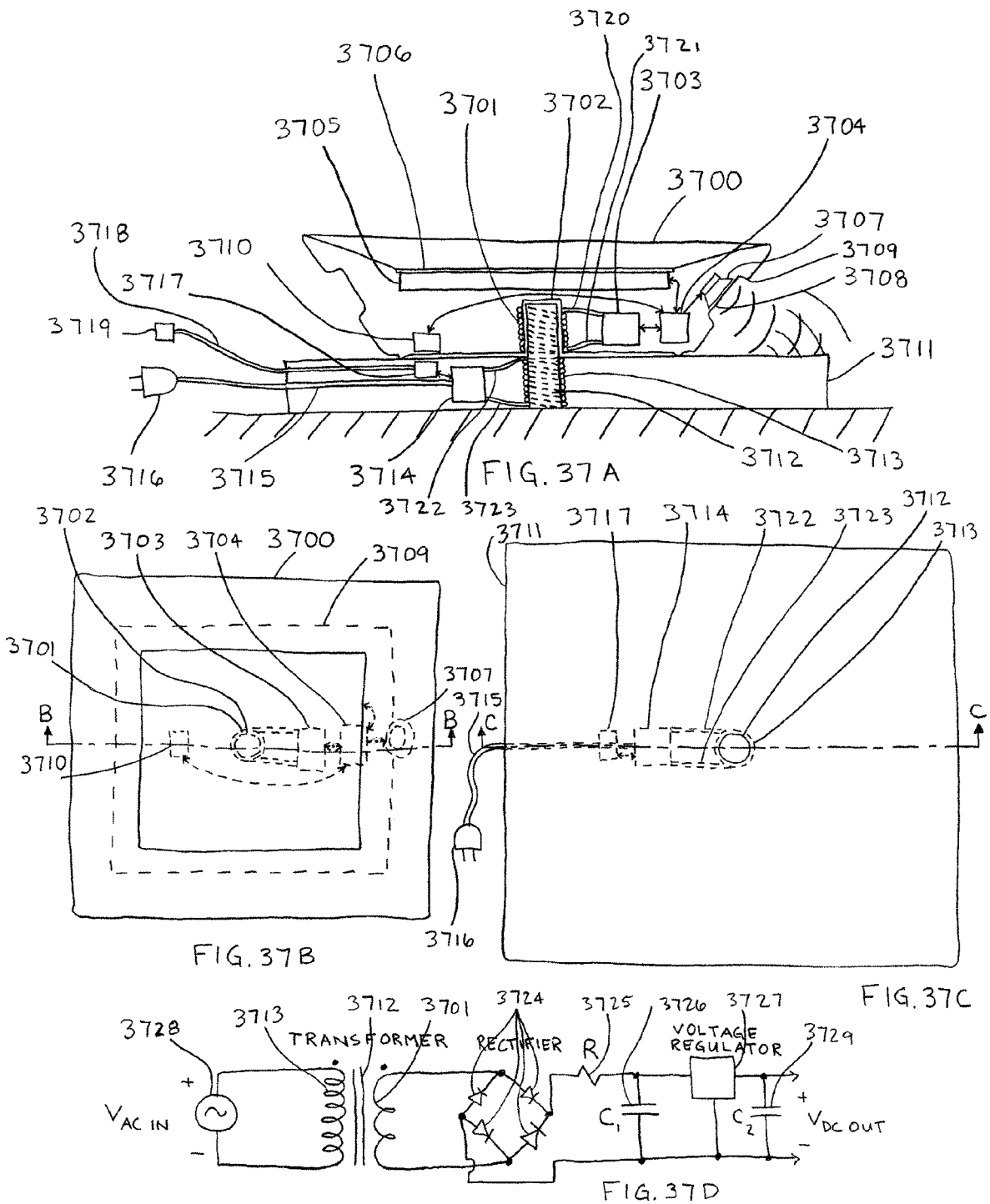
FIG. 37A is a cross section of an active foodware system with a dining plate inductively receiving electrical energy from an underplate.
FIG. 37B is a plan view of the dining plate of FIG. 37A.
FIG. 37C is a plan view of the underplate of FIG. 37A.
FIG. 37D is an exemplary circuit employed by the plate and underplate of FIG. 37A.

FIG. 37A is a cross-sectional view of an active foodware system comprising an active dining plate 3700 that receives electrical power wirelessly from an underplate 3711 using a transformer. The cross-section of the active dining plate 3700 of FIG. 37A is through section B-B of FIG. 37B; whereas, the cross-section of the underplate 3711 of FIG. 37A is through section C-C of FIG. 37C. FIG. 37B is a plan view of the active dining plate 3700; FIG. 37C is a plan view of the underplate 3711 and FIG. 37D is a schematic diagram of an electrical circuit for inductively transforming electrical power between the active dining plate 3700 and underplate 3711. The numberings in FIGS. 37A-37C are consistent.

External electrical power, such as from a wall socket, power supply, battery and the like, enters the underplate 3711. In the embodiment of FIGS. 37A-37C the external power comes from a wall socket via the connector 3716. The connector 3716 is connected via a wire 3715 to the underplate electronics module 3714 which may comprise a processor. The underplate electronics module 3714 comprises any circuitry for driving the leads 3722 and 3723 of the transformer primary coil 3713. If the underplate 3711 comprises an underplate communications module 3717 the underplate electronics module 3714 may also communicate information with the underplate communications module 3717. The underplate communications module 3717 may communicate information with an external processor via a wire 3718 and connector 3719. The underplate communications module 3717 may also communicate information with an active dining plate communications module 3710 in the active dining plate 3700 via wireless technology including infrared (IR) light and radio frequency (RF) electromagnetic waves. When IR light is used to communicate information between the active dining plate communications module 3710 and the underplate communications module 3717 at least a portion of the active dining plate 3700 and the underplate 3711 between the active dining plate communications module 3710 and the underplate communications module 3717 is translucent.

The leads 3722 and 3723 are coiled around the core 3712 (which is typically made of iron) creating the primary coil 3713 of a transformer. When the active plate 3700 is placed on top of the underplate 3711 the core 3712 fits into the cavity 3702. Ideally there is very little gap between the core 3712 and the wall of the cavity 3702. Leads 3720 and 3721 from the active plate electronics module 3703 encircle the cavity creating the secondary coil 3701 of the transformer. When an alternating (A/C) voltage signal is placed across the leads 3722 and 3723 of the primary coil 3713 an electromagnetic field is set up in the core 3712 and alternating voltage exists across the leads 3720 and 3721 of the secondary coil 3701. Ignoring parasitic and other non-ideal voltage losses, the magnitude of the alternating voltage appearing across the leads 3720 and 3721 of the secondary coil 3701 is equal to the alternating voltage appearing across the leads 3722 and 3723 of the primary coil 3713 times the ratio of windings of the secondary coil 3701 to windings of the primary coil 3713.

The power conditioning module 3703 comprises the voltage rectification, regulation and conditioning circuitry associated with the transformer secondary coil 3701. A block diagram including such circuitry is found in FIG. 37D. The power conditioning module 3703 is connected to the active plate electronics module 3704 which typically comprises a processor for controlling the functionality of the active dining plate 3700. If the active dining plate 3700 comprises an active plate communications module 3710 the active dining plate electronics module 3704 may also communicate information with the active dining plate communications module 3710.

The embodiment of FIGS. 37A-37C comprises an LCD display 3705 with a protective transparent screen 3706 in the active dining plate 3700. The embodiment also includes a speaker 3707 recessed in a cavity 3708 on a sloping surface on the underneath portion of the active dining plate 3700. The cavity 3708 has a lip 3709 such that any drips of liquid or food over the edge of the active dining plate will collect on and drip from the lip 3709 of the active plate 3700 and not drip onto the speaker. The active dining plate electronics module 3704 contains the controller for controlling the LCD display 3705 and speaker 3707.

FIG. 37D is a schematic diagram of the typical components of an electrical circuit for transmitting power from a wall socket through the underplate 3711 and wirelessly to the active dining plate 3700 using an inductive transformer. The electrical power from the wall socket is represented by $V_{AC\ IN}$ 3728. This electrical power is provided to the underplate 3711 and drives the primary coil 3713 of the transformer with a core 3712, where both the primary coil 3713 and transformer core 3712 reside in the underplate 3711. The secondary coil 3701 of the transformer resides in the active dining plate 3700. The output of the secondary coil 3701 is alternating current (A/C) so it is first rectified by the bridge rectifier comprising four power rectifying diodes 3724. A part which suffices for such use is a 1N4001 rectifying diode. The output of the bridge rectifier is then low-pass filtered. There are many circuits suitable for low-pass filtering. The low-pass filter used in FIG. 37D is a simple passive low-pass filter comprising resistor R 3725 and capacitor $C_1$ 3726. To further smooth out ripple and provide the desired output voltage $V_{DC\ OUT}$ for other electrical circuitry a voltage regulator 3727 is used followed by a capacitor 3729. Using the transformer to inductively transmit electrical power from a wall socket to the active dining plate 3700 the active dining plate 3700 doesn't need any power connectors or battery compartments and thus can be made to be water tight and dishwasher safe.

Figure 38:
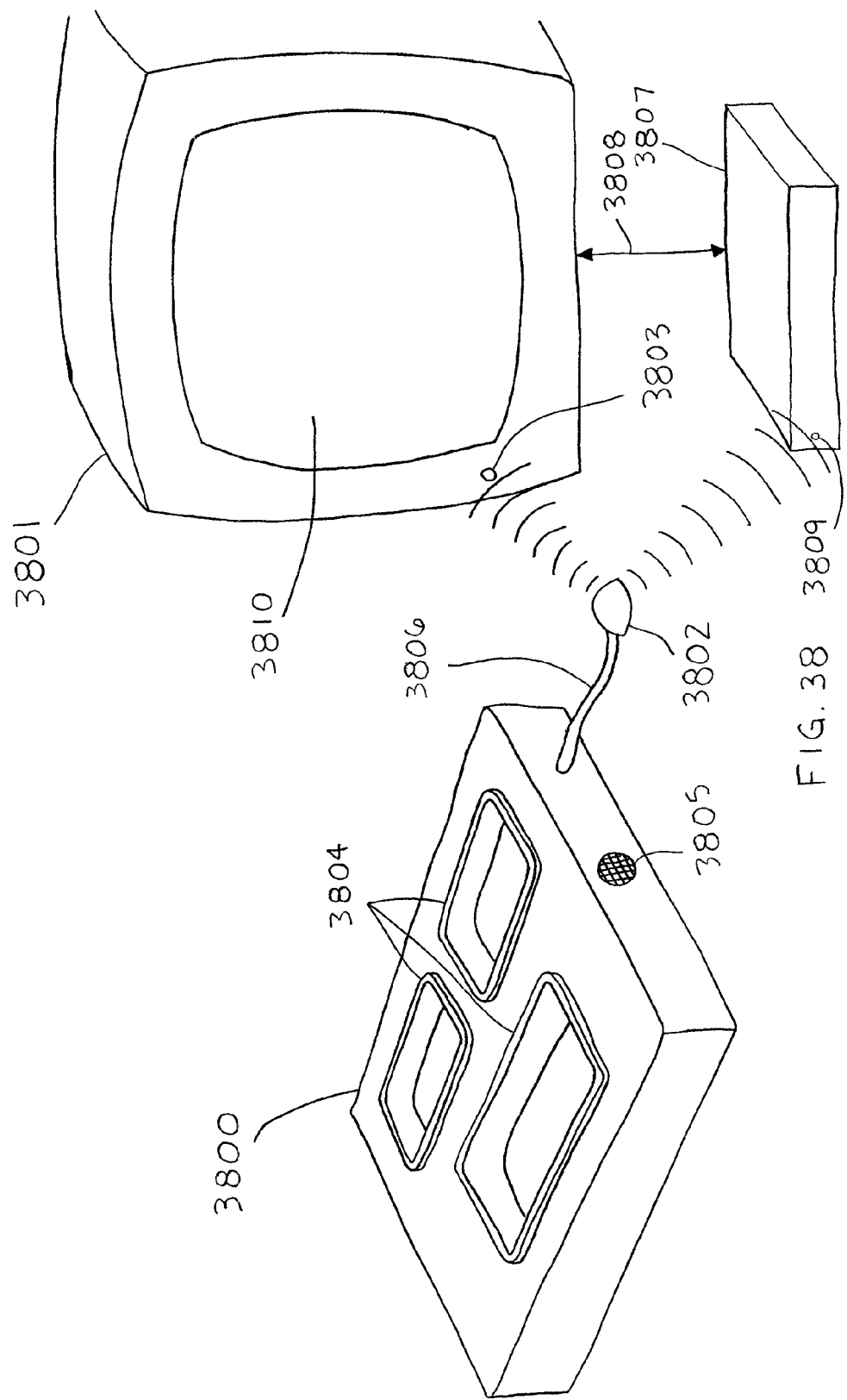
FIG. 38 is a perspective view of an active foodware system transmitting a signal to an external display.

FIG. 38 is an active foodware system where the active foodware dining plate 3800 communicates wirelessly with a monitor 3801 having a screen 3810 via a wireless transceiver 3802 on the active foodware dining plate 3800 and a wireless transceiver 3803 on the monitor 3801. Each wireless transceiver may send or receive a wireless signal. The monitor 3801 may be a television or any other convenient video output device. The communication between the active foodware dining plate 3800 and monitor 3801 may also be via wired technology. The wireless technology can be any convenient and effective technology such as infrared (IR), radio frequency electromagnetic waves (RF) and the like. The active foodware dining plate 3800 may also communicate with a unit 3807 which then communicates by a wired or wireless connection 3808 with the monitor 3801. The unit 3807 is a device which communicates with a monitor, including but not limited to a digital video recorder (DVR), TiVo®, set-top box, DVD player, VCR, game console, and the like. The active foodware dining plate 3800 may communicate with the unit 3807 via wired or wireless link, but in FIG. 38 the unit 3807 is shown to have a wireless transceiver 3809 to communicate a wireless signal with the active foodware dining plate's 3802 wireless transceiver 3802.

The active foodware dining plate 3800 in the embodiment of FIG. 38 has multiple food compartments 3804 and a speaker 3805. This particular embodiment also shows the wireless transceiver 3802 extending from the main housing of the active foodware dining plate 3800 by a cable 3806; however, the wireless transceiver 3802 may be a part of the main housing or internal to the main housing. Eating activity in the food compartments 3804 may be sensed by sensing technology (not shown) and used to control the monitor 3801 and/or unit 3807. For example, if the active foodware dining plate 3800 senses that food in food compartments 3804 is not being eaten at a desired rate, a video being displayed on the monitor screen 3810 may be paused until the desired rate is achieved.

Figure 39:
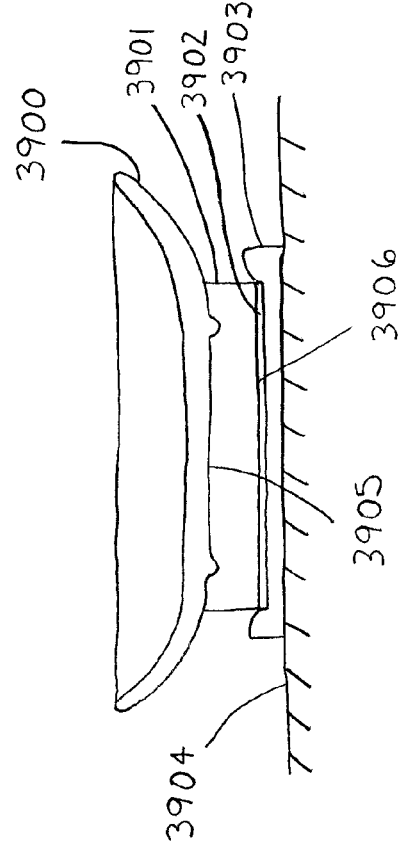
FIG. 39 is a cross section of an active foodware system where a passive translucent plate with a dining surface receives light from a visual display underplate through an optical coupler.

FIG. 39 is a cross-sectional view of an active foodware system with a passive dining plate 3900 on top of an optical coupler 3901 which guides light from the screen 3902 of a visual display 3903 on a supporting surface 3904. At least a portion 3905 of the optical coupler 3901 contacts the passive dining plate 3900 and at least a portion 3906 of the optical coupler 3901 contacts the screen 3902. At least a portion of the passive dining plate 3900 is translucent near where the passive dining plate 3900 contacts the portion 3905 of the optical coupler. The index of refraction and other physical and optical properties of the portions 3905 and 3906 of the optical coupler are selected to provide desired transfer of light from the screen 3902 of the visual display 3903 to the passive dining plate 3900, which light then passes through the translucent passive dining plate 3900 and is observed by an observer.

Figure 40A:
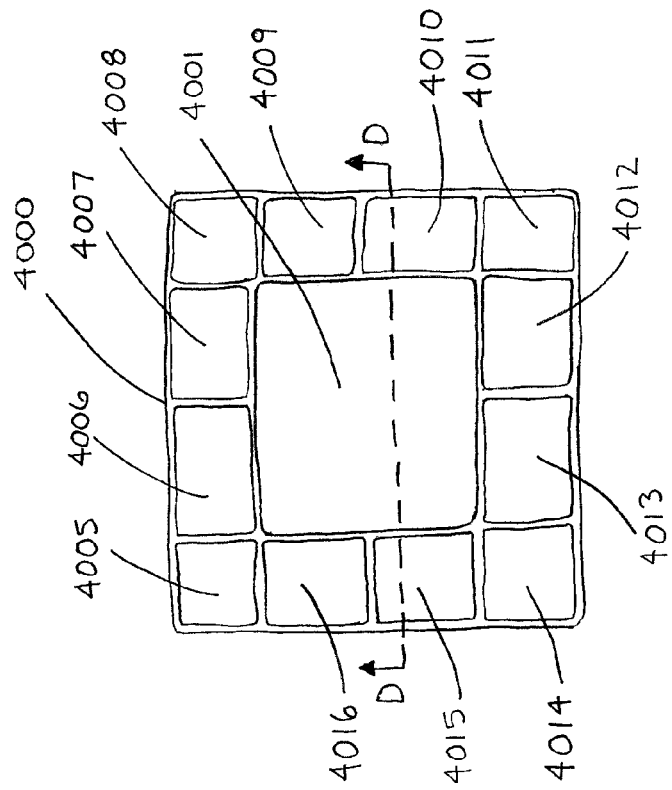
FIG. 40A is a plan view of another active foodware system where a passive plate receives light from a visual display through an optical coupler.
Figure 40B:
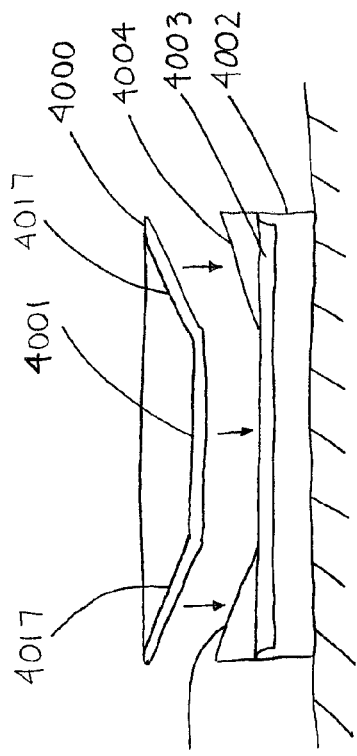
FIG. 40B is a cross section view of the passive plate of FIG. 40A.

FIGS. 40A and 40B provide another embodiment of an active foodware system where light from a visual display screen is transmitted through an optional optical coupler and then through a passive dining plate for the diner to see. FIG. 40A is a plan view of the active foodware system and FIG. 40B is a cross section of FIG. 40A through section D-D. The passive dining plate 4000 has a dining portion 4001 intended for dining and an information portion comprising regions 4005, 4006, 4007, 4008, 4009, 4010, 4011, 4012, 4013, 4014, 4015 and 4016 intended to display information to the diner, where such regions are collectively referred to as the information portion 4017.

The passive dining plate 4000 which has at least a portion which is translucent is placed in confronting relation to a visual display 4002 which has screen 4003. An optional optical coupling structure 4004 provides optical coupling between the screen 4003 and the passive dining plate 4000. For instance, by selection of the index of refraction of the optical coupling structure 4004 the bending of light from the time it leaves the screen 4003 until it enters the passive dining plate 4000 can be controlled. In the exemplary embodiment of FIGS. 40A and 40B the dining portion 4001 of the passive dining plate 4000 rests against the screen 4003, and the information portion 4017 of the passive plate 4000 rests against the optical coupling structure 4004.

In one exemplary application of the embodiment of FIGS. 40A and 40B, thirteen (13) different digital images and/or videos are shown, one in the dining portion 4001 and one in each of the twelve regions of the information portion 4017. In FIG. 40A the boundaries shown between each of the twelve regions of the information portion 4017 are purely graphical, such that the boundaries are displayed on the screen 4003 and observed through the passive dining plate 4000. For instance, at a wedding anniversary party, a guest may see ten images from the wedding in regions of the information portion 4017, two videos in the remaining two regions of the information portion 4017 and see an image of the wedding invitation in the dining portion 4001. The passive dining plate 4000 may be easily washed in the dishwasher or placed in a microwave oven.

The visual display 4002 may comprise an auditory output, such as a speaker or speaker jack. The visual display 4002 may also comprise wired or wireless technology for transferring information to or from the visual display 4002. The visual display 4002 may also comprise sensors and/or stimulators and/or a programmable processor for performing other desired functions.

FIG. 41A is an active foodware system comprising a computer 4110 and a structure 4100 for holding food in a convenient location relative to the computer 4110 such that the diner may easily access the computer 4110 while eating and drinking without concern for spilling the food and drink on the computer 4110, its keyboard 4111, computer monitor 4112 or screen 4113.

In the exemplary embodiment of FIGS. 41A and 41B the structure 4100 has a base 4107 on which the computer 4110 typically rests. An elevating structure for elevating food containers is attached by a section 4105 to the base 4107. The section 4105 of the elevating structure is rotatably attached to a section 4103, where the sections 4105 and 4103 are capable of rotating relative to each other around a separating region 4115. In the exemplary embodiment of FIG. 41B the elevation of a section 4102 of the elevating structure relative to the section 4103 may be adjusted using a tightening band 4104. For instance, when the tightening band 4104 is turned one way the elevation of the section 4102 relative to the section 4103 may be freely adjusted until the tightening band 4104 is turned the other way until tight.

A liquid container holder 4108 with a cavity 4109 is attached to the section 4102. A drinking vessel 4114 may be placed in the cavity 4109. A food tray comprising a frame 4106 and a surface 4101 is also attached to the section 4102. Accordingly, both the liquid container holder 4108 and the food tray comprising the frame 4106 and the surface 4101 may be adjusted in both elevation and position relative to the computer 4110 via the elevating structure. Typically the surface 4101 is translucent to make it possible to see portions of the computer that would otherwise have an obstructed view. Likewise, the frame 4106 may also be translucent. The exemplary embodiment of FIGS. 41A and 41B is configured for a diner who uses his right hand to access other items, such as a computer mouse, writing instrument, napkin and the like. Accordingly, the structure 4100 is shown with elevating structure on the left side and leaving an unobstructed gap on the right side between the computer 4110 and the frame 4106 with the surface 4101. If desired, the frame 4106 with the surface 4101 may be rotated such that none, or only a portion, of the frame 4106 and surface 4101 cover the computer 4110.

Figure 41C:
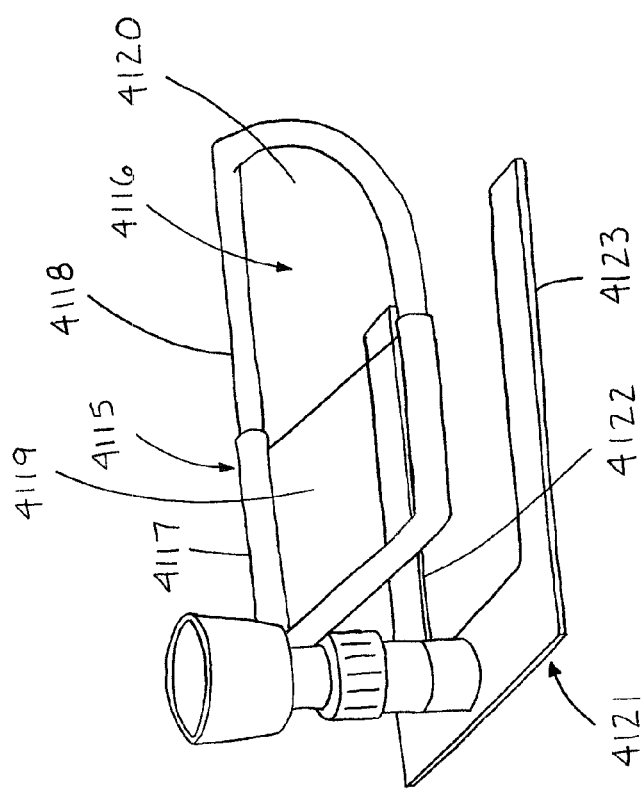
FIG. 41C is a perspective view of the adjustable structure of FIG. 41A where the extension of the frame and surface are capable of being adjusted.

Similar to FIG. 41B, FIG. 41C provides another useful embodiment that comprises a base 4121, an adjustable support structure extending from the base, a horizontal dining platform (also referred to as a food tray and a surface 4116) for supporting food, while a keyboard is positioned at least partially under the dining platform, and supported by the support structure in a raised position from the base 4121, where typically at least a portion of the dining platform is translucent to permit viewing at least a portion of the keyboard during dining.

The embodiment of FIG. 41C is similar to FIG. 41B, but additionally, the food tray comprising a frame 4115 and a surface 4116 (where typically at least a portion of the surface 4116 is translucent) is capable of being extended or retracted, in addition to being rotated and adjusted up and down. In FIG. 41C, the frame 4115 comprises a fixed frame member 4117 to which the fixed surface 4119 is attached, and a sliding frame member 4118 to which a sliding surface 4120 is attached. The sliding frame member 4118 with the sliding surface 4120 is able to be extended or retracted by the user relative to the fixed frame member 4117 with the fixed surface 4119. Also exemplified in FIG. 41C is a base 4121 that is U-shaped comprising a first base leg 4122 and a second base leg 4123. Depending on the desired spacing between the two legs, 4122 and 4123, the two legs 4122 and 4123 may either be placed in front and/or behind, respectively, a laptop computer, such as a laptop computer 4110, or may be placed underneath it.

Figure 42:
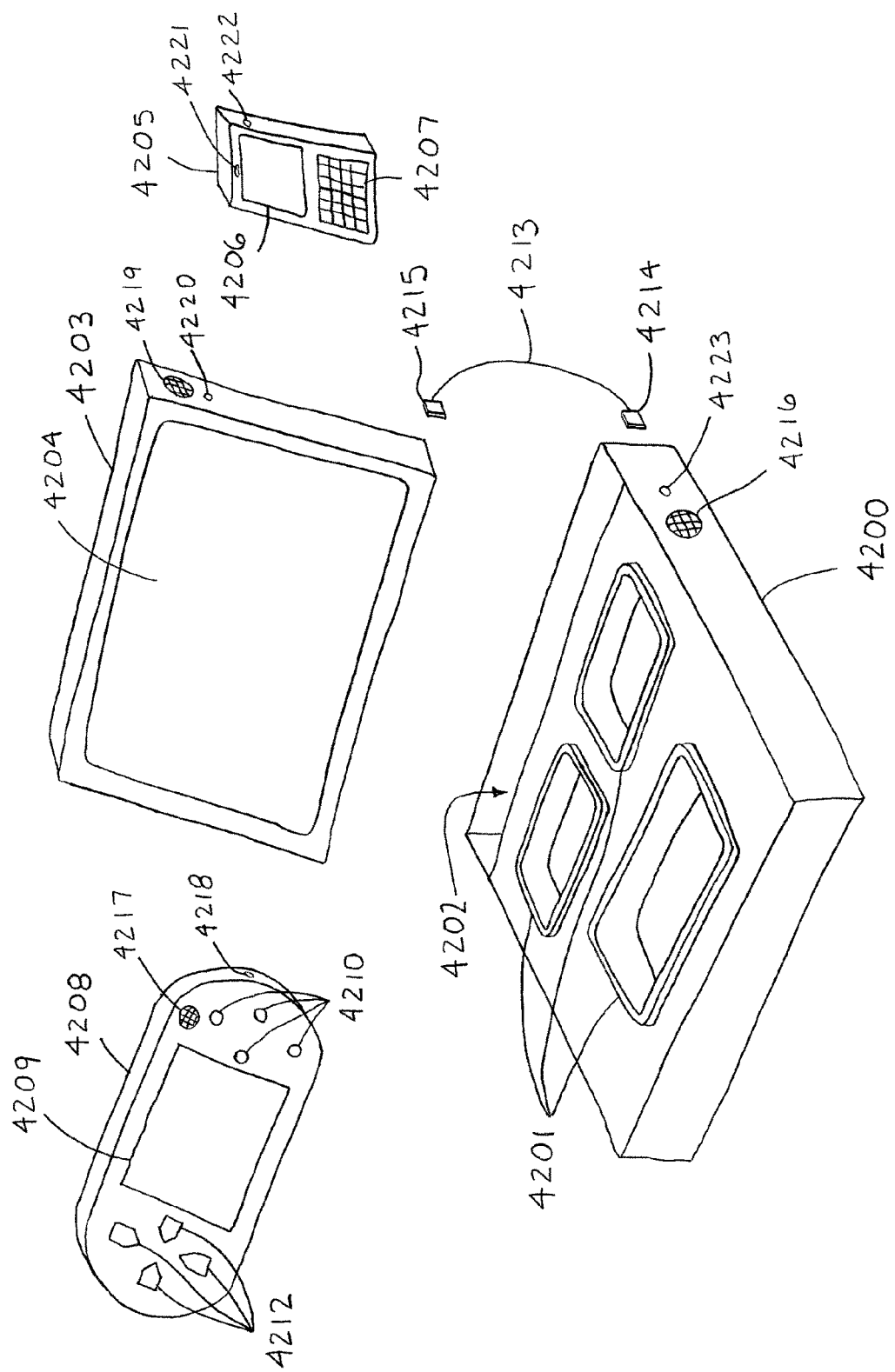
FIG. 42 is a perspective view of an active foodware system comprising an active foodware plate, at least one dining surface, and display devices to be received by, or for attachment to, the active foodware plate.

FIG. 42 is an active foodware system comprising a dining plate unit 4200 which may further comprise one or more food compartments 4201. The dining plate unit 4200 comprises a connector 4202 for connecting to a device. The connector 4202 may also support the connected device in a desired orientation. In the exemplary embodiment of FIG. 42, the connector 4202 includes a cavity into which the device is inserted. In the exemplary embodiment of FIG. 42, three exemplary devices are shown, but the subject invention is not limited to such three exemplary devices. The exemplary devices include a portable gaming unit 4208 (such as a Sony PlayStation Portable®), a computer monitor 4203 and a portable computer 4205. The computer monitor 4203 may be part of a tablet computer, and the portable computer 4205 may be part of a mobile phone. The device may be connected to the dining plate unit 4200 via a wired or wireless connector, and such connection may be part of the connector 4202 or may be achieved by an external connection comprising a connector 4214 for connecting to the dining plate unit 4200 and a connector 4215 for connecting to the device, and where the connectors 4214 and 4215 are connected by a wire 4213. The connectors 4214 and 4215 may be USB connectors, serial connectors, parallel connectors, or any other convenient wired or wireless connectors.

In FIG. 42 the portable gaming unit 4208 has user input controls 4210 and 4212, and has a visual display 4209. The gaming unit also has auditory outputs, including a speaker 4217 and an audio output jack 4218. The computer monitor 4203 has a screen 4204, a speaker 4219 and an audio output jack 4220. The portable computer 4205 has a visual display 4206, user input buttons 4207, a speaker 4221 and an audio output jack 4222. When connected to the dining plate unit 4200, auditory information from a device may be output from a speaker 4216 on the dining plate unit 4200. Auditory information may also be input to the dining plate unit 4200 via an audio input jack 4223.

FIG. 43 is a computer program with a graphical user interface (GUI) displayed on a computer monitor 4300 with screen 4301, where the GUI allows for easy visual selecting of content to be displayed on an active foodware system. In general, the computer program with GUI makes it easier and more intuitive for a hostess to "author" active foodware content. In one example of the computer program a hostess sets a physical table with four active foodware dining plates, where the dining plates each have a visual display. On her computer the hostess defines a graphical table icon 4302 with four graphical plate icons 4303, 4304, 4305 and 4306. Alternately, the hostess may select a table icon with dining plates from a predefined list. Then the hostess may open a folder 4307 on her computer containing one or more graphical images 4308, 4309, 4310, 4311, 4312 and 4313. Using her computer mouse 4314 and the well-known "drag and drop" computer mouse paradigm the hostess may "drag" the thumbnail icon of a desired image 4313 from the folder 4307 to a second location 4315 and then "drop" the thumbnail icon of the desired image over the graphical icon of a desired plate 4306. The computer software interprets the action of dragging and dropping the thumbnail icon as a command to display a thumbnail of the image on the corresponding graphical icon of the desired plate and also to send the necessary image data to the physical active foodware dining plate corresponding to the graphical plate icon either via wireless or wired technology.

Properties of the image may also be configured using the computer program, such as where a slideshow may be exhibited on the dining plate. Such properties include the display of multiple images where the time of display for an image may be set by the hostess. The hostess may also select how one image wipes or fades into the next. The hostess may also select text or sound to be displayed with the image, such that a multimedia performance may be scripted for each physical dining plate. In general, selectable properties include properties commonly available by slideshow software, such as Microsoft PowerPoint®.

In the preceding example, the icon that is dragged and dropped from the folder 4307 represented an image. However, in general, the icon may represent an executable application, a video, a multimedia presentation, object linking and embedding (OLE), a communication link, a computer program, function, command, and the like that affects the operation of the active foodware system.

FIG. 44 is a computer program with a graphical user interface (GUI) displayed on a computer monitor 4400 with screen 4401, where the GUI allows for easy visual selecting of content to be displayed on an active foodware system. In general, the computer program with GUI makes it easier and more intuitive for a hostess to "author" active foodware content. In one example of the computer program a hostess sets a physical table with the active foodware dining plate 4000 of FIGS. 40A and 40B. On her computer the hostess selects a graphical plate icon 4402, corresponding to active foodware dining plate 4000, with twelve graphical region icons 4403 through 4414. Then the hostess may open a folder 4415 on her computer containing one or more graphical images 4416 through 4421. Using her computer mouse 4422 and the well-known "drag and drop" computer mouse paradigm the hostess may "drag" the thumbnail icon of a desired image 4421 from the folder 4415 to a second location 4423 and then "drop" the thumbnail icon of the desired image over the graphical icon of a desired region icon 4412. The computer software interprets the action of dragging and dropping the thumbnail icon as a command to display a thumbnail of the image in the corresponding graphical region icon and also to send the necessary image data either via wireless or wired technology to the physical active foodware dining plate 4000 and display it in the corresponding region 4011.

Properties of the image may also be configured using the computer program, such as where a slideshow may be exhibited on the dining plate. Such properties include the display of multiple images where the time of display for an image may be set by the hostess. The hostess may also select how one image wipes or fades into the next. The hostess may also select text or sound to be displayed with the image, such that a multimedia performance may be scripted for each physical dining plate. In general, selectable properties include properties commonly available by slideshow software, such as Microsoft PowerPoint®.

In the preceding example, the icon that is dragged and dropped from the folder 4415 represented an image. However, in general, the icon may represent an executable application, a video, a multimedia presentation, object linking and embedding (OLE), a communication link, a computer program, function, command, and the like that affects the operation of the active foodware system.

Figure 45:
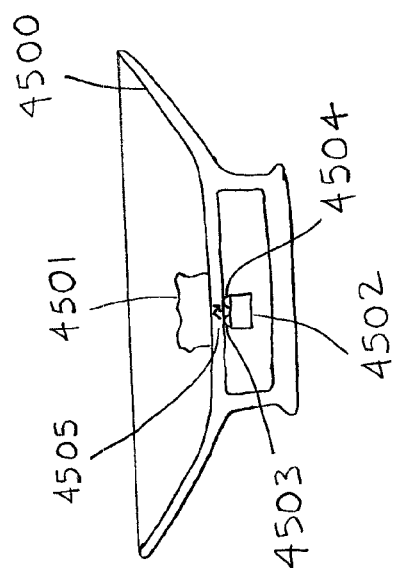
FIG. 45 is a cross section view of an active foodware system with a dining surface and an optical sensor for detecting food.

FIG. 45 is a cross section of an active foodware system where food 4501 on a dining plate 4500 is detected by an optical sensor 4502. Any convenient optical sensor may be used. The particular optical sensor 4502 in the embodiment of FIG. 45 is an infrared emitter-detector sensor, where infrared (IR) light is emitted from the emitter 4503, passes through a translucent portion 4505 of the dining plate 4500, reflects off the surface of the food 4501 and is detected by the IR detector 4504. Typically, the IR emitter 4503 is an LED or laser diode, and the IR detector 4504 is a photodiode, photo transistor, photo Darlington, photo cell, and the like. The driving and processing electrical circuitry for such sensors is known to those skilled in the art and so it is omitted from FIG. 45 for clarity. If no food is present a very limited amount the emitted IR light will reflect and so the signal sensed by the IR detector 4504 will be small. In contrast, if food is present over the emitter 4503 a large portion of the emitted IR light will be reflected and so the signal sensed by the IR detector 4504 will be relatively large. In general, the signal returned by the IR detector 4504 is related to the amount of food present. Typically, more than one IR emitter-detector sensor is used. A large array of IR emitter-detector sensors may be used to provide the desired resolution for determining the amount of food present on the dining plate 4500.

Figure 46:
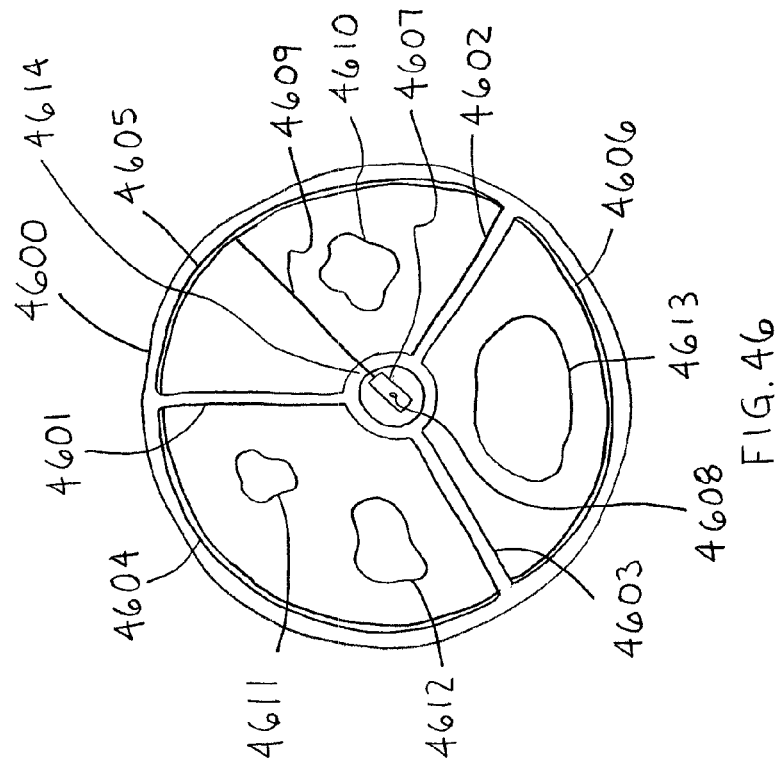
FIG. 46 is a plan view of an active foodware system with a dining surface and an optical sensor for detecting food.

FIG. 46 is a plan view of an active foodware system comprising a dining plate 4600 where a light source 4607 emits light from a portion of the dining plate towards a light detector 4605 located at another portion of the dining plate 4600 where food 4610 may lie between the light source 4607 and the light detector 4605. In the exemplary embodiment of FIG. 46, the light source 4607 is a laser diode that rotates about an axis 4608. The laser diode may also be converted into a sheet of light by a lens or other means to eliminate the need to rotate the laser diode. The light from the laser diode 4607 passes through a translucent food barrier 4616 and is detected by a light detector 4605 unless it is blocked by the food 4610. Using the light detector, the existence, amount and position of food 4610 may be determined. In FIG. 46 the dining plate 4600 is partitioned into three sections containing the food 4610 and the light detector 4605 in a first section, food 4611 and 4612 and a light detector 4604 in a second section, and food 4613 and a light detector 4606 in a third section. The light detector may be any convenient light detector, including but not limited to a charge coupled device (CCD) array, a linear CCD array, a camera, a CCD camera, a lateral-effect photodiode, an array of photodiodes, an array of phototransistors, an array of photocells, and the like. The driving and processing electrical circuitry for such emitters and detectors is known to those skilled in the art and is omitted from FIG. 46 for clarity.

FIGS. 47A and 47B are cross sections of an active foodware system comprising a passive dining plate 4700 and an active underplate 4706. The passive dining plate 4700 comprises a dining surface 4701, one or more light guides 4702 and a bottom surface 4703. The passive dining plate 4700 may also comprise optical wave guides. Typical light guides include fiber optic wires, channels, tubes, and the like. The active underplate 4706 comprises one or more light sources 4711. In the figure, each light source 4711 is a light emitting diode (LED) with a light emitting portion 4712. The LEDs may be laser diodes and/or may emit light in any of a variety of desirable wavelengths. The light sources 4711 may be any desirable light source, including LEDs, laser diodes, electroluminescent light sources, liquid crystal display light sources (LCDs), fluorescent lights, plasma lights, incandescent lights, and the like. The active foodware system may comprise one or more light sources 4711, and when a plurality of light sources 4711 are used, the light sources 4711 may all be the same type of light source or may be different types of light sources.

The light directed by the light guides 4702 may individually, or together, form an image enhancing the dining experience. Such an image may include, but is not limited to a face, a smiley face, such as provided by FIGS. 4A-4D, a cartoon figure, a sun, a moon, a star, a pattern, a design, or any other desirable image. The image may be alterable by selectively energizing the light sources, by affecting the light after it has been energized, by affecting the light guide, or any other reasonable technique. By dynamically altering the image, the image may be made to appear to move. For instance, an action figure may appear to walk, crawl, fly, and the like; a face may appear to smile, wink, talk, frown, and the like; a pattern may appear to morph over time or to the beat of music, which music may also emanate from the active foodware system.

In the exemplary embodiment of FIGS. 47A and 47B, the active underplate 4706 also serves as a base for the passive dining plate 4700. In the embodiment the active underplate 4706 has a protuberance 4709 which supports the light sources 4711. The protuberance 4709 fits into a cavity 4710 in the passive plate 4700 and positions the light sources 4711 in functional relationship with the light guides 4702. Typically, the light sources 4711 are positioned in confronting relationship to the light guides 4702. Light emitted from the light sources 4711 is guided through the light guides 4702 and is allowed to disperse from the light guides 4702 at desired sites or regions providing a desired lighting effect to be viewed by a diner. There are various ways known to those skilled in the art to disperse light from a light guide, including but not limited to introducing discontinuities in the guide, altering the index of refraction, altering the translucency of the guide or its surroundings, abrading or etching the surface, changing the dimension of the light guide such that the angle of incidence of light is able to exceed the critical angle for total internal reflection, applying coatings, terminating the light guide, and the like.

In FIG. 47B the active underplate 4706 is shown to comprise a power source 4727, a control switch 4725, an optional processor 4726 and an optional speaker 4728. The power source 4727 can comprise any convenient power source, including but not limited to a battery, a power adapter connector, an inductive transformer, such as shown in FIGS. 37A-37D, and the like. The control switch 4725 may control any of a variety of functions, including but not limited to turning the lights on/off, selecting one of a variety of lighting effects, such as flashing or strobing, and may be used to select a mode of operation of the processor 4726, and the like. The processor 4726 may be employed to control a variety of complex stimulations, including but not limited to outputting music to the speaker 4728 and synchronizing lighting effects to the associated musical beat. The processor 4726 may also receive data from, or transmit data to, either wired or wirelessly, other entities. Such data may comprise operational commands, desired stimulation, such as a desired lighting effect, desired music, and the like. The details of the electrical circuitry and interconnects are known to those skilled in the art and are omitted from the figure for clarity.

In the exemplary embodiment of FIGS. 47A and 47B the active underplate 4706 is shown to comprise support structures 4708. The active underplate 4706 is also shown to comprise underplate fasteners 4705 which fasten the active underplate 4706 to the passive dining plate 4700 dining plate fasteners 4704. The underplate fasteners 4705 may be any convenient fastener, including but not limited to one or more simple protuberances that fit into the dining plate fasteners 4704 and hold the active underplate 4706 to the passive dining plate 4700 by friction. There are a multitude of other fastening techniques known to those skilled in the art that may be used, including hooks, clips, snaps, slide locks, tongue-in-groove locks, Velcro®, screws, and the like.

Figure 47C:
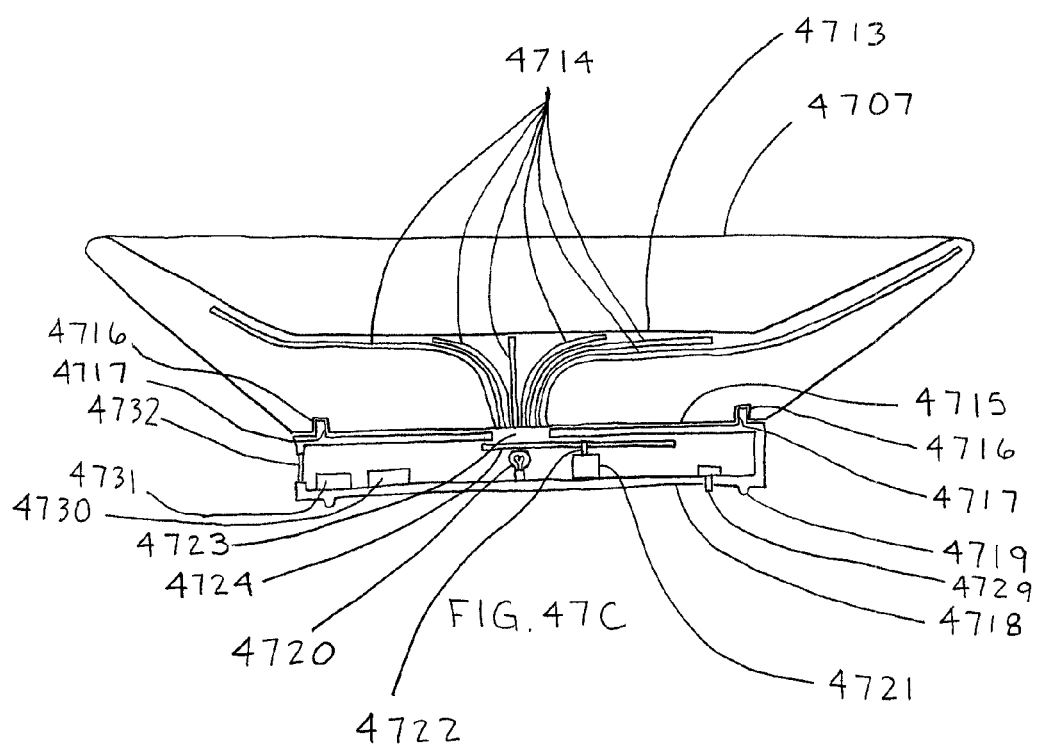
FIG. 47C is a cross section view of an assembled active foodware system including a passive plate with a dining surface and one or more light guides, and a removable active underplate with one or more light sources for emitting light into the one or more light guides of the passive plate.

FIG. 47C is a cross section of an active foodware system comprising a passive dining plate 4707 and an active underplate 4718. The passive dining plate 4707 comprises a dining surface 4713, one or more light guides 4714 and a bottom surface 4715. The passive dining plate 4707 may also comprise optical wave guides. Typical light guides include fiber optic wires, channels, tubes, and the like. The active underplate 4718 comprises one or more light sources. In the figure, one light source 4720 is shown and which is an incandescent light. The light source 4720 may alternatively be an LED. The LED may be a laser diode and/or may emit light in any of a variety of desirable wavelengths. In general, the light source 4720 may be any desirable light source, including an LED, laser diode, electroluminescent light source, LCD, fluorescent light, plasma light, incandescent light, and the like. The active foodware system may comprise one or more light sources, and when a plurality of light sources are used, the light sources may all be the same type of light source or may be different types of light sources.

The light directed by the light guides 4714 may individually, or together, form an image which may enhance the dining experience. Such an image may include, but is not limited to a face, a smiley face, such as provided by FIGS. 4A-4D, a cartoon figure, a sun, a moon, a star, a pattern, a design, or any other desirable image. The image may be alterable by selectively energizing the light sources, by affecting the light after it has been energized, by affecting the light guide, or any other reasonable technique. By dynamically altering the image, the image may be made to appear to move. For instance, an action figure may appear to walk, crawl, fly, and the like; a face may appear to smile, wink, talk, frown, and the like; a pattern may appear to morph over time or to the beat of music, which music may also emanate from the active foodware system.

Light emitted from the light source 4720 is altered by having it pass through a light modifier. In the exemplary embodiment of FIG. 47C, light modification is achieved with a moving translucent film 4724. Movement of the translucent film 4724 may be predetermined or may be alterably controlled. The translucent film 4724 is moved by an actuator 4721, such as a rotary electrical motor. There are a variety of other suitable actuators which may alternatively be employed which are known to those skilled in the art for moving a low-mass translucent film 4724. As light emitted from the light source 4720 passes through the translucent film 4724 it takes on the color and pattern imparted by the translucent film 4724 before it enters the light guides 4714. Accordingly, depending on the pattern on the translucent film 4724, as the motor moves the translucent film 4724, the light passing into and through the light guides, and ultimately dispersed for a diner to see, is varied.

In the exemplary embodiment of FIG. 47C, the active underplate 4718 also serves as a base for the passive dining plate 4707. The light source 4720 is positioned in functional relationship to the light guides 4714, and typically the light source 4720 is positioned in confronting relationship to the light guides 4714. Light emitted from the light source 4720 is guided through the light guides 4714 and is allowed to disperse from the light guides 4714 at desired sites or regions providing a desired lighting effect to be viewed by a diner. There are various ways known to those skilled in the art to disperse light from a light guide, including but not limited to introducing discontinuities in the guide, altering the index of refraction, altering the translucency of the guide or its surroundings, abrading or etching the surface, changing the dimension of the light guide such that the angle of incidence of light is able to exceed the critical angle for total internal reflection, applying coatings, terminating the light guide, and the like.

In FIG. 47C the active underplate 4718 is shown to comprise a power source 4730, a control switch 4729, an optional processor 4731 and an optional speaker 4732. The power source 4730 can comprise any convenient power source, including but not limited to a battery, a power adapter connector, an inductive transformer, such as shown in FIGS. 37A-37D, and the like. The control switch 4729 may control any of a variety of functions, including but not limited to turning the lights on/off, selecting one of a variety of lighting effects, such as flashing or strobing, may control the rate, direction and position of shaft of the motor, and may be used to select a mode of operation of the processor 4731, and the like. The processor 4731 may be employed to control a variety of complex stimulations, including but not limited to outputting music to the speaker 4732 and synchronizing lighting effects to the associated musical beat. The processor 4731 may also receive data from, or transmit data to, either wired or wirelessly, other entities. Such data may comprise operational commands, desired stimulation, such as a desired lighting effect, desired music and the like. The details of the electrical circuitry and interconnects are known to those skilled in the art and are omitted from the figure for clarity.

In the exemplary embodiment of FIG. 47C the active underplate 4718 is shown to comprise support structures 4719. The active underplate 4718 is also shown to comprise underplate fasteners 4717 which fasten the active underplate 4718 to the passive dining plate 4707 dining plate fasteners 4716. The underplate fasteners 4717 may be any convenient fastener, including but not limited to one or more simple protuberances that fit into the dining plate fasteners 4716 and hold the active underplate 4706 to the passive dining plate 4700 by friction. There are a multitude of other fastening techniques known to those skilled in the art that may be used, including hooks, clips, snaps, slide locks, tongue-in-groove locks, Velcro®, screws, and the like.

Figure 48A:
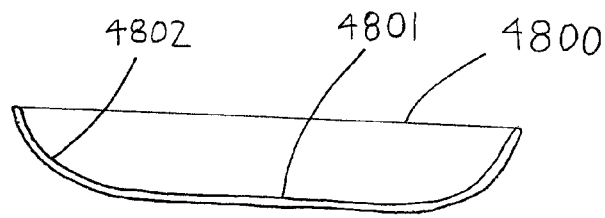
FIGS. 48A-48I are cross section views of typical active foodware plate forms.

FIGS. 48A-48I are cross section views of typical dining plates forms which may be used in an active foodware system. Other dining plate forms may be alternately used in an active foodware system. FIG. 48A is a cross section view of a form of a dining plate 4800 comprising a dining surface 4801 and upwardly curved surrounding surface 4802. Typically, the surrounding surface is intended to direct food from the outer portion of the plate back toward the more central portion of the plate where the dining surface is, to reduce spillage, and to provide a convenient surface for grasping the plate.

Figure 48B:
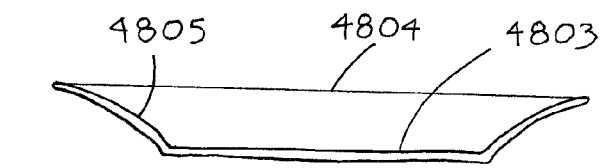

FIG. 48B is a cross section view of a form of a dining plate 4804 comprising a dining surface 4803 and downwardly curved surrounding surface 4805.

Figure 48C:
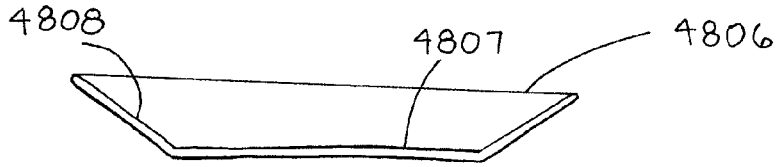

FIG. 48C is a cross section view of a form of a dining plate 4806 comprising a dining surface 4807 and relatively flat (in cross section) sloping surrounding surface 4808.

Figure 48D:
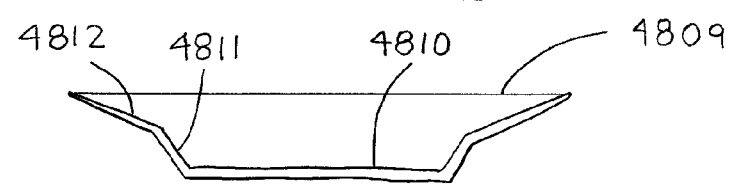

FIG. 48D is a cross section view of a form of a dining plate 4809 comprising a dining surface 4810, a first flat (in cross section) sloping surrounding surface 4811 and a second flat (in cross section) surrounding surface 4812 sloping less than the first sloping surrounding surface 4811.

Figure 48E:
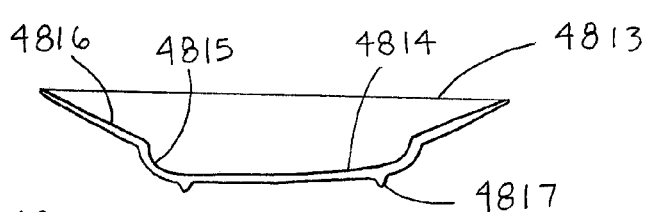

FIG. 48E is a cross section view of a form of a dining plate 4813 comprising a dining surface 4814, a first upwardly curved surrounding surface 4815, a second flat (in cross section) sloping surrounding surface 4816 and supports 4817.

Figure 48F:
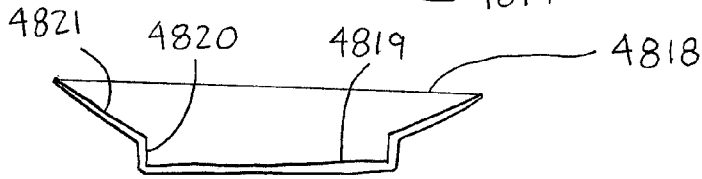

FIG. 48F is a cross section view of a form of a dining plate 4818 comprising a dining surface 4819, a first vertical surrounding surface 4820 and a second flat (in cross section) sloping surrounding surface 4821.

Figure 48G:
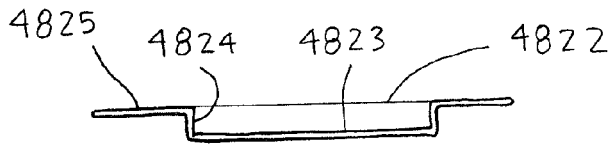

FIG. 48G is a cross section view of a form of a dining plate 4822 comprising a dining surface 4823, a first vertical surrounding surface 4824 and a second horizontal surrounding surface 4825.

Figure 48H:
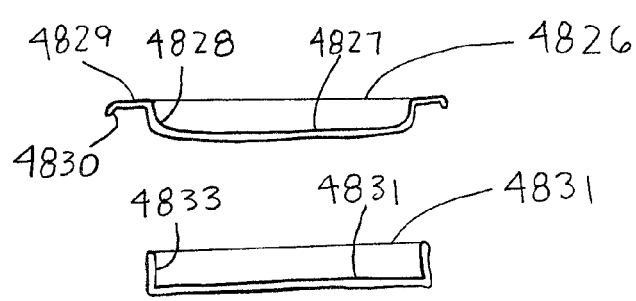

FIG. 48H is a cross section view of a form of a dining plate 4826 comprising a dining surface 4827, a first upwardly curving surrounding surface 4828, a second horizontal surrounding surface 4829 and a downwardly curved outer edge 4830.

Figure 48I:
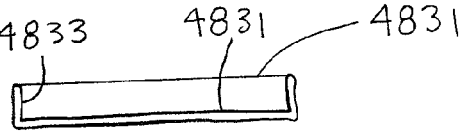

FIG. 48I is a cross section view of a form of a dining plate 4831 comprising a dining surface 4832 and vertical surrounding surface 4833.

It is evident from the above description that a new way of using foodware in an active foodware system, particularly dinnerware, is provided. Instead of static dinnerware that while being attractive is passive, the subject dinnerware is active providing for numerous stimuli for a variety of purposes. The active foodware system dinnerware can be used to encourage young users or diners to eat their food, learn while eating, be responsive to requests and commands, be entertained, be monitored, listen to music, watch TV, communicate by means of the dinnerware, and the like. Adults may use the dinnerware to communicate with others, watch events, review activities, read email, search the internet, and the like. The subject active foodware system provides an entirely new paradigm in the use of common foodware and makes the active foodware system highly versatile in its applications.

All publications and patent applications cited in this specification are herein incorporated by reference as if each individual publication or patent application were specifically and individually indicated to be incorporated by reference.

Although the foregoing invention has been described in some detail by way of illustration and example for purposes of clarity of understanding, it will be readily apparent to those of ordinary skill in the art in light of the teachings of this invention that certain changes and modifications may be made thereto without departing from the spirit or scope of the appended claims.

What is claimed is:

1. An active foodware system comprising:
   a mechanical structure being wider than tall and including a wireless sending component for sending;
   a food surface supported by said mechanical structure, said food surface having a peripheral region surrounding said food surface, said food surface being recessed in relation to said peripheral region for receiving solid food and preventing spillage from said food surface;
   a heating component for heating said food;
   a sensing component for controlling said heating component for maintaining a desired temperature;
   a wireless communication component for communicating data related to said desired temperature, data from said sensing component, digital data related to said food, or electrical power; and
   a visual stimulating component for providing visual stimulation in response to said data from said sensing component or data from said wireless communication component.

2. An active foodware system comprising:
   a mechanical structure being wider than tall;
   a food surface supported by said mechanical structure, said food surface having a peripheral region surrounding said food surface, said food surface being recessed in relation to said peripheral region for receiving solid food and preventing spillage from said food surface;
   a heating component for heating said food;
   a sensing component for controlling said heating component for maintaining a desired temperature;
   a wireless communication component for communicating data related to said desired temperature, data from said sensing component, digital data related to said food, or electrical power;
   a visual stimulating component for providing visual stimulation in response to said data from said sensing component or data from said wireless communication component; and
   a data processing component with computer program for receiving external data from computer memory external to said active foodware system, said external data from a website or server computer external to said active foodware system, and said data processing component with computer program for processing said external data with said data from said sensing component for providing processed data.

3. The active foodware system according to claim 1 further comprising a data processing component for wirelessly receiving and processing data from said sensing component, and a tablet computer or a mobile phone having a graphical display, said data processing component for communicating with said tablet computer or mobile phone.

4. The active foodware system according to claim 1, wherein said visual stimulating component comprises a graphical display, wherein (a) said graphical display is employed by a tablet computer or a mobile phone, or (b) said active foodware system further comprises an articulation for changing an angle of said graphical display.

5. The active foodware system according to claim 1, wherein said wireless communication component is for communicating (a) with a sensing component for sensing said food or information about a user or an active foodware member of a place setting, or (b) with a website server computer.

6. The active foodware system according to claim 1, wherein said mechanical structure comprises said heating component and said wireless communication component, said wireless communication component for sending.

7. The active foodware system according to claim 6, said wireless communications component for sending a signal to said visual stimulating component.

8. The active foodware system according to claim 1, wherein said sensing component is configured for providing a signal related to:
   (a) a condition of said food received by said food surface selected from at least one of weight, position, proximity, pressure, center of mass, moisture, light, color, reflectivity, opacity, movement, and acceleration; or
   (b) a condition of a user.

9. The active foodware system according to claim 8, said sensing component including an infrared sensor for providing said signal related to said light, said moisture, said color, said reflectivity, or said opacity.

10. An active foodware system comprising:
    a mechanical structure being wider than tall;
    a food surface supported by said mechanical structure, said food surface having a peripheral region surrounding said food surface, said food surface being recessed in relation to said peripheral region for receiving solid food and preventing spillage from said food surface;
    a heating component for heating said food;
    a sensing component for controlling said heating component for maintaining a desired temperature;
    a wireless communication component for communicating data related to said desired temperature, data from said sensing component, digital data related to said food, or electrical power; and
    a visual stimulating component for providing visual stimulation in response to said data from said sensing component or data from said wireless communication component;

wherein said mechanical structure includes an inductive coil for providing inductive electrical power.

11. The active foodware system according to claim 10 further comprising a food plate including said food surface, said food plate for receiving said inductive electrical power.

12. The active foodware system according to claim 1, wherein said wireless sending component is for sending to an external processor employed by a tablet computer or mobile phone having a graphical display, or by a server computer.

13. The active foodware system according to claim 12 further comprising a food plate including said food surface, said food plate further including a plate-communications module for wirelessly communicating information with said wireless communication component, wherein said mechanical structure includes said wireless communication component, and said wireless communication component includes said wireless sending component.

14. The active foodware system according to claim 1 further comprising a wireless controller for controlling said active foodware system, and a tablet computer or a mobile phone having a graphical display, said wireless controller for communicating with said tablet computer or mobile phone.

15. The active foodware system according to claim 14 further comprising a camera for sensing said food or a user.

16. The active foodware system according to claim 14 further comprising a sound-generating component configured for synchronizing sound generated by said sound-generating component with light emitted by said visual stimulating component, said visual stimulating component including said graphical display.

17. The active foodware system according to claim 16, said graphical display for providing graphical video.

18. The active foodware system according to claim 16 programmed to provide stimulation to a user related to said sensing for providing rewards, entertainment, or directions for food selection.

19. A method employing the active foodware system according to claim 1, said method comprising the steps of:
placing said food on said food surface;
said heating component heating said food;
said sensing component controlling said heating component for maintaining said desired temperature;
said wireless sending component sending;
said wireless communication component communicating said data related to said desired temperature, said data from said sensing component, said digital data related to said food, or said electrical power; and
said visual stimulating component providing said visual stimulation in response to said data from said sensing component or said data from said wireless communication component.

20. The method according to claim 19 further employing a mobile computing device providing auditory or vibrotactile feedback, said mobile computing device including a tablet computer or a mobile phone having a graphical display.

21. The method according to claim 19, said sensing component configured for providing a signal related to:
(a) a condition of said food received by said food surface selected from at least one of weight, position, proximity, pressure, center of mass, moisture, light, color, reflectivity, opacity, movement, and acceleration; or
(b) a condition of a user.

22. The method according to claim 19 further employing a data processing component, and further employing computer memory external to said active foodware system, said method further comprising the steps of:
transferring data from said computer memory to said data processing component;
said data processing component processing said data from said computer memory with said data from said sensing component to provide processed data; and
displaying, playing, or operating said processed data.

23. The method according to claim 22 further employing a mobile computing device providing said processing, said displaying, said playing, said operating, auditory feedback, or vibrotactile feedback.

24. The method according to claim 23 further employing a camera sensing said food or a user.

* * * * *